United States Patent
Lin et al.

(10) Patent No.: US 11,111,422 B2
(45) Date of Patent: *Sep. 7, 2021

(54) HYDRAULIC FLUID AND FUEL RESISTANT SEALANTS

(71) Applicant: PRC—DeSoto International, Inc., Sylmar, CA (US)

(72) Inventors: Renhe Lin, Stevenson Ranch, CA (US); Weibin Cui, Rancho Palos Verdes, CA (US)

(73) Assignee: PRC-DeSoto International, Inc., Sylmar (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/782,137

(22) Filed: Feb. 5, 2020

(65) Prior Publication Data

US 2020/0172777 A1 Jun. 4, 2020

Related U.S. Application Data

(63) Continuation of application No. 15/644,587, filed on Jul. 7, 2017, now Pat. No. 10,597,565.

(51) Int. Cl.
| | |
|---|---|
| *C09J 163/04* | (2006.01) |
| *C09J 163/00* | (2006.01) |
| *C09K 3/10* | (2006.01) |
| *C08L 81/02* | (2006.01) |

(52) U.S. Cl.
CPC ............. *C09J 163/04* (2013.01); *C08L 81/02* (2013.01); *C09J 163/00* (2013.01); *C09K 3/1012* (2013.01)

(58) Field of Classification Search
CPC ....... C09J 163/04; C09J 163/00; C08L 81/02; C09K 3/1012
See application file for complete search history.

(56) References Cited

U.S. PATENT DOCUMENTS

| | | | |
|---|---|---|---|
| 4,366,307 A | 12/1982 | Singh et al. | |
| 4,609,762 A | 9/1986 | Morris et al. | |
| 4,623,711 A | 11/1986 | Morris et al. | |
| 5,225,472 A | 7/1993 | Cameron et al. | |
| 6,172,179 B1 | 1/2001 | Zook et al. | |
| 6,509,418 B1 | 1/2003 | Zook et al. | |
| 7,009,032 B2 | 3/2006 | Bojkova et al. | |
| 7,858,703 B2 | 12/2010 | Zook et al. | |
| 7,875,666 B2 | 1/2011 | Gilmore et al. | |
| 7,879,955 B2 | 2/2011 | Rao et al. | |
| 8,138,273 B2 | 3/2012 | Rao et al. | |
| 8,466,220 B2 | 6/2013 | Rao et al. | |
| 8,513,339 B1 | 8/2013 | Keledjian et al. | |
| 8,541,513 B2 | 9/2013 | Hobbs et al. | |
| 8,729,216 B2 | 5/2014 | Hobbs et al. | |
| 8,816,023 B2 | 8/2014 | Anderson et al. | |
| 8,952,124 B2 | 2/2015 | Rao et al. | |
| 8,993,691 B2 | 3/2015 | Anderson et al. | |
| 9,056,949 B2 | 6/2015 | Cai et al. | |
| 9,079,833 B2 | 7/2015 | Klobes et al. | |
| 9,382,642 B2 | 7/2016 | Yarlagadda et al. | |
| 9,422,451 B2 | 8/2016 | Rao et al. | |
| 9,540,540 B2 | 1/2017 | Rao et al. | |
| 9,663,619 B2 | 5/2017 | Echigoya et al. | |
| 10,597,565 B2 * | 3/2020 | Lin ...................... | C09K 3/1012 |
| 2004/0152866 A1 | 8/2004 | Cosman | |
| 2008/0224098 A1 | 9/2008 | Tang et al. | |
| 2010/0010133 A1 | 1/2010 | Zook et al. | |
| 2014/0051789 A1 | 2/2014 | Rao et al. | |
| 2016/0083619 A1 * | 3/2016 | Anderson ............ | C09K 3/1012 523/457 |
| 2016/0152775 A1 | 6/2016 | Tobis et al. | |
| 2017/0114208 A1 | 4/2017 | Rao et al. | |
| 2017/0114259 A1 | 4/2017 | Virnelson et al. | |

FOREIGN PATENT DOCUMENTS

| | | |
|---|---|---|
| JP | 62-53354 | 3/1987 |
| WO | 2006086211 A1 | 8/2006 |
| WO | 2016/112297 A1 | 7/2016 |
| WO | 2016/205741 A1 | 12/2016 |

OTHER PUBLICATIONS

International Search Report and Written Opinion for PCT Application No. PCT/US2018/041151, dated Oct. 25, 2018, 10 pages.

* cited by examiner

*Primary Examiner* — Robert D Harlan
(74) *Attorney, Agent, or Firm* — William R. Lambert

(57) ABSTRACT

Compositions that are resistant to hydraulic fluid and aviation fuel contain sulfur-containing prepolymers and solvent-resistant organic fillers. The compositions are useful in aerospace sealant applications.

33 Claims, 3 Drawing Sheets

HYDRAULIC FLUID AND FUEL RESISTANT SEALANTS

This application is a continuation of U.S. application Ser. No. 15/644,587 filed on Jul. 7, 2017, now allowed, which is incorporated by reference in its entirety.

FIELD

The disclosure relates to sealants that are resistant to hydraulic fluid and aviation fuel. The sealants contain sulfur-containing prepolymers and solvent-resistant organic fillers.

BACKGROUND

Aerospace sealants based on sulfur-containing prepolymers can meet the performance requirements of many aerospace applications. However, as existing requirements continue to develop and new requirements are imposed there is a continuing need to develop new aerospace sealants. Solvent resistance is a standard requirement for aerospace sealants. It is important that the properties of an aerospace material such as an aerospace sealant be maintained above a certain threshold and not substantially degrade following exposure to fluids that the materials can come into contact during use such as hydraulic fluid and aviation fuel. Accelerated fluid resistance tests are used to evaluate the performance of a material. One typical performed test used to evaluate fuel resistance is described, for example, in AMS 3277. In this test a material sample is immersed in Jet Reference Fluid Type I (JRF Type I), which is a mixture of organic solvents, at a temperature of 60° C. for one week. Materials that maintain properties such as tensile strength, elongation, hardness, and adhesion above an acceptable threshold following JRF Type I immersion can be considered to be fuel resistant. Another requirement that is used to qualify aerospace sealants for certain applications is resistance to phosphate ester hydraulic fluid. Resistance to phosphate ester hydraulic fluid is more difficult to achieve. For example, a sealant that passes JRF Type I fuel resistance testing can dissolve when exposed to phosphate ester hydraulic fluids at 70° C. for extended periods of time.

SUMMARY

According to the present invention, compositions comprise: (a) from 35 wt % to 65 wt % of a thiol-terminated sulfur-containing prepolymer; (b) from 10 wt % to 35 wt % of an organic filler; (c) from 5 wt % to 30 wt % of an inorganic filler; and (d) from 5 wt % to 20 wt % of a polyepoxide, wherein wt % is based on the total weight of the composition.

According to the present invention, cured compositions are obtained from compositions according to the present invention.

According to the present invention, parts are sealed with the cured composition according to the present invention.

According to the present invention, sealant systems comprise a first part and a second part, wherein, the first part comprises: from 50 wt % to 70 wt % of a thiol-terminated sulfur-containing prepolymer; from 15 wt % to 40 wt % of an organic filler; from 2 wt % to 16 wt % of an inorganic filler, and from 0.5 wt % to 3 wt % of an adhesion promoter, wherein wt % is based on the total weight of the first part; and the second part comprises: from 35 wt % to 80 wt % of a polyepoxide; from 10 wt % to 50 wt % of an inorganic filler, and from 0.5 wt % to 10 wt % of an adhesion promoter, wherein wt % is based on the total weight of the second part.

According to the present invention, cured compositions are prepared from a sealant system according to the present invention.

According to the present invention, parts are sealed with the cured composition according to the present invention.

According to the present invention, methods of sealing a part comprise applying the composition according to the present invention to a part; and curing the applied composition to provide a sealed part.

According to the present invention, methods of sealing a part comprise combining the first part of the sealant system according to the present invention with the second part of the sealant system according to the present invention to provide a sealant composition; applying the sealant composition to a part; and curing the applied composition to provide a sealed part.

BRIEF DESCRIPTION OF THE DRAWINGS

The drawings described herein are for illustration purposes only. The drawings are not intended to limit the scope of the present disclosure.

DETAILED DESCRIPTION

Figure 1:
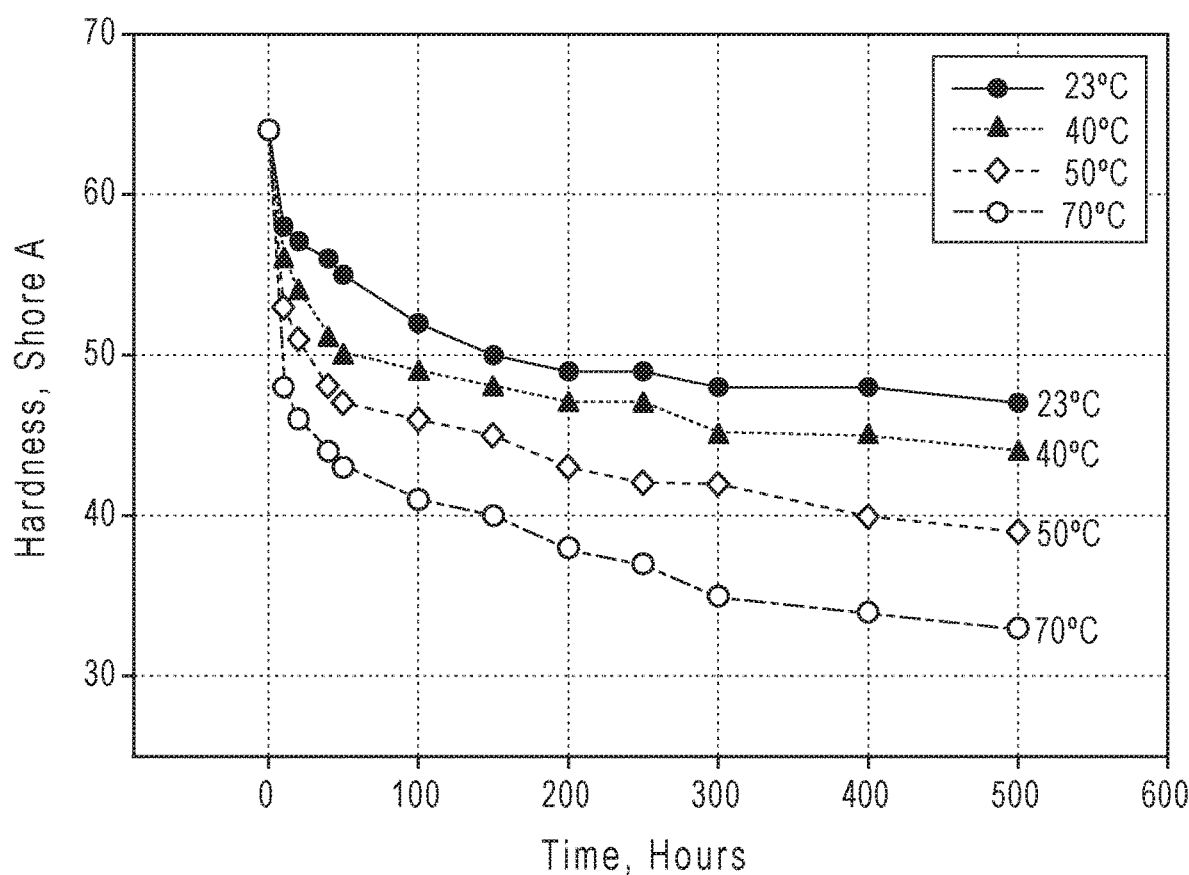
FIG. 1 is a graph showing the Shore A hardness of sealants provided by the present disclosure during Skydrol® LD-4 immersion.

For purposes of the following detailed description, it is to be understood that embodiments provided by the present disclosure may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about." Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

A dash ("—") that is not between two letters or symbols is used to indicate a point of bonding for a substituent or between two atoms. For example, —CONH$_2$ is attached through the carbon atom.

"Alkanediyl" refers to a diradical of a saturated, branched or straight-chain, acyclic hydrocarbon group, having, for example, from 1 to 18 carbon atoms ($C_{1-18}$), from 1 to 14 carbon atoms ($C_{1-14}$), from 1 to 6 carbon atoms ($C_{1-6}$), from 1 to 4 carbon atoms ($C_{1-4}$), or from 1 to 3 hydrocarbon atoms ($C_{1-3}$). It will be appreciated that a branched alkanediyl has a minimum of three carbon atoms. An alkanediyl can be $C_{2-14}$ alkanediyl, $C_{2-10}$ alkanediyl, $C_{2-8}$ alkanediyl, $C_{2-6}$ alkanediyl, $C_{2-4}$ alkanediyl, or $C_{2-3}$ alkanediyl. Examples of alkanediyl groups include methane-diyl (—CH$_2$—), ethane-1,2-diyl (—CH$_2$CH$_2$—), propane-1,3-diyl and iso-propane-1,2-diyl (e.g., —CH$_2$CH$_2$CH$_2$— and —CH(CH$_3$)CH$_2$—), butane-1,4-diyl (—CH$_2$CH$_2$CH$_2$CH$_2$—), pentane-1,5-diyl (—CH$_2$CH$_2$CH$_2$CH$_2$CH$_2$—), hexane-1,6-diyl (—CH$_2$CH$_2$CH$_2$CH$_2$CH$_2$CH$_2$—), heptane-1,7-diyl, octane-1,8-diyl, nonane-1,9-diyl, decane-1,10-diyl, and dodecane-1,12-diyl.

"Alkanecycloalkane" refers to a saturated hydrocarbon group having one or more cycloalkyl and/or cycloalkanediyl groups and one or more alkyl and/or alkanediyl groups, where cycloalkyl, cycloalkanediyl, alkyl, and alkanediyl are defined herein. Each cycloalkyl and/or cycloalkanediyl group(s) can be $C_{3-6}$, $C_{5-6}$, cyclohexyl or cyclohexanediyl. Each alkyl and/or alkanediyl group(s) can be $C_{1-6}$, $C_{1-4}$, $C_{1-3}$, methyl, methanediyl, ethyl, or ethane-1,2-diyl. An alkanecycloalkane group can be $C_{4-18}$ alkanecycloalkane, $C_{4-16}$ alkanecycloalkane, $C_{4-12}$ alkanecycloalkane, $C_{4-8}$ alkanecycloalkane, $C_{6-12}$ alkanecycloalkane, $C_{6-10}$ alkanecycloalkane, or $C_{6-9}$ alkanecycloalkane. Examples of alkanecycloalkane groups include 1,1,3,3-tetramethylcyclohexane and cyclohexylmethane.

"Alkanecycloalkanediyl" refers to a diradical of an alkanecycloalkane group. An alkanecycloalkanediyl group can be $C_{4-18}$ alkanecycloalkanediyl, $C_{4-16}$ alkanecycloalkanediyl, $C_{4-12}$ alkanecycloalkanediyl, $C_{4-8}$ alkanecycloalkanediyl, $C_{6-12}$ alkanecycloalkanediyl, $C_{6-10}$ alkanecycloalkanediyl, or $C_{6-9}$ alkanecycloalkanediyl. Examples of alkanecycloalkanediyl groups include 1,1,3,3-tetramethylcyclohexane-1,5-diyl and cyclohexylmethane-4,4'-diyl.

"Alkanearene" refers to a hydrocarbon group having one or more aryl and/or arenediyl groups and one or more alkyl and/or alkanediyl groups, where aryl, arenediyl, alkyl, and alkanediyl are defined here. Each aryl and/or arenediyl group(s) can be $C_{6-12}$, $C_{6-10}$, phenyl or benzenediyl. Each alkyl and/or alkanediyl group(s) can be $C_{1-6}$, $C_{1-4}$, $C_{1-3}$, methyl, methanediyl, ethyl, or ethane-1,2-diyl. An alkanearene group can be $C_{4-18}$ alkanearene, $C_{4-16}$ alkanearene, $C_{4-12}$ alkanearene, $C_{4-8}$ alkanearene, $C_{6-12}$ alkanearene, $C_{6-10}$ alkanearene, or $C_{6-9}$ alkanearene. Examples of alkanearene groups include diphenyl methane.

"Alkanearenediyl" refers to a diradical of an alkanearene group. An alkanearenediyl group is $C_{4-18}$ alkanearenediyl, $C_{4-16}$ alkanearenediyl, $C_{4-12}$ alkanearenediyl, $C_{4-8}$ alkanearenediyl, $C_{6-12}$ alkanearenediyl, $C_{6-10}$ alkanearenediyl, or $C_{6-9}$ alkanearenediyl. Examples of alkanearenediyl groups include diphenyl methane-4,4'-diyl.

"Alkenyl" group refers to the structure —CR=C(R)$_2$ where the alkenyl group is a terminal group and is bonded to a larger molecule. In such embodiments, each R may independently comprise, for example, hydrogen and $C_{1-3}$ alkyl. Each R can be hydrogen and an alkenyl group can have the structure —CH=CH$_2$.

"Alkoxy" refers to a —OR group where R is alkyl as defined herein. Examples of alkoxy groups include methoxy, ethoxy, n-propoxy, isopropoxy, and n-butoxy. An alkoxy group can be $C_{1-8}$ alkoxy, $C_{1-6}$ alkoxy, $C_{1-4}$ alkoxy, or $C_{1-3}$ alkoxy.

"Alkyl" refers to a monoradical of a saturated, branched or straight-chain, acyclic hydrocarbon group having, for example, from 1 to 20 carbon atoms, from 1 to 10 carbon atoms, from 1 to 6 carbon atoms, from 1 to 4 carbon atoms, or from 1 to 3 carbon atoms. It will be appreciated that a branched alkyl has a minimum of three carbon atoms. An alkyl group can be $C_{1-6}$ alkyl, $C_{1-4}$ alkyl, or $C_{1-3}$ alkyl. Examples of alkyl groups include methyl, ethyl, n-propyl, iso-propyl, n-butyl, iso-butyl, tert-butyl, n-hexyl, n-decyl, and tetradecyl. An alkyl group is $C_{1-6}$ alkyl, $C_{1-4}$ alkyl, and $C_{1-3}$ alkyl.

"Arenediyl" refers to diradical monocyclic or polycyclic aromatic group. Examples of arenediyl groups include benzene-diyl and naphthalene-diyl. An arenediyl group can be $C_{6-12}$ arenediyl, $C_{6-10}$ arenediyl, $C_{6-9}$ arenediyl, or benzene-diyl.

"Cycloalkanediyl" refers to a diradical saturated monocyclic or polycyclic hydrocarbon group. A cycloalkanediyl group can be $C_{3-12}$ cycloalkanediyl, $C_{3-8}$ cycloalkanediyl, $C_{3-6}$ cycloalkanediyl, or $C_{5-6}$ cycloalkanediyl. Examples of cycloalkanediyl groups include cyclohexane-1,4-diyl, cyclohexane-1,3-diyl and cyclohexane-1,2-diyl.

"Cycloalkyl" refers to a saturated monocyclic or polycyclic hydrocarbon mono-radical group. A cycloalkyl group can be $C_{3-12}$ cycloalkyl, $C_{3-8}$ cycloalkyl, $C_{3-6}$ cycloalkyl, or $C_{5-6}$ cycloalkyl.

"Heteroalkanediyl" refers to an alkanediyl group in which one or more of the carbon atoms are replaced with a heteroatom, such as N, O, S, or P. In a heteroalkanediyl, the one or more heteroatoms can comprise N or O.

"Heterocycloalkanediyl" refers to a cycloalkanediyl group in which one or more of the carbon atoms are replaced with a heteroatom, such as N, O, S, or P. In a heterocycloalkanediyl, the one or more heteroatoms can comprise N or O.

"Heteroarenediyl" refers to an arenediyl group in which one or more of the carbon atoms are replaced with a heteroatom, such as N, O, S, or P. In a heteroarenediyl, the one or more heteroatoms can comprise N or O.

"Substituted" refers to a group in which one or more hydrogen atoms are each independently replaced with the same or different substituent(s). A substituent can comprises halogen, —S(O)$_2$OH, —S(O)$_2$, —SH, —SR where R is $C_{1-6}$ alkyl, —COOH, —NO$_2$, —NR$_2$ where each R independently comprises hydrogen and $C_{1-3}$ alkyl, —CN, =O, $C_{1-6}$ alkyl, —CF$_3$, —OH, phenyl, $C_{2-6}$ heteroalkyl, $C_{5-6}$ heteroaryl, $C_{1-6}$ alkoxy, or —COR where R is $C_{1-6}$ alkyl. A substituent can be —OH, —NH$_2$, or $C_{1-3}$ alkyl.

"Formed from" or "prepared from" denotes open, e.g., comprising, claim language. As such, it is intended that a composition "formed from" or "prepared from" a list of recited components be a composition comprising at least the recited components or the reaction product of at least the recited components, and can further comprise other, non-recited components used to form or prepare the composition.

"Reaction product of" means chemical reaction product(s) of the recited reactants, and can include partial reaction products as well as fully reacted products and other reaction products that are present in a lesser amount.

As used herein, the term "cure" or "cured" as used in connection with a composition, e.g., "composition when cured" or a "cured composition", means that any curable or crosslinkable components of the composition are at least partially reacted or crosslinked.

The term "equivalent" refers to the number of functional reactive groups of the substance. "Equivalent weight" is effectively equal to the molecular weight of a substance, divided by the valence or number of functional reactive groups of the substance.

"Prepolymer" refers to oligomers, homopolymers, and copolymers. For thiol-terminated prepolymers, molecular weights are number average molecular weights "Mn" as determined by end group analysis using iodine titration. For prepolymers that are not thiol-terminated, the number average molecular weights are determined by gel permeation chromatography using polystyrene standards. A prepolymer such as a thiol-terminated sulfur-containing prepolymer provided by the present disclosure can be combined with a curing agent to provide a curable composition, which can cure to provide a cured polymer network. Prepolymers are liquid at room temperature (25° C.) and pressure (760 torr; 101 kPa).

A "curable composition" refers to a composition that comprises at least two reactants capable of reacting to form a cured composition. For example, a curable composition can comprise a thiol-terminated polythioether prepolymer and a polyepoxide capable of reacting to form a cured polymer. A curable composition may include a catalyst for the curing reaction and other components such as, for example, fillers, pigments, and adhesion promoters. A curable composition may be curable at room temperature, or may require exposure to elevated temperature such as a temperature above room temperature or other condition(s) to initiate and/or to accelerate the curing reaction. A curable composition may initially be provided as a two-part composition including, for example, a separate base component and an accelerator component. The base composition can contain one of the reactants participating in the curing reaction such as a thiol-terminated polythioether prepolymer and the accelerator component can contain the other reactant such as a polyepoxide. The two components can be mixed shortly before use to provide a curable composition. A curable composition can exhibit a viscosity suitable for a particular method of application. For example, a Class A sealant composition, which is suitable for brush-on applications, can be characterized by a viscosity from 1 poise to 500 poise (0.1 Pa-sec to 50 Pa-sec). A Class B sealant composition, which is suitable for fillet seal applications, can be characterized by a viscosity from 4,500 poise to 20,000 poise (450 Pa-sec to 2,000 Pa-sec). A Class C sealant composition, which is suitable for fay seal applications, can be characterized by a viscosity from 500 poise to 4,500 poise (50 Pa-sec to 450 Pa-sec). The viscosity of the compositions is measured as described herein. After the two components of a sealant system are combined and mixed, the curing reaction can proceed and the viscosity of the curable composition can increase and at some point will no longer be workable, as described herein. The duration between when the two components are mixed to form the curable composition and when the curable composition can no longer be reasonably or practically applied to a surface for its intended purpose can be referred to as the working time. As can be appreciated, the working time can depend on a number of factors including, for example, the curing chemistry, the catalyst used, the application method, and the temperature. Once a curable composition is applied to a surface (and during application), the curing reaction can proceed to provide a cured composition. A cured composition develops a tack-free surface, cures, and then fully cures over a period of time. A curable composition can be considered to be cured when the hardness of the surface is at least 30 Shore A for a Class B sealant or a Class C sealant. After a sealant has cured to a hardness of 30 Shore A it can take from several days to several weeks for a curable composition fully cure. A composition is considered fully cured when the hardness no longer increases. Depending on the formulation, a fully cured sealant can exhibit, for example, a hardness from 40 Shore A to 70 Shore A, determined according to ISO 868.

"Derived from" as in "a moiety derived from a compound" refers to a moiety that is generated upon reaction of a parent compound with a reactant. For example, a bis (alkenyl) compound $CH_2=CH-R-CH=CH_2$ can react with another compound such as two compounds having thiol groups to produce the moiety $-(CH_2)_2-R-(CH_2)_2-$ derived from the reaction.

"Derived from the reaction of —V with a thiol" refers to a moiety —V'— that results from the reaction of a thiol group with a moiety comprising a terminal group reactive with a thiol group. For example, a group V— can comprise $CH_2=CH-CH_2-O-$, where the terminal alkenyl group $CH_2=CH-$ is reactive with a thiol group —SH. Upon reaction with a thiol group, the moiety —V'— is $-CH_2-CH_2-CH_2-O-$.

A "core" of a compound or a polymer refers to the segment between the reactive terminal groups. For example, the core of a polythiol HS—R—SH will be —R—. A core of a compound or prepolymer can also be referred to as a backbone of a compound or a backbone of a prepolymer.

Specific gravity and density of compositions and sealants is determined according to ISO 2781.

Specific gravity and density of fillers is determined according to ISO 787 (Part 10).

Shore A hardness is measured using a Type A durometer in accordance with ISO 868.

Tensile strength and elongation are measured according to ISO 37.

Glass transition temperature $T_g$ is determined by Dynamic Mass Analysis (DMA) using a TA Instruments Q800 apparatus with a frequency of 1 Hz, an amplitude of 20 microns, and a temperature ramp of −80° C. to 25° C., with the $T_g$ identified as the peak of the tan 6 curve.

Skydrol® is a fire-resistant hydraulic fluid based on phosphate ester chemistry. Skydrol® fluids include Skydrol® 500B-4, Skydrol® LD-4, Skydrol® 5, and Skydrol® PE-5 are commercially available from Eastman Chemical Company.

Reference is now made to certain compounds, compositions, and methods of the present invention. The disclosed compounds, compositions, and methods are not intended to be limiting of the claims. To the contrary, the claims are intended to cover all alternatives, modifications, and equivalents.

Compositions provided by the present disclosure can comprise a thiol-terminated sulfur-containing prepolymer, an organic filler, an inorganic filler, a polyepoxide curing agent, and optionally an adhesion promoter. A composition can be formulated as a sealant, such as an aerospace sealant, and in particular a Skydrol® resistant and fuel resistant aerospace sealant.

Compositions and sealant formulations provided by the present disclosure can comprise a thiol-terminated sulfur-containing prepolymer such as a thiol-terminated polythioether prepolymer, a thiol-terminated polysulfide prepolymer, a thiol-terminated sulfur-containing polyformal prepolymer, a thiol-terminated monosulfide prepolymer, or a combination of any of the foregoing.

A thiol-terminated sulfur-containing prepolymer can comprise a thiol-terminated polythioether or a thiol-terminated sulfur-containing prepolymer can comprise a thiol-terminated polysulfide prepolymer. A thiol-terminated sulfur-containing prepolymer may comprise a mixture of different thiol-terminated polythioether prepolymers and/or thiol-terminated polysulfide prepolymers, and the thiol-terminated polythioether prepolymers and/or thiol-terminated polysulfide prepolymers may have the same or different functionality.

A thiol-terminated sulfur-containing prepolymer can have an average functionality from 2 to 6, from 2 to 4, from 2 to 3, from 2.3 to 2.8, or from 2.05 to 2.5. For example, a thiol-terminated sulfur-containing prepolymer can comprise a difunctional thiol-terminated sulfur-containing prepolymer, a trifunctional thiol-terminated sulfur-containing prepolymer, and a combination thereof. A sulfur-containing prepolymer can comprise a thiol-terminated sulfur-containing polyformal prepolymer. A sulfur-containing prepolymer can comprise a thiol-terminated monosulfide prepolymer.

Compositions and sealants provided by the present disclosure can comprise, for example, from 35 wt % to 65 wt %, from 40 wt % to 60 wt %, from 43 wt % to 57 wt %, or from 46 wt % to 54 wt % of a thiol-terminated sulfur-containing prepolymer or combination of thiol-terminated sulfur-containing prepolymers, such as a thiol-terminated polythioether prepolymer or combination of thiol-terminated polythioether prepolymers.

A sulfur-containing prepolymer can comprise a thiol-terminated polythioether. Examples of suitable thiol-terminated polythioether prepolymers are disclosed, for example, in U.S. Pat. No. 6,172,179, which is incorporated by reference in its entirety. A thiol-terminated polythioether prepolymer can comprise Permapol® P3.1E, Permapol® L56086, or a combination thereof, each of which is available from PPG Aerospace, Sylmar, Calif.

A thiol-terminated polythioether prepolymer can comprise a thiol-terminated polythioether prepolymer comprising at least one moiety having the structure of Formula (1):

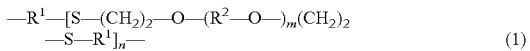

(1)

where,
each $R^1$ is independently selected from a $C_{2-10}$ n-alkanediyl group, a $C_{3-6}$ branched alkanediyl group, a $C_{6-8}$ cycloalkanediyl group, a $C_{6-10}$ alkanecycloalkanediyl group, a divalent heterocyclic group, and a —[(CHR$^3$)$_p$—X—]$_q$(CHR$^3$)$_r$— group, wherein each $R^3$ is selected from hydrogen and methyl;
each $R^2$ is independently selected from a $C_{2-10}$ n-alkanediyl group, a $C_{3-6}$ branched alkanediyl group, a $C_{6-8}$ cycloalkanediyl group, a $C_{6-14}$ alkanecycloalkanediyl group, a divalent heterocyclic group, and a —[(CH$_2$)$_p$—X—]$_q$(CH$_2$)$_r$— group;
each X is independently is selected from O, S, and NR, wherein R is selected from hydrogen and methyl;
m ranges from 0 to 50;
n is an integer ranging from 1 to 60;
p is an integer ranging from 2 to 6;
q is an integer ranging from 1 to 5; and
r is an integer ranging from 2 to 10.

In prepolymers of Formula (1), $R^1$ can be —[(CHR$^3$)$_p$—X—]$_q$(CHR$^3$)$_r$— wherein each X can independently be is selected from O and S. In prepolymers of Formula (1), $R^1$ can be —[(CHR$^3$)$_p$—X—]$_q$(CHR$^3$)$_r$—, each X can be O or each X can be S.

In prepolymers of Formula (1), $R^1$ can be —[(CH$_2$)$_p$—X—]$_q$(CH$_2$)$_r$— wherein each X can independently be selected from O and S. In prepolymers of Formula (1), $R^1$ can be —[(CH$_2$)$_p$—X—]$_q$(CH$_2$)$_r$—, each X can be O or each X can be S.

In prepolymers of Formula (1), $R^1$ can be —[(CH$_2$)$_p$—X—]$_q$(CH$_2$)$_r$—, where p can be 2, X can be O, q can be 2, r can be 2, $R^2$ can be ethanediyl, m can be 2, and n can be 9.

In prepolymers of Formula (1), each $R^1$ can be derived from 1,8-dimercapto-3,6-dioxaoctane (DMDO), each $R^1$ can be derived from dimercaptodiethylsulfide (DMDS), or a combination thereof.

In prepolymers of Formula (1), each m can independently be an integer from 1 to 3. Each m can be the same and can be 1, 2, or 3.

In prepolymers of Formula (1), n can be an integer from 1 to 30, an integer from 1 to 20, an integer from 1 to 10, or an integer from 1 to 5. In addition, n may be any integer from 1 to 60.

In prepolymers of Formula (1), each p can independently be 2, 3, 4, 5, and 6. Each p can be the same and can be 2, 3, 4, 5, or 6.

In prepolymers of Formula (1), each q can independently be 1, 2, 3, 4, or 5. Each q can be the same and can be 1, 2, 3, 4, or 5.

In prepolymers of Formula (1), each r can independently be 2, 3, 4, 5, 6, 7, 8, 9, or 10.

In prepolymers of Formula (1), each r can be the same and can be 2, 3, 4, 5, 6, 7, 8, 9, or 10.

In prepolymers of Formula (1), each r can independently be an integer from 2 to 4, from 2 to 6, or from 2 to 8.

In prepolymers of Formula (1), each $R^2$ can independently be selected from a $C_{2-10}$ n-alkanediyl group, a $C_{3-6}$ branched alkanediyl group, and a —[(CH$_2$)(CH$_2$)$_p$—X—]$_q$(CH$_2$)$_r$— group.

In prepolymers of Formula (1), each $R^2$ can independently be a $C_{2-10}$ n-alkanediyl group.

In prepolymers of Formula (1), each $R^2$ can independently comprise a —[(CH$_2$)$_p$—X—]$_q$(CH$_2$)$_r$— group, where each X can be O or S.

A thiol-terminated polythioether prepolymer can comprise a thiol-terminated polythioether prepolymer of Formula (1a), a thiol-terminated polythioether prepolymer of Formula (1b), a thiol-terminated polythioether prepolymer of Formula (1c), or a combination of any of the foregoing:

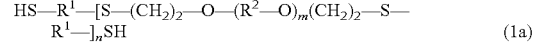

(1a)

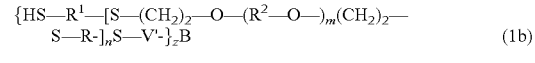

(1b)

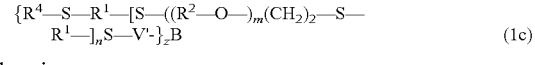

(1c)

wherein,
each $R^1$ is independently selected from $C_{2-10}$ alkanediyl, $C_{6-8}$ cycloalkanediyl, $C_{6-14}$ alkanecycloalkanediyl, $C_{5-8}$ heterocycloalkanediyl, and —[(CHR$^3$)$_p$—X—]$_q$(CHR$^3$)$_r$—, wherein,
p is an integer from 2 to 6;
q is an integer from 1 to 5;
r is an integer from 2 to 10;
each $R^3$ is independently selected from hydrogen and methyl; and each X is independently selected from O, S, and NR, wherein R is selected from hydrogen and methyl;

each $R^2$ is independently selected from $C_{1-10}$ alkanediyl, $C_{6-8}$ cycloalkanediyl, $C_{6-14}$ alkanecycloalkanediyl, and $-[(CHR^3)_p-X-]_q(CHR^3)_r-$, wherein p, q, r, $R^3$, and X are as defined as for $R^1$;

m is an integer from 0 to 50;

n is an integer from 1 to 60;

B represents a core of a z-valent, polyfunctionalizing agent $B(-V)_z$ wherein, z is an integer from 3 to 6; and each V is a moiety comprising a terminal group reactive with a thiol;

each $-V'-$ is derived from the reaction of $-V$ with a thiol; and each $R^4$ independently comprises hydrogen or a bond to the polyfunctionalizing agent $B(-V)_z$ through a moiety of Formula (1).

In prepolymers of Formula (1a)-(1c), $R^1$ can be $-[(CH_2)_p-X-]_q(CH_2)_r-$, where p can be 2, X can be O, q can be 2, r can be 2, $R^2$ can be ethanediyl, m can be 2, and n can be 9.

In prepolymers of Formula (1a)-(1c), $R^1$ can be selected from $C_{2-6}$ alkanediyl and $-[(CHR^3)_p-X-]_q(CHR^3)_r-$.

In prepolymers of Formula (1a)-(1c), $R^1$ can be $-[(CHR^3)_p-X-]_q(CHR^3)_r-$, X can be O or X can be S.

In prepolymers of Formula (1a)-(1c), where $R^1$ can be $-[(CHR^3)_p-X-]_q(CHR^3)_r$, p can be 2, r can be 2, q can be 1, and X can be S; or wherein p can be 2, q can be 2, r can be 2, and X can be O; or p can be 2, r can be 2, q can be 1, and X can be O.

In prepolymers of Formula (1a)-(1c), $R^1$ can be $-[(CHR^3)_p-X-]_q(CHR^3)_r-$, and each $R^3$ can be hydrogen or at least one $R^3$ can be methyl.

In prepolymers of Formula (1a)-(1c), each $R^1$ can be the same, or at least one R1 can be different.

In prepolymers of Formula (1a)-(1c), each m can be independently an integer from 1 to 3. Each m can be the same and is can be 1, 2, or 3.

In prepolymers of Formula (1a)-(1c), n can be an integer from 1 to 30, an integer from 1 to 20, an integer from 1 to 10, or an integer from 1 to 5. The variable n may be any integer from 1 to 60.

In prepolymers of Formula (1a)-(1c), each p can independently be 2, 3, 4, 5, and 6. Each p can be the same and can be 2, 3, 4, 5, or 6.

In prepolymers of Formula (1a)-(1c), each q can independently be 1, 2, 3, 4, or 5. Each q can be the same and can be 1, 2, 3, 4, or 5.

In prepolymers of Formula (1a)-(1c), each r can independently be 2, 3, 4, 5, 6, 7, 8, 9, or 10.

In prepolymers of Formula (1a)-(1c), each r can independently be an integer from 2 to 4, from 2 to 6, or from 2 to 8.

Various methods can be used to prepare thiol-terminated polythioether prepolymers of Formula (1)-(1c). Examples of suitable thiol-terminated polythioether prepolymers, and methods for their production, are described in U.S. Pat. No. 6,172,179. Such thiol-terminated polythioether prepolymers may be difunctional, that is, linear prepolymers having two terminal thiol groups, or can be polyfunctional, that is, branched prepolymers having three or more terminal thiol groups.

A thiol-terminated polythioether prepolymer may comprise a mixture of different thiol-terminated polythioether prepolymers and the thiol-terminated polythioether prepolymers may have the same or different functionality. A thiol-terminated polythioether prepolymer or combination of thiol-terminated polythioether prepolymers can have an average functionality, for example, from 2 to 6, from 2 to 4, from 2 to 3, from 2.05 to 2.8, or from 2.05 to 2.5. For example, a thiol-terminated polythioether prepolymer can comprise a difunctional thiol-terminated polythioether prepolymer, a trifunctional thiol-terminated polythioether prepolymer, or a combination thereof.

A thiol-terminated polythioether prepolymer can be prepared by reacting a polythiol and a diene such as a divinyl ether, and the respective amounts of the reactants used to prepare the polythioethers can be chosen to yield terminal thiol groups. Thus, in some cases, (n or >n, such as n+1) moles of a polythiol, such as a dithiol or a mixture of at least two different dithiols and 0.05 moles to 1 moles, such as from 0.1 moles to 0.8 moles, of a thiol-terminated polyfunctionalizing agent may be reacted with (n) moles of a diene, such as a divinyl ether, or a combination of at least two different dienes, such as a combination of two different divinyl ethers. A thiol-terminated polyfunctionalizing agent can be present in the reaction mixture in an amount sufficient to provide a thiol-terminated polythioether prepolymer having an average thiol functionality, for example, from 2.05 to 3, such as from 2.1 to 2.8, or from 2.1 to 2.6.

A reaction used to prepare a thiol-terminated polythioether prepolymer may be catalyzed by a free radical catalyst. Suitable free radical catalysts include azo compounds, for example, azobisnitrile compounds such as azo(bis)isobutyronitrile (AIBN); organic peroxides, such as benzoyl peroxide and tert-butyl peroxide; and inorganic peroxides, such as hydrogen peroxide. The reaction can also be effected by irradiation with ultraviolet light either with or without a radical initiator/photosensitizer. Ionic catalysis methods, using either inorganic or organic bases, e.g., triethylamine, may also be used.

Suitable thiol-terminated polythioether prepolymers may be produced by reacting a divinyl ether or combination of divinyl ethers with an excess of dithiol or combination of dithiols.

A thiol-terminated polythioether prepolymer can comprise the reaction product of reactants comprising:

(a) a dithiol of Formula (2):

$$HS-R^1-SH \quad (2)$$

wherein, $R^1$ is selected from $C_{2-6}$ alkanediyl, $C_{6-8}$ cycloalkanediyl, $C_{6-10}$ alkanecycloalkanediyl, $C_{5-8}$ heterocycloalkanediyl, and $-[(CHR^3)_p-X-]_q(CHR^3)_r$;

wherein, each $R^3$ is independently selected from hydrogen and methyl;

each X is independently selected from $-O-$, $-S-$, and $-NR-$ wherein R is selected from hydrogen and methyl;

p is an integer from 2 to 6;

q is an integer from 1 to 5; and r is an integer from 2 to 10; and (b) a divinyl ether of Formula (3):

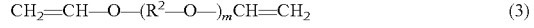

$$CH_2=CH-O-(R^2-O-)_mCH=CH_2 \quad (3)$$

wherein, each $R^2$ is independently selected from $C_{1-10}$ alkanediyl, $C_{6-8}$ cycloalkanediyl, $C_{6-14}$ alkanecycloalkanediyl, and $-[(CHR^3)_p-X-]_q(CHR^3)_r-$, wherein p, q, r, $R^3$, and X are as defined above; and m is an integer from 0 to 50.

The reactants can further comprise (c) a polyfunctional compound such as a polyfunctional compound B(—V)$_z$, where B, —V, and z are as defined herein.

In dithiols of Formula (2), R$^1$ can be —[(CHR$^3$)$_p$—X—]$_q$(CHR$^3$)$_r$—.

In dithiols of Formula (2), X can be selected from O and S, and thus —[(CHR$^3$)$_p$—X—]$_q$(CHR$^3$)$_r$ in Formula (2) can be —[(CHR$^3$)$_p$—O—]$_q$(CHR$^3$)$_r$— or —[(CHR$^3$)$_p$—S—]$_q$(CHR$^3$)$_r$—. P and r can be equal, such as where p and r can be both two.

In dithiols of Formula (2), R$^1$ can be selected from C$_{2-6}$ alkanediyl and —[(CHR$^3$)$_p$—X—]$_q$(CHR$^3$)$_r$—.

In dithiols of Formula (2), R$^1$ can be —[(CHR$^3$)$_p$—X—]$_q$(CHR$^3$)$_r$—, and X can be O, or X can be S.

In dithiols of Formula (2) where R$^1$ can be —[(CHR$^3$)$_p$—X—]$_q$(CHR$^B$)$_r$—, p can be 2, r can be 2, q can be 1, and X can be S; or p can be 2, q can be 2, r can be 2, and X can be O; or p can be 2, r can be 2, q can be 1, and X can be O.

In dithiols of Formula (2) where R$^1$ can be —[(CHR$^3$)$_p$—X—]$_q$(CHR$^3$)$_r$—, each R$^3$ can be hydrogen, or at least one R$^3$ can be methyl.

In dithiols of Formula (2), each R$^1$ can be derived from 1,8-dimercapto-3,6-dioxaoctane (DMDO; 2,2-(ethane-1,2-diylbis(sulfanyl))bis(ethan-1-thiol)), or each R$^1$ can be derived from dimercaptodiethylsulfide (DMDS; 2,2'-thiobis(ethan-1-thiol)), and combinations thereof.

In dithiols of Formula (2), each p can independently be selected from 2, 3, 4, 5, and 6. Each p can be the same and can be 2, 3, 4, 5, or 6.

In dithiols of Formula (2) each q can independently be 1, 2, 3, 4, or 5. Each q can be the same and can be 1, 2, 3, 4, or 5.

In dithiols of Formula (2), each r can independently be 2, 3, 4, 5, 6, 7, 8, 9, or 10. Each r can be the same and can be 2, 3, 4, 5, 6, 7, 8, 9, or 10.

In dithiols of Formula (2), each r can independently be an integer from 2 to 4, from 2 to 6, or from 2 to 8.

In divinyl ethers of Formula (3), each m can be independently an integer from 1 to 3. Each m can be the same and is can be 1, 2, or 3.

In divinyl ethers of Formula (3), each R$^2$ can independently be selected from a C$_{1-10}$ n-alkanediyl group, a C$_{3-6}$ branched alkanediyl group, and a —[(CH$_2$)$_p$—X—]$_q$(CH$_2$)$_r$— group.

In divinyl ethers of Formula (3), each R$^2$ can independently be a C$_{2-10}$ n-alkanediyl group.

In divinyl ethers of Formula (3), each R$^2$ can independently be a —[(CH$_2$)$_p$—X—]$_q$(CH$_2$)$_r$— group, where each X can be O or S.

In divinyl ethers of Formula (3), each R$^2$ can independently be a —[(CH$_2$)$_p$—X—]$_q$(CH$_2$)$_r$— group, where each X can be O or S, and each p can independently be 2, 3, 4, 5, and 6.

In divinyl ethers of Formula (3), each p can be the same and can be 2, 3, 4, 5, or 6.

In divinyl ethers of Formula (3), each R$^2$ can independently be a —[(CH$_2$)$_p$—X—]$_q$(CH$_2$)$_r$— group, where each X can be O or S, and each q can independently be 1, 2, 3, 4, or 5.

In divinyl ethers of Formula (3), each q can be the same and can be 1, 2, 3, 4, or 5.

In divinyl ethers of Formula (3), each R$^2$ can independently be a —[(CH$_2$)$_p$—X—]$_q$(CH$_2$)$_r$— group, where each X can be O or S, and each r can independently be 2, 3, 4, 5, 6, 7, 8, 9, or 10.

In divinyl ethers of Formula (3), each r can be the same and can be 2, 3, 4, 5, 6, 7, 8, 9, or 10. In divinyl ethers of Formula (3), each r can independently be an integer from 2 to 4, from 2 to 6, or from 2 to 8.

Dithiols suitable for use in preparing thiol-terminated polythioether prepolymers include those having the structure of Formula (2):

$$HS-R^1-SH \quad (3)$$

wherein, R$^1$ is selected from C$_{2-6}$ alkanediyl, C$_{6-8}$ cycloalkanediyl, C$_{6-10}$ alkanecycloalkanediyl, C$_{5-8}$ heterocycloalkanediyl, and —[(CHR$^3$)$_p$—X—]$_q$(CHR$^3$)$_r$—; wherein, each R$^3$ is independently selected from hydrogen and methyl; each X is independently selected from O, S, and NR wherein R is selected from hydrogen and methyl; p is an integer from 2 to 6; q is an integer from 1 to 5; and r is an integer from 2 to 10.

Examples of suitable dithiols include 1,2-ethanedithiol, 1,2-propanedithiol, 1,3-propanedithiol, 1,3-butanedithiol, 1,4-butanedithiol, 2,3-butanedithiol, 1,3-pentanedithiol, 1,5-pentanedithiol, 1,6-hexanedithiol, 1,3-dimercapto-3-methylbutane, dipentenedimercaptan, ethylcyclohexyldithiol (ECHDT), dimercaptodiethylsulfide, methyl-substituted dimercaptodiethylsulfide, dimethyl-substituted dimercaptodiethylsulfide, dimercaptodioxaoctane, 1,5-dimercapto-3-oxapentane, and a combination of any of the foregoing.

A dithiol may have one or more pendent groups comprising a lower (e.g., C$_{1-6}$) alkyl group, a lower alkoxy group, or a hydroxyl group. Suitable alkyl pendent groups include, for example, C$_{1-6}$ linear alkyl, C$_{3-6}$ branched alkyl, cyclopentyl, and cyclohexyl.

Other examples of suitable dithiols include dimercaptodiethylsulfide (DMDS) (in Formula (2), R$^1$ is —[(CH$_2$)$_p$—X—]$_q$(CH$_2$)$_r$—, wherein p is 2, r is 2, q is 1, and X is S); dimercaptodioxaoctane (DMDO) (in Formula (2), R$^1$ is —[(CH$_2$)$_p$—X—]$_q$(CH$_2$)$_r$—, wherein p is 2, q is 2, r is 2, and X is O); and 1,5-dimercapto-3-oxapentane (in Formula (2), R$^1$ is —[(CH$_2$)$_p$—X—]$_q$(CH$_2$)$_r$—, wherein p is 2, r is 2, q is 1, and X is O). It is also possible to use dithiols that include both heteroatoms in the carbon backbone and pendent alkyl groups, such as methyl groups. Such dithiols include, for example, methyl-substituted DMDS, such as HS—CH$_2$CH(CH$_3$)—S—CH$_2$CH$_2$—SH, HS—CH(CH$_3$)CH$_2$—S—CH$_2$CH$_2$—SH and dimethyl substituted DMDS, such as HS—CH$_2$CH(CH$_3$)—S—CH(CH$_3$)CH$_2$—SH and HS—CH(CH$_3$)CH$_2$—S—CH$_2$CH(CH$_3$)—SH.

Suitable divinyl ethers for preparing thiol-terminated polythioether prepolymers include, for example, divinyl ethers of Formula (3):

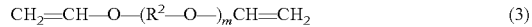

$$CH_2=CH-O-(R^2-O-)_mCH=CH_2 \quad (3)$$

where each R$^2$ is independently selected from C$_{1-10}$ alkanediyl, C$_{6-8}$ cycloalkanediyl, C$_{6-14}$ alkanecycloalkanediyl, and —[(CHR$^3$)$_p$—X—]$_q$(CHR$^3$)$_r$—, where each R$^3$ can independently be selected from hydrogen and methyl; each X can independently be selected from O, S, and NR wherein R can be selected from hydrogen and methyl; p can be an integer from 2 to 6; q can be an integer from 1 to 5; and r can be an integer from 2 to 10.

Suitable divinyl ethers include, for example, compounds having at least one oxyalkanediyl group —R$^2$—O—, such as from 1 to 4 oxyalkanediyl groups, i.e., compounds in which m in Formula (3) is an integer ranging from 1 to 4. The variable m in Formula (3) can be an integer ranging from 2 to 4. It is also possible to employ commercially available divinyl ether mixtures that are characterized by a non-integral average value for the number of oxyalkanediyl units per molecule. Thus, m in Formula (3) can also take on rational number values ranging from 0 to 10.0, such as from 1.0 to 10.0, from 1.0 to 4.0, or from 2.0 to 4.0.

Examples of suitable vinyl ethers include ethylene glycol divinyl ether (EG-DVE) ($R^2$ in Formula (4) is ethanediyl and m is 1), butanediol divinyl ether (BD-DVE) ($R^2$ in Formula (4) is butanediyl and m is 1), hexanediol divinyl ether (HD-DVE) ($R^2$ in Formula (4) is hexanediyl and m is 1), diethylene glycol divinyl ether (DEG-DVE) ($R^2$ in Formula (4) is ethanediyl and m is 2), triethylene glycol divinyl ether ($R^2$ in Formula (4) is ethanediyl and m is 3), tetraethylene glycol divinyl ether ($R^2$ in Formula (3) is ethanediyl and m is 4), cyclohexanedimethanol divinyl ether, polytetrahydrofuryl divinyl ether; trivinyl ether monomers, such as trimethylolpropane trivinyl ether; tetrafunctional ether monomers, such as pentaerythritol tetravinyl ether; and combinations of two or more such polyvinyl ether monomers. A polyvinyl ether may have one or more pendent groups which can comprise alkyl groups, hydroxyl groups, alkoxy groups, or amine groups.

Divinyl ethers in which $R^2$ in Formula (3) is $C_{3-6}$ branched alkanediyl may be prepared by reacting a polyhydroxyl compound with acetylene. Examples of divinyl ethers of this type include compounds in which $R^2$ in Formula (3) is an alkyl-substituted methanediyl group such as $CH(-CH_3)$, or an alkyl-substituted ethanediyl.

Two or more types of divinyl ethers of Formula (3) may be used. Thus, two dithiols of Formula (2) and one divinyl ethers of Formula (3), one dithiol of Formula (2) and two divinyl ethers of Formula (3), two dithiols of Formula (2) and two divinyl ethers of Formula (3), and more than two compounds of one or both Formula (2) and Formula (3), may be used to produce a variety of thiol-terminated polythioethers prepolymers.

The divinyl ether(s) can comprise, for example, from 20 mole percent to less than 50 mole percent of the reactants used to prepare a thiol-terminated polythioether prepolymer, or 30 mole percent to less than 50 mole percent.

Relative amounts of dithiols and divinyl ethers can be selected to yield polythioether prepolymers having terminal thiol groups. Thus, a dithiol of Formula (2) or a mixture of at least two different dithiols of Formula (2), can be reacted with of a divinyl ether of Formula (3) or a mixture of at least two different divinyl ethers of Formula (3) in relative amounts such that the molar ratio of thiol groups to alkenyl groups is greater than 1:1, such as from 1.1:1.0 to 2.0:1.0.

The reaction between dithiols and divinyl ethers and/or polythiols and polyvinyl ethers may be catalyzed by a free radical catalyst, an ionic catalyst, or ultraviolet radiation. Suitable free radical catalysts include, for example, azo compounds, for example azobisnitriles such as azo(bis) isobutyronitrile (AIBN); organic peroxides such as benzoyl peroxide and t-butyl peroxide; and inorganic peroxides such as hydrogen peroxide. In certain reactions, the catalyst does not comprise acidic or basic compounds, and does not produce acidic or basic compounds upon decomposition. Examples of suitable free-radical catalysts include azo-type catalysts, such as Vazo®-57 (Du Pont), Vazo®-64 (Du Pont), Vazo®-67 (Du Pont), V-70® (Wako Specialty Chemicals), and V-65B® (Wako Specialty Chemicals). Examples of other suitable free-radical catalysts include alkyl peroxides, such as t-butyl peroxide. The reaction may also be effected by irradiation with ultraviolet light either with or without a cationic photo-initiating moiety.

Thiol-terminated polythioether prepolymers provided by the present disclosure may be prepared by combining at least one dithiol of Formula (2) and at least one divinyl ether of Formula (3) followed by addition of an appropriate catalyst, and carrying out the reaction at a temperature, for example, within a range from 30° C. to 120° C., such as 70° C. to 90° C., for a duration, for example, within a range from 2 hours to 24 hours, such as 2 hours to 6 hours.

Thiol-terminated polythioether prepolymers may comprise a polyfunctional polythioether prepolymer, i.e., may have an average thiol functionality greater than 2.0. Suitable polyfunctional thiol-terminated polythioether prepolymers include, for example, those having the structure of Formula (1b), the structure of Formula (1c), or a combination thereof:

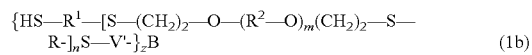

(1b)

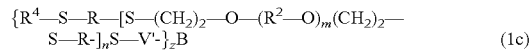

(1c)

wherein z has an average value of greater than 2.0, such as an average value within a range from 2 and 3, an average value within a range from 2.1 to 2.8, an average value within a range from 2 and 4, an average value within a range from 3 and 6, or an average value within a range from 3 to 6.

In prepolymers of Formula (1c), each $R^4$ can independently comprise hydrogen or a bond to a polyfunctionalizing agent $B(V)_z$. In prepolymers of Formula (1c), each $R^4$ can independently be hydrogen or can be bonded polyfunctionalizing agent $B(V)_z$ through a moiety of Formula (1).

Polyfunctionalizing agents suitable for use in preparing such polyfunctional thiol-terminated prepolymers include tri-functionalizing agents, that is, compounds where z is 3. Suitable tri-functionalizing agents include, for example, triallyl cyanurate (TAC), 1,2,3-propanetrithiol, isocyanurate-containing trithiols, and combinations thereof, as disclosed in U.S. Application Publication No. 2010/0010133, which is incorporated by reference in its entirety; and isocyanurates as disclosed, for example, in U.S. Pat. No. 7,858,703, which is incorporated by reference in its entirety. Other useful polyfunctionalizing agents include trimethylolpropane trivinyl ether, and the polythiols described in U.S. Pat. Nos. 4,366,307; 4,609,762; and 5,225,472, each of which is incorporated by reference in its entirety. Mixtures of polyfunctionalizing agents may also be used. As a result, polythioether prepolymers provided by the present disclosure may have a wide range of average functionality. For example, trifunctionalizing agents may afford average functionalities of groups capable of reacting with thiol groups from 2.05 to 2.9, such as from 2.1 to 2.6. Wider ranges of average functionality may be achieved by using tetrafunctional or higher functionality polyfunctionalizing agents. Functionality may also be determined by factors such as stoichiometry, as will be understood by those skilled in the art.

Thiol-terminated polythioether prepolymers provided by the present disclosure are liquid at room temperature and can have a glass transition temperature $T_g$, for example, less than −20° C., less than −30° C., or less than −40° C., where the glass transition temperature $T_g$ is determined by Dynamic Mass Analysis (DMA) using a TA Instruments Q800 apparatus with a frequency of 1 Hz, an amplitude of 20 microns, and a temperature ramp of −80° C. to 25° C., with the $T_g$ identified as the peak of the tan δ curve.

Thiol-terminated polythioether prepolymers can exhibit a viscosity, for example, within a range from 20 poise to 500 poise (2 Pa-sec to 50 Pa-sec), from 20 poise to 200 poise (2 Pa-sec to 20 Pa-sec) or from 40 poise to 120 poise 4 Pa-sec to 12 Pa-sec), measured using a Brookfield CAP 2000 viscometer, with a No. 6 spindle, at speed of 300 rpm, and a temperature of 25° C. Thiol-terminated polythioether prepolymers provided by the present disclosure can be characterized by a number average molecular weight and/or a molecular weight distribution. Polythioether prepolymers can exhibit a number average molecular weight, for example, from 500 Daltons to 20,000 Daltons, from 2,000 Daltons to 5,000 Daltons, or from 1,000 Daltons to 4,000 Daltons. Thiol-terminated polythioether prepolymers can exhibit a polydispersity (Mw/Mn; weight average molecular weight/number average molecular weight), for example, from 1 to 20, or from 1 to 5. The backbone of a thiol-terminated polythioether prepolymer provided by the present disclosure can be modified to improve the properties such as adhesion, tensile strength, elongation, UV resistance, hardness, and/or flexibility of sealants and coatings prepared using polythioether prepolymers. For example, adhesion promoting groups, antioxidants, metal ligands, and/or urethane linkages can be incorporated into the backbone of a polythioether prepolymer to improve one or more performance attributes. Examples of backbone-modified polythioether prepolymers are disclosed, for example, in U.S. Pat. No. 8,138,273 (urethane containing), U.S. Pat. No. 9,540,540 (sulfone-containing), U.S. Pat. No. 8,952,124 (bis(sulfonyl)alkanol-containing), U.S. Pat. No. 9,382,642 (metal-ligand containing), U.S. Application Publication No. 2017/0114208 (antioxidant-containing), U.S. Provisional Application No. 62/417,848 filed on Nov. 4, 2016 (sulfur-containing divinyl ether), and U.S. Provisional Application No. 62/372,158 filed on Aug. 8, 2016 (urethane-containing), each of which is incorporated by reference in its entirety.

A thiol-terminated sulfur-containing prepolymer can comprise a thiol-terminated sulfur-containing polyformal. Sulfur-containing polyformal prepolymers useful in aerospace sealant applications are disclosed, for example, in U.S. Pat. No. 8,729,216 and in U.S. Pat. No. 8,541,513, each of which is incorporated by reference in its entirety.

A thiol-terminated sulfur-containing prepolymer can comprise a thiol-terminated sulfur-containing polyformal comprising a moiety of Formula (4):

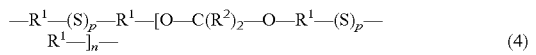

$$-R^1-(S)_p-R^1-[O-C(R^2)_2-O-R^1-(S)_p-R^1-]_n- \quad (4)$$

where n is an integer from 1 to 50; each p is independently selected from 1 and 2; each $R^1$ can be $C_{2-6}$ alkanediyl; and each $R^2$ can independently be selected from hydrogen, $C_{1-6}$ alkyl, $C_{7-12}$ phenylalkyl, substituted $C_{7-12}$ phenylalkyl, $C_{6-12}$ cycloalkylalkyl, substituted $C_{6-12}$ cycloalkylalkyl, $C_{3-12}$ cycloalkyl, substituted $C_{3-12}$ cycloalkyl, $C_{6-12}$ aryl, and substituted $C_{6-12}$ aryl.

A thiol-terminated sulfur-containing polyformal prepolymer can have the structure of Formula (4a):

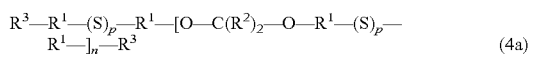

$$R^3-R^1-(S)_p-R^1-[O-C(R^2)_2-O-R^1-(S)_p-R^1-]_n-R^3 \quad (4a)$$

where n is an integer from 1 to 50; each p is independently selected from 1 and 2; each $R^1$ is $C_{2-6}$ alkanediyl; each $R^2$ is independently selected from hydrogen, $C_{1-6}$ alkyl, $C_{7-12}$ phenylalkyl, substituted $C_{7-12}$ phenylalkyl, $C_{6-12}$ cycloalkylalkyl, substituted $C_{6-12}$ cycloalkylalkyl, $C_{3-12}$ cycloalkyl, substituted $C_{3-12}$ cycloalkyl, $C_{6-12}$ aryl, and substituted $C_{6-12}$ aryl; and each $R^3$ comprises a thiol-terminated group.

In sulfur-containing polyformal prepolymers of Formula (4) and Formula (4a), each $R^1$ can independently be selected from $C_{2-6}$ alkanediyl, $C_{2-4}$ alkanediyl, $C_{2-3}$ alkanediyl, and ethane-1,2-diyl. In sulfur-containing polyformal prepolymers of Formula (4), each $R^1$ can be ethane-1,2-diyl.

In sulfur-containing polyformal prepolymers of Formula (4) and Formula (4a), each $R^2$ can independently be selected from hydrogen, $C_{1-6}$ alkyl, $C_{1-4}$ alkyl, $C_{1-3}$ alkyl, and $C_{1-2}$ alkyl. In sulfur-containing polyformal prepolymers of Formula (4), each $R^2$ can be selected from hydrogen, methyl, and ethyl.

In sulfur-containing polyformal prepolymers of Formula (4) and Formula (4a), each $R^1$ is the same and can be selected from $C_{2-3}$ alkanediyl such as ethane-1,2-diyl and propane-1,3-diyl; and each $R^2$ is the same and can be selected from hydrogen and $C_{1-3}$ alkyl such as methyl, ethyl, or propyl. In sulfur-containing polyformal prepolymers of Formula (4) and Formula (4a), each $R^1$ can be ethane-1,2-diyl. In sulfur-containing polyformal prepolymers of Formula (4) and Formula (4a), each $R^2$ can be hydrogen. In sulfur-containing polyformal prepolymers of Formula (4) and Formula (4a), each $R^1$ can be ethane-1,2-diyl and each $R^2$ can be hydrogen.

In sulfur-containing polyformal prepolymers of Formula (4) and Formula (4a), n can be an integer selected from 1 to 50, an integer from 2 to 40, an integer from 4 to 30, or n can be an integer from 7 to 30.

In sulfur-containing polyformal prepolymers of Formula (4) and Formula (4a), each p is the same and can be 1, and each p is the same and can be 2.

In sulfur-containing polyformal prepolymers of Formula (4) and Formula (4a) can have a number average molecular weight from 200 Daltons to 6,000 Daltons, from 500 Daltons to 5,000 Daltons, from 1,000 Daltons to 5,000 Daltons, from 1,500 Daltons to 4000 Daltons, or from 2,000 Daltons to 3,600 Daltons.

In sulfur-containing polyformal prepolymers of Formula (4a), each $R^3$ can be a thiol-terminated group and can be a group of Formula (a), Formula (b), Formula (c), Formula (d), Formula (e), or Formula (f):

$$HS-R^7-R^6-O- \quad (a)$$

$$HS-R^7-O- \quad (b)$$

$$HS-R^7-NH-C(=O)-O- \quad (c)$$

$$HS-R^7-C(=O)-O-R^9-NH-C(=O)-O- \quad (d)$$

$$HS-R^7-C(=O)-NH-R^9-NH-C(=O)-O- \quad (e)$$

$$HS-R^7-C(=O)-O- \quad (f)$$

where each $R^6$ comprises a moiety derived from a diisocyanate or a moiety derived from an ethylenically unsaturated monoisocyanate; each $R^7$ can be selected from $C_{2-14}$ alkanediyl and $C_{2-14}$ heteroalkanediyl; and each $R^9$ can be selected from $C_{2-6}$ alkanediyl, $C_{2-6}$ heteroalkanediyl, $C_{6-12}$ arenediyl, substituted $C_{6-12}$ arenediyl, $C_{6-12}$ heteroarenediyl, substituted $C_{6-12}$ heteroarenediyl, $C_{3-12}$ cycloalkanediyl, substituted $C_{3-12}$ cycloalkanediyl, $C_{3-12}$ heterocycloalkanediyl, substituted $C_{3-12}$ heterocycloalkanediyl, $C_{7-18}$ alkanearenediyl, substituted $C_{7-18}$ heteroalkanearenediyl, $C_{4-18}$ alkanecycloalkanediyl, and substituted $C_{4-18}$ alkanecycloalkanediyl.

Sulfur-containing polyformal prepolymers provided by the present disclosure can have the structure of Formula (4b):

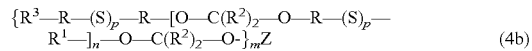

$$\{R^3-R-(S)_p-R-[O-C(R^2)_2-O-R-(S)_p-R^1-]_n-O-C(R^2)_2-O-\}_mZ \quad (4b)$$

where each n is an integer selected from 1 to 50; m is an integer selected from 3 to 6; p is independently selected from 1 and 2; each $R^1$ can independently be $C_{2-6}$ alkanediyl; each $R^2$ can independently be selected from hydrogen, $C_{1-6}$ alkyl, $C_{7-12}$ phenylalkyl, substituted $C_{7-12}$ phenylalkyl, $C_{6-12}$ cycloalkylalkyl, substituted $C_{6-12}$ cycloalkylalkyl, $C_{3-12}$ cycloalkyl, substituted $C_{3-12}$ cycloalkyl, $C_{6-12}$ aryl, and substituted $C_{6-12}$ aryl; each $R^3$ comprises a thiol-terminated group; and Z is derived from the core of an m-valent parent polyol $Z(OH)_m$.

In sulfur-containing polyformal prepolymers of Formula (4b), each $R^1$ can independently be selected from $C_{2-6}$ alkanediyl, $C_{2-4}$ alkanediyl, $C_{2-3}$ alkanediyl, and ethane-1,2-diyl. In sulfur-containing polyformal prepolymers of Formula (4b), each $R^1$ can be ethane-1,2-diyl.

In sulfur-containing polyformal prepolymers of Formula (4b), each $R^2$ can independently be selected from hydrogen, $C_{1-6}$ alkyl, $C_{1-4}$ alkyl, $C_{1-3}$ alkyl, and $C_{1-2}$ alkyl. In sulfur-containing polyformal prepolymers of Formula (4b), each $R^2$ can be selected from hydrogen, methyl, and ethyl.

In sulfur-containing polyformal prepolymers of Formula (4b), each $R^1$ can be the same and can be selected from $C_{2-3}$ alkanediyl such as ethane-1,2-diyl or propane-1,3-diyl; and each $R^2$ is the same and can be selected from hydrogen and $C_{1-3}$ alkyl such as methyl, ethyl, or propyl. In sulfur-containing polyformal prepolymers of Formula (4b), each $R^1$ can be ethane-1,2-diyl. In sulfur-containing polyformal prepolymers of Formula (4b), each $R^2$ can be hydrogen. In sulfur-containing polyformal prepolymers of Formula (4b), each $R^1$ can be ethane-1,2-diyl and each $R^2$ can be hydrogen.

In sulfur-containing polyformal prepolymers of Formula (4b), m can be 1, m can be 2, m can be 3, m can be 4, m can be 5, or m can be 6.

In sulfur-containing polyformal prepolymers of Formula (4b) where m is 3, the parent polyol $Z(OH)_m$ is a triol of Formula (5):

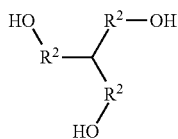
(5)

where each $R^2$ is independently $C_{1-6}$ alkanediyl, or a triol of Formula (6):

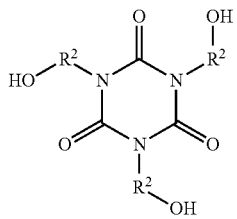
(6)

where each $R^2$ is independently $C_{1-6}$ alkanediyl. Accordingly, in these embodiments Z can have the structure of Formula (7a) or Formula (7b):

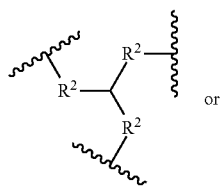
(7a)

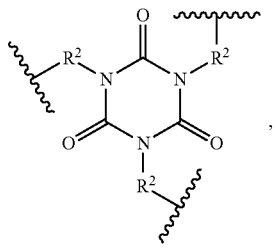
(7b)

respectively, where each $R^2$ is independently $C_{1-6}$ alkanediyl.

In sulfur-containing polyformal prepolymers of Formula (4b), each n is an integer selected from 1 to 50, an integer selected from 2 to 40, an integer selected from 4 to 30, or an integer selected from 7 to 30.

In sulfur-containing polyformal prepolymers of Formula (4b), each p is the same and is 1, and each p is the same and is 2.

In sulfur-containing polyformal prepolymers of Formula (4b) has a number average molecular weight from 200 Daltons to 6,000 Daltons, from 500 Daltons to 5,000 Daltons, from 1,000 Daltons to 5,000 Daltons, from 1,500 Daltons to 4000 Daltons, or from 2,000 Daltons to 3,600 Daltons.

In sulfur-containing polyformal prepolymers of Formula (4b), $R^3$ can be bonded to a polyfunctionalizing agent $B(V)_z$ through a moiety of Formula (4).

In sulfur-containing polyformal prepolymers of Formula (4b), each $R^3$ can be the same.

In sulfur-containing polyformal prepolymers of Formula (4b), each $R^3$ can comprise a thiol-terminated group of Formula (a), Formula (b), Formula (c), Formula (d), Formula (e), or Formula (f):

 (a)

 (b)

 (c)

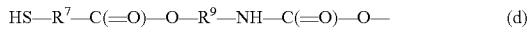 (d)

 (e)

 (f)

where each $R^6$ comprises a moiety derived from a diisocyanate or a moiety derived from an ethylenically unsaturated monoisocyanate; each $R^7$ can be selected from $C_{2-14}$ alkanediyl and $C_{2-14}$ heteroalkanediyl; and each $R^9$ can be selected from $C_{2-6}$ alkanediyl, $C_{2-6}$ heteroalkanediyl, $C_{6-12}$ arenediyl, substituted $C_{6-12}$ arenediyl, $C_{6-12}$ heteroarenediyl, substituted $C_{6-12}$ heteroarenediyl, $C_{3-12}$ cycloalkanediyl, substituted $C_{3-12}$ cycloalkanediyl, $C_{3-12}$ heterocycloalkanediyl, substituted $C_{3-12}$ heterocycloalkanediyl, $C_{7-18}$ alkanearenediyl, substituted $C_{7-18}$ heteroalkanearenediyl, $C_{4-18}$ alkanecycloalkanediyl, and substituted $C_{4-18}$ alkanecycloalkanediyl.

A thiol-terminated sulfur-containing prepolymer can comprise a thiol-terminated monosulfide.

A thiol-terminated monosulfide prepolymer can comprise a thiol-terminated monosulfide prepolymer comprising a moiety of Formula (8):

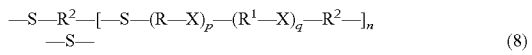 (8)

wherein, each R can independently be selected from $C_{2-10}$ alkanediyl, such as $C_{2-6}$ alkanediyl; $C_{2-10}$ branched alkanediyl, such as $C_{3-6}$ branched alkanediyl or a $C_{3-6}$ branched alkanediyl having one or more pendant groups which can be, for example, alkyl groups, such as methyl or ethyl groups; $C_{6-8}$ cycloalkanediyl; $C_{6-14}$ alkylcycloalkyanediyl, such as $C_{6-10}$ alkylcycloalkanediyl; and $C_{8-10}$ alkylarenediyl;

each $R^1$ can independently be selected from hydrogen, $C_{1-10}$ n-alkanediyl, such as $C_{1-6}$ n-alkanediyl, $C_{2-10}$ branched alkanediyl, such as $C_{3-6}$ branched alkanediyl having one or more pendant groups which can be, for example, alkyl groups, such as methyl or ethyl groups; $C_{6-8}$ cycloalkanediyl; $C_{6-14}$ alkylcycloalkanediyl, such as $C_{6-10}$ alkylcycloalkanediyl; and $C_{8-10}$ alkylarenediyl;

each $R^2$ can independently be selected from hydrogen, $C_{1-10}$ n-alkanediyl, such as $C_{1-6}$ n-alkanediyl, $C_{2-10}$ branched alkanediyl, such as $C_{3-6}$ branched alkanediyl having one or more pendant groups which can be, for example, alkyl groups, such as methyl or ethyl groups; $C_{6-8}$ cycloalkanediyl group; $C_{6-14}$ alkylcycloalkanediyl, such as a $C_{6-10}$ alkylcycloalkanediyl; and $C_{8-10}$ alkylarenediyl; each X can independently be selected from O or S;

p is an integer from 1 to 5;

q is an integer from 0 to 5; and n is an integer from 1 to 60, such as from 2 to 60, from 3 to 60, or from 25 to 35.

In thiol-terminated monosulfide prepolymers of Formula (8), each X can independently be selected from S, O, and $NR^3$, where $R^3$ comprises $C_{1-4}$ alkyl; p is an integer from 1 to 5; q is an integer from 0 to 5; n is an integer from 1 to 60; each R can independently be selected from $C_{2-10}$ alkanediyl, $C_{6-8}$ cycloalkanediyl, $C_{1-4}$ alkylcycloalkanediyl, and $C_{8-10}$ alkylarenediyl; each $R^1$ can independently be selected from $C_{1-10}$ alkanediyl, $C_{6-8}$ cycloalkanediyl, $C_{1-4}$ alkylcycloalkanediyl, and $C_{8-10}$ alkylarenediyl; and each $R^2$ can independently be selected from $C_{2-10}$ alkanediyl, $C_{8-10}$ cycloalkanediyl, $C_{1-4}$ alkylcycloalkanediyl, and $C_{8-10}$ alkylarenediyl.

A thiol-terminated monosulfide prepolymer can comprise a thiol-terminated monosulfide prepolymer of Formula (8a), a thiol-terminated monosulfide prepolymer of Formula (8b), a thiol-terminated monosulfide prepolymer of Formula (8c), or a combination of any of the foregoing:

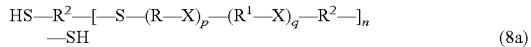

(8a)

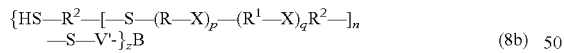

(8b)

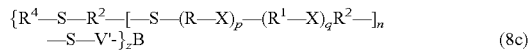

(8c)

wherein, each R can independently be selected from $C_{2-10}$ alkanediyl, such as $C_{2-6}$ alkanediyl; $C_{2-10}$ branched alkanediyl, such as $C_{3-6}$ branched alkanediyl or a $C_{3-6}$ branched alkanediyl having one or more pendant groups which can be, for example, alkyl groups, such as methyl or ethyl groups; $C_{6-8}$ cycloalkanediyl; $C_{6-14}$ alkylcycloalkyanediyl, such as $C_{6-10}$ alkylcycloalkanediyl; and $C_{8-10}$ alkylarenediyl;

each $R^1$ can independently be selected from hydrogen, $C_{1-10}$ n-alkanediyl, such as $C_{1-6}$ n-alkanediyl, $C_{2-10}$ branched alkanediyl, such as $C_{3-6}$ branched alkanediyl having one or more pendant groups which can be, for example, alkyl groups, such as methyl or ethyl groups; $C_{6-8}$ cycloalkanediyl; $C_{6-14}$ alkylcycloalkanediyl, such as $C_{6-10}$ alkylcycloalkanediyl; and $C_{8-10}$ alkylararenediyl;

each $R^2$ can independently be selected from hydrogen, $C_{1-10}$ n-alkanediyl, such as $C_{1-6}$ n-alkanediyl, $C_{2-10}$ branched alkanediyl, such as $C_{3-6}$ branched alkanediyl having one or more pendant groups which can be, for example, alkyl groups, such as methyl or ethyl groups; $C_{6-8}$ cycloalkanediyl group; $C_{6-14}$ alkylcycloalkanediyl, such as a $C_{6-10}$ alkylcycloalkanediyl; and $C_{8-10}$ alkylararenediyl;

each X can independently be selected from O and S;

p is an integer from 1 to 5;

q is an integer from 0 to 5; and n is an integer from 1 to 60, such as from 2 to 60, from 3 to 60, or from 25 to 35 and B represents a core of a z-valent polyfunctionalizing agent $B(-V)_z$ wherein:

z is an integer from 3 to 6; and each V is a moiety comprising a terminal group reactive with a thiol group;

each —V'— is derived from the reaction of —V with a thiol; and each $R^4$ is independently selected from hydrogen and a bond to a polyfunctionalizing agent $B(-V)_z$ through a moiety of Formula (8).

In thiol-terminated monosulfide prepolymers of Formula (8)-(8c):

each X can independently be selected from S, O, and $NR^3$, where $R^3$ be selected from $C_{1-4}$ alkyl;

p is an integer from 1 to 5;

q is an integer from 0 to 5;

n is an integer from 1 to 60;

each R can independently be selected from $C_{2-10}$ alkanediyl, $C_{6-8}$ cycloalkanediyl, $C_{1-4}$ alkylcycloalkanediyl, and $C_{8-10}$ alkylarenediyl;

each $R^1$ can independently be selected from $C_{1-10}$ alkanediyl, $C_{6-8}$ cycloalkanediyl, $C_{1-4}$ alkylcycloalkanediyl, and $C_{8-10}$ alkylarenediyl;

each $R^2$ can independently be selected from $C_{2-10}$ alkanediyl, $C_{6-8}$ cycloalkanediyl, $C_{1-4}$ alkylcycloalkanediyl, and $C_{8-10}$ alkylarenediyl;

B represents a core of a z-valent polyfunctionalizing agent $B(-V)_z$ wherein:

z is an integer from 3 to 6; and each V is a moiety comprising a terminal group reactive with a thiol group;

each —V'— is derived from the reaction of —V with a thiol; and each $R^4$ is independently selected from hydrogen and a bond to a polyfunctionalizing agent $B(-V)_z$ through a moiety of Formula (8).

In thiol-terminated monosulfide prepolymers of Formula (8)-(8c), each X can independently be S or O, each X can be S, or each X can be O.

In thiol-terminated monosulfide prepolymers of Formula (8)-(8c), p can be an integer from 2 to 6, or p can be 1, 2, 3, 4, 5, or 6.

In thiol-terminated monosulfide prepolymers of Formula (8)-(8c), q can be an integer from 1 to 5, q can be an integer from 2 to 5, or q can be 0, 1, 2, 3, 4, or 5.

In thiol-terminated monosulfide prepolymers of Formula (8)-(8c), n can be an integer from 2 to 60, from 3 to 60, or from 25 to 35.

In thiol-terminated monosulfide prepolymers of Formula (8)-(8c), each R can independently be selected from $C_{2-10}$ alkanediyl and $C_{6-8}$ cycloalkanediyl, each R can be $C_{2-10}$ alkanediyl, or each R can be $C_{6-8}$ cycloalkanediyl.

In thiol-terminated monosulfide prepolymers of Formula (8)-(8c), each R can be selected from $C_{2-6}$ alkanediyl, $C_{2-4}$ alkanediyl, $C_{3-10}$ alkanediyl, and $C_{3-6}$ alkanediyl.

In thiol-terminated monosulfide prepolymers of Formula (8)-(8c), each R can be selected from ethanediyl, 1,3-propanediyl, 1,2-propanediyl, 1,4-butanediyl, and 1,3-butanediyl.

In thiol-terminated monosulfide prepolymers of Formula (8)-(8c), each $R^1$ can independently be selected from $C_{1-10}$ alkanediyl and $C_{6-8}$ cycloalkanediyl, each R can be $C_{1-10}$ alkanediyl, or each $R^1$ can be $C_{6-8}$ cycloalkanediyl.

In thiol-terminated monosulfide prepolymers of Formula (8)-(8c), each $R^1$ can be selected from $C_{1-6}$ alkanediyl, $C_{1-4}$ alkanediyl, $C_{2-10}$ alkanediyl, and $C_{2-6}$ alkanediyl.

In thiol-terminated monosulfide prepolymers of Formula (8)-(8c), each $R^1$ can be selected from methanediyl, ethanediyl, 1,3-propanediyl, 1,2-propanediyl, 1,4-butanediyl, and 1,3-butanediyl.

In thiol-terminated monosulfide prepolymers of Formula (8)-(8c), each $R^2$ can independently be selected from $C_{2-10}$ alkanediyl and $C_{6-8}$ cycloalkanediyl, each $R^2$ can be $C_{2-10}$ alkanediyl, or each $R^2$ can be $C_{6-8}$ cycloalkanediyl.

In thiol-terminated monosulfide prepolymers of Formula (8)-(8c), each $R^2$ can be selected from $C_{2-6}$ alkanediyl, $C_{2-4}$ alkanediyl, $C_{3-10}$ alkanediyl, and $C_{3-6}$ alkanediyl.

In thiol-terminated monosulfide prepolymers of Formula (8)-(8c), each $R^2$ can be selected from ethanediyl, 1,3-propanediyl, 1,2-propanediyl, 1,4-butanediyl, and 1,3-butanediyl.

In thiol-terminated monosulfides of Formula (8)-(8c), p can be 1 or 2, q can be 1 or 2, n can be an integer from 1 to 60 or an integer from 25 to 35, each X can be O or S, each R can be $C_{2-4}$ alkanediyl, each $R^1$ can be $C_{1-4}$ alkanediyl, and each $R^2$ can be $C_{2-4}$ alkanediyl.

In thiol-terminated monosulfide prepolymers of Formula (8)-(8c), p can be 1 or 2, q can be 1 or 2, n can be an integer from 1 to 60 or an integer from 25 to 35, each X can be O or S, each R can be $C_2$ alkanediyl, each $R^1$ can be $C_1$ alkanediyl, and each $R^2$ can be $C_2$ alkanediyl.

In thiol-terminated monosulfide prepolymers of Formula (8)-(8c), p can be 1 or 2, q can be 1 or 2, n can be an integer from 1 to 60 or an integer from 25 to 35, each X can be O, each R can be $C_2$ alkanediyl, each $R^1$ can be $C_1$ alkanediyl, and each $R^2$ can be $C_2$ alkanediyl.

In thiol-terminated monosulfide prepolymers of Formula (8)-(8c), $B(-V)_z$ can be selected from 1,2,3-trichloropropane, 1,1,1-tris(chloromethyl)propane, 1,1,1-tris(chloromethyl)ethane, 1,3,5-tris(chloromethyl)benzene, and a combination of any of the foregoing.

In thiol-terminated monosulfide prepolymers of Formula (8c) each $R^4$ can independently selected from hydrogen and a bond to a polyfunctionalizing agent $B(V)_z$ through a moiety of Formula (10). In thiol-terminated monosulfide prepolymer can have an average thiol functionality, for example, from 2.05 to 2.9, such as from 2.1 to 2.8, or from 2.2 to 2.6.

Thiol-terminated monosulfide prepolymers of Formula (8)-(8c) can be prepared by reacting an α,ω-dihalo organic compounds, a metal hydrosulfide, a metal hydroxide, and an optional polyfunctionalizing agent. Examples of suitable α,ω-dihalo organic compounds include bis(2-chloroethyl) formal. Examples of suitable metal hydrosulfides and metal hydroxides include sodium hydrosulfide and sodium hydroxide. Examples of suitable polyfunctionalizing agents include 1,2,3-trichloropropane, 1,1,1-tris(chloromethyl)propane, 1,1,1-tris(chloromethyl)ethane, and 1,3,5-tris(chloromethyl)benzene. Methods of synthesizing thiol-terminated monosulfide prepolymers of Formula (8)-(8c) are disclosed, for example, in U.S. Pat. No. 7,875,666, which is incorporated by reference in its entirety.

A thiol-terminated monosulfide prepolymers can comprise a thiol-terminated monosulfide prepolymer comprising a moiety of Formula (9):

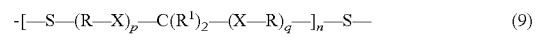

$$-[-S-(R-X)_p-C(R^1)_2-(X-R)_q-]_n-S- \quad (9)$$

wherein, each R can independently be selected from $C_{2-10}$ alkanediyl, such as $C_{2-6}$ alkanediyl; a $C_{3-10}$ branched alkanediyl, such as a $C_{3-6}$ branched alkanediyl or a $C_{3-6}$ branched alkanediyl having one or more pendant groups which can be, for example, alkyl groups, such as methyl or ethyl groups; a $C_{6-8}$ cycloalkanediyl; a $C_{6-14}$ alkylcycloalkyanediyl, such as a $C_{6-10}$ alkylcycloalkanediyl; and a $C_{8-10}$ alkylarenediyl;

each $R^1$ can independently be selected from hydrogen, $C_{1-10}$ n-alkanediyl, such as a $C_{1-6}$ n-alkanediyl, $C_{3-10}$ branched alkanediyl, such as a $C_{3-6}$ branched alkanediyl having one or more pendant groups which can be, for example, alkyl groups, such as methyl or ethyl groups; a $C_{6-8}$ cycloalkanediyl group; a $C_{6-14}$ alkylcycloalkanediyl, such as a $C_{6-10}$ alkylcycloalkanediyl; and a $C_{8-10}$ alkylarenediyl; each X can independently be selected from O and S;

p is an integer from 1 to 5;

q is an integer from 1 to 5; and n is an integer from 1 to 60, such as from 2 to 60, from 3 to 60, or from 25 to 35.

A thiol-terminated monosulfide prepolymer can comprise a thiol-terminated monosulfide prepolymer of Formula (9a), a thiol-terminated monosulfide prepolymer of Formula (9b), a thiol-terminated monosulfide prepolymer of Formula (9c), or a combination of any of the foregoing:

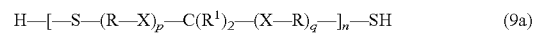

$$H-[-S-(R-X)_p-C(R^1)_2-(X-R)_q-]_n-SH \quad (9a)$$

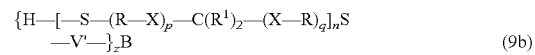

$$\{H-[-S-(R-X)_p-C(R^1)_2-(X-R)_q-]_nS-V'-\}_zB \quad (9b)$$

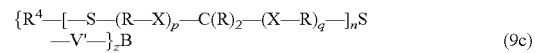

$$\{R^4-[-S-(R-X)_p-C(R)_2-(X-R)_q-]_nS-V'-\}_zB \quad (9c)$$

wherein, each R can independently be selected from $C_{2-10}$ alkanediyl, such as $C_{2-6}$ alkanediyl; a $C_{3-10}$ branched alkanediyl, such as a $C_{3-6}$ branched alkanediyl or a $C_{3-6}$ branched alkanediyl having one or more pendant groups which can be, for example, alkyl groups, such as methyl or ethyl groups; a $C_{6-8}$ cycloalkanediyl; a $C_{6-14}$ alkylcycloalkyanediyl, such as a $C_{6-10}$ alkylcycloalkanediyl; and a $C_{8-10}$ alkylarenediyl;

each $R^1$ can independently be selected from hydrogen, $C_{1-10}$ n-alkanediyl, such as a $C_{1-6}$ n-alkanediyl, $C_{3-10}$ branched alkanediyl, such as a $C_{3-6}$ branched alkanediyl having one or more pendant groups which can be, for example, alkyl groups, such as methyl or ethyl groups; a $C_{6-8}$ cycloalkanediyl group; a $C_{6-14}$ alkylcycloalkanediyl, such as a $C_{6-10}$ alkylcycloalkanediyl; and a $C_{8-10}$ alkylarenediyl;

each X can independently be selected from O and S;

p is an integer from 1 to 5;

q is an integer from 1 to 5;

n is an integer from 1 to 60, such as from 2 to 60, from 3 to 60, or from 25 to 35;

B represents a core of a z-valent polyfunctionalizing agent B(—V)$_z$ wherein:
z is an integer from 3 to 6; and
each V is a moiety comprising a terminal group reactive with a thiol group;
each —V'— is derived from the reaction of —V with a thiol; and
each R$^4$ is independently selected from hydrogen and a bond to a polyfunctionalizing agent B(—V)$_z$ through a moiety of Formula (9).

In thiol-terminated monosulfide prepolymers of Formula (9)-(9c) each X can independently be selected from S and O; p is an integer from 1 to 5; q is an integer from 1 to 5; n is an integer from 1 to 60; each R can independently be C$_{2-10}$ alkanediyl; each R$^1$ can independently be selected from hydrogen and C$_{1-10}$ alkanediyl; B represents a core of a z-valent polyfunctionalizing agent B(—V)$_z$ wherein: z is an integer from 3 to 6; and each V is a moiety comprising a terminal group reactive with a thiol group; each —V'— is derived from the reaction of —V with a thiol; and each R$^4$ is independently hydrogen or is bonded to a polyfunctionalizing agent B(—V)$_z$ through a moiety of Formula (9).

In thiol-terminated monosulfide prepolymers of Formula (9)-(9c), each X can be S, or each X can be O.

In thiol-terminated monosulfide prepolymers of Formula (9)-(9c), p can be an integer from 2 to 5, or q can be 1, 2, 3, 4, or 5.

In thiol-terminated monosulfide prepolymers of Formula (9)-(9c), p can be an integer from 2 to 5, or q can be 1, 2, 3, 4, or 5.

In thiol-terminated monosulfide prepolymers of Formula (9)-(9c), n can be an integer from 2 to 60, from 3 to 60, or from 25 to 35.

In thiol-terminated monosulfide prepolymers of Formula (9)-(9c), each R can independently be selected from C$_{2-6}$ alkanediyl and C$_{2-4}$ alkanediyl.

In thiol-terminated monosulfide prepolymers of Formula (9)-(9c), each R can be selected from ethanediyl, 1,3-propanediyl, 1,2-propanediyl, 1,4-butanediyl, and 1,3-butanediyl.

In thiol-terminated monosulfide prepolymers of Formula (9)-(9c), each R can be selected from C$_{2-10}$ n-alkanediyl, C$_{2-10}$ branched alkanediyl, and a combination thereof.

In thiol-terminated monosulfide prepolymers of Formula (9)-(9c), each R$^1$ can independently be selected from hydrogen and C$_{2-6}$ alkanediyl.

In thiol-terminated monosulfide prepolymers of Formula (9)-(9c), each R$^1$ can independently be selected from hydrogen, ethanediyl, 1,3-propanediyl, 1,2-propanediyl, 1,4-butanediyl, and 1,3-butanediyl.

In thiol-terminated monosulfide prepolymers of Formula (9)-(9c), each R$^1$ can be selected from C$_{1-10}$ n-alkanediyl, C$_{1-10}$ branched alkanediyl, and a combination thereof.

In thiol-terminated monosulfide prepolymers of Formula (9)-(9c), each X is O, p is 1 or 2, q is 1 or 2, n is 1 to 60 such as 2 to 60, each R is C$_{2-4}$ alkanediyl such as ethanediyl, and each R$^1$ is hydrogen.

In thiol-terminated monosulfide prepolymers of Formula (9)-(9c), each X is O, p is 1, q is 1, n is 1 to 60 such as 2 to 60, each R is C$_{2-4}$ alkanediyl such as ethanediyl, and each R$^1$ is hydrogen.

In thiol-terminated monosulfide prepolymers of Formula (9)-(9c), each X is O, p is 2, q is 2, n is 1 to 60 such as 2 to 60, each R is C$_{2-4}$ alkanediyl such as ethanediyl, and each R$^1$ is hydrogen.

In thiol-terminated monosulfide prepolymers of Formula (9)-(9c), B(—V)$_z$ can be selected from 1,2,3-trichloropropane, 1,1,1-tris(chloromethyl)propane, 1,1,1-tris(chloromethyl)ethane, 1,3,5-tris(chloromethyl)benzene, and a combination of any of the foregoing.

Thiol-terminated monosulfide prepolymers of Formula (9)-*9c) can be prepared by reacting an α,ω-dihalo organic compounds, a metal hydrosulfide, a metal hydroxide, and an optional polyfunctionalizing agent. Examples of suitable α,ω-dihalo organic compounds include bis(2-chloroethyl)formal. Examples of suitable metal hydrosulfides and metal hydroxides include sodium hydrosulfide and sodium hydroxide. Examples of suitable polyfunctionalizing agents include 1,2,3-trichloropropane, 1,1,1-tris(chloromethyl)propane, 1,1,1-tris(chloromethyl)ethane, and 1,3,5-tris(chloromethyl)benzene. Methods of synthesizing thiol-terminated monosulfides of Formula (9)-(9c) are disclosed, for example, in U.S. Pat. No. 8,466,220, which is incorporated by reference in its entirety.

Thiol-terminated monosulfide prepolymers can have a number average molecular weight within a range from 300 Daltons to 10,000 Daltons, such as within a range 1,000 Daltons to 8,000 Daltons, where the molecular weight is determined by gel-permeation chromatography using a polystyrene standard. Thiol-terminated monosulfide prepolymers can have a glass transition temperature T$_g$ less than −40° C., less than −55° C., or less than −60° C. The glass transition temperature T$_g$ is determined by Dynamic Mass Analysis (DMA) using a TA Instruments Q800 apparatus with a frequency of 1 Hz, an amplitude of 20 microns, and a temperature ramp of −80° C. to 25° C., with the T$_g$ identified as the peak of the tan δ curve.

A thiol-terminated sulfur-containing prepolymer can comprise a thiol-terminated polysulfide prepolymer. A polysulfide prepolymer refers to a prepolymer that contains one or more polysulfide linkages, i.e., —S$_x$— linkages, where x is from 2 to 4, in the prepolymer backbone and/or in pendant positions on the prepolymer chain. A polysulfide prepolymer can have two or more sulfur-sulfur linkages. Suitable polysulfides are commercially available, for example, from AkzoNobel and Toray Industries, Inc. under the names Thioplast® and from Thiokol-LP®, respectively.

Examples of suitable polysulfide prepolymers are disclosed, for example, in U.S. Pat. Nos. 4,623,711; 6,172,179; 6,509,418; 7,009,032; and 7,879,955, each of which is incorporated by reference in its entirety.

Examples of suitable thiol-terminated polysulfides include Thioplast™ G polysulfides such as Thioplast™ Gi, Thioplast™ G4, Thioplast™ G10, Thioplast™ G12, Thioplast™ G21, Thioplast™ G22, Thioplast™ G44, Thioplast™ G122, and Thioplast™ G131, which are commercially available from AkzoNobel. Thioplast™ G resins are liquid polysulfide polymers that are blends of di- and tri-functional molecules where the difunctional polysulfide polymers have the structure of Formula (10):

$$\text{SH—(—R—S—S—)}_n\text{—R—SH} \tag{10}$$

and the trifunctional polysulfide polymers have the structure of Formula (11):

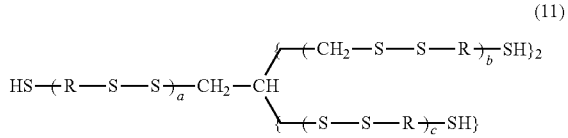

where each R is —(CH$_2$)$_2$—O—CH$_2$—O—(CH$_2$)$_2$—, and n=a+b+c, where the value for n may be from 7 to 38 depending on the amount of the trifunctional cross-linking agent (1,2,3,-trichloropropane; TCP) used during synthesis of the polysulfide polymer. Thioplast™ G polysulfides can have a number average molecular weight from less than 1,000 Daltons to 6,500 Daltons, a SH content from 1% to greater than 5.5%, and a cross-linking density from 0% to 2.0%.

Examples of suitable thiol-terminated polysulfide prepolymers also include Thiokol™ LP polysulfides available from Toray Industries, Inc. such as Thiokol™ LP2, Thiokol™ LP3, Thiokol™ LP12, Thiokol™ LP23, Thiokol™ LP33, and Thiokol™ LP55. Thiokol™ LP polysulfides have a number average molecular weight from 1,000 Daltons to 7,500 Daltons, a SH content from 0.8% to 7.7%, and a cross-linking density from 0% to 2%. Thiokol LP polysulfides have the general structure of Formula (12):

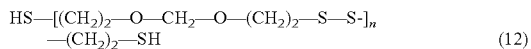  (12)

where n can be such that the number average molecular weight from 1,000 Daltons to 7,500 Daltons, such a, for example an integer from 8 to 80.

A thiol-terminated sulfur-containing prepolymer can comprise a Thiokol-LP® polysulfide, a Thioplast® G polysulfide, or a combination thereof.

A thiol-terminated polysulfide prepolymer can comprise a thiol-terminated polysulfide prepolymer of Formula (13):

  (13)

where,
  t is an integer from 1 to 60;
  q is an integer from 1 to 8;
  p is an integer from 1 to 10;
  r is an integer from 1 to 10;
  y has an average value within a range from 1.0 to 1.5;
  each R can independently be selected from branched alkanediyl, branched arenediyl, and a moiety having the structure —(CH$_2$)$_p$—O—(CH$_2$)$_q$—O—(CH$_2$)$_r$—;
  B represents a core of a z-valent polyfunctionalizing agent B(—V)$_z$ wherein:
    z is an integer from 3 to 6; and
    each V is a moiety comprising a terminal group reactive with a thiol group; and
    each —V'— is derived from the reaction of —V with a thiol.

In thiol-terminated polysulfide prepolymers of Formula (13), t can be, for example, an integer from 2 to 60, from 1 to 40, or from 1 to 20.

In thiol-terminated polysulfide prepolymers of Formula (13), q can be, for example, an integer from 1 to 6, or an integer from 1 to 4. For example, q can be 1, 2, 3, 4, 5 or 6.

In thiol-terminated polysulfide prepolymers of Formula (13), each p can be, for example, an integer from 1 to 6 or from 1 to 4. For example, each p can be 1, 2, 3, 4, 5, 6, 7, 8, 9, or 10.

In thiol-terminated polysulfide prepolymers of Formula (13), each r can be, for example, an integer from 1 to 6 or from 1 to 4. For example, each p can be 1, 2, 3, 4, 5, 6, 7, 8, 9, or 10.

In thiol-terminated polysulfide prepolymers of Formula (13), y can have a value of 1.

In thiol-terminated polysulfide prepolymers of Formula (13), y can have an average value, for example, of 1, such as from 1.05 to 2, or from 1.1 to 1.8.

In thiol-terminated polysulfide prepolymers of Formula (13), R can be —(CH$_2$)$_p$—O—(CH$_2$)$_q$—O—(CH$_2$)$_r$—.

In thiol-terminated polysulfide prepolymers of Formula (13), R can be —(CH$_2$)$_p$—O—(CH$_2$)$_q$—O—(CH$_2$)$_r$—, each q can be 1, 2, 3, or 4, and each p and r can be 1 or 2.

In thiol-terminated polysulfide prepolymers of Formula (13), 0% to 20% of the R groups can comprise branched alkanediyl or branched arenediyl, and 80% to 100% of the R groups can be —(CH$_2$)$_p$—O—(CH$_2$)$_q$—O—(CH$_2$)$_r$—.

In thiol-terminated polysulfide prepolymers of Formula (13), a branched alkanediyl or a branched arenediyl can be —R$^1$(-A)$_n$— where R$^1$ is a hydrocarbon group, n is 1 or 2, and A is a branching point. A branched alkanediyl can have the structure —CH$_2$(—CH(—CH$_2$—)—.

Thiol-terminated polysulfide prepolymers of Formula (13) can be prepared by reacting an α,ω-dihalo organic compounds, a metal hydrosulfide, a metal hydroxide, and an optional polyfunctionalizing agent. Examples of suitable α,ω-dihalo organic compounds include bis(2-chloroethyl) formal. Examples of suitable metal hydrosulfides and metal hydroxides include sodium hydrosulfide and sodium hydroxide. Examples of suitable polyfunctionalizing agents include 1,2,3-trichloropropane, 1,1,1-tris(chloromethyl)propane, 1,1,1-tris(chloromethyl)ethane, and 1,3,5-tris(chloromethyl)benzene.

Examples of thiol-terminated polysulfide prepolymers of Formula (13) are disclosed, for example, in U.S. Application Publication No. 2016/0152775, in U.S. Pat. No. 9,079,833, and in U.S. Pat. No. 9,663,619.

A thiol-terminated polysulfide prepolymer can comprise a thiol-terminated polysulfide prepolymer of Formula (14):

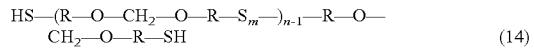  (14)

where R is C$_{2-4}$ alkanediyl, m is an integer from 1 to 8, and n is an integer from 2 to 370.

In thiol-terminated polysulfide prepolymers of Formula (16), m can have an average value, for example, greater than 1, such as from 1.05 to 2, or from 1.1 to 1.8.

In thiol-terminated polysulfide prepolymers of Formula (16), m can be, for example, an integer from 1 to 6, and integer from 1 to 4, or the integer 1, 2, 3, 4, 5, 6, 7, or 8.

In thiol-terminated polysulfide prepolymers of Formula (14), n can be, for example, an integer from 2 to 200 or an integer from 2 to 100.

In thiol-terminated polysulfide prepolymers of Formula (14), each R can independently be selected from ethanediyl, 1,3-propanediyl, 1,1-propanediyl, 1,2-propandiyl, 1,4-butanediyl, 1,1-butanediyl, 1,2-butanediyl, and 1,3-butanediyl.

Examples of thiol-terminated polysulfide prepolymers of Formula (14) are disclosed, for example, in JP 62-53354.

Thiol-terminated polysulfide prepolymers can be liquid at room temperature. Thiol-terminated monosulfide prepolymers can have a viscosity, at 100% solids, of no more than 1,500 poise (150 Pa-sec), such as 40 poise to 500 poise (4 Pa-sec to 50 Pa-sec), at a temperature of about 25° C. and a pressure of about 760 mm Hg (101 kPa) determined according to ASTM D-2849 § 79-90 using a Brookfield CAP 2000 viscometer.

Thiol-terminated polysulfide prepolymers can have a number average molecular weight within a range from 300 Daltons to 10,000 Daltons, such as within a range 1,000 Daltons to 8,000 Daltons, the molecular weight being determined by gel-permeation chromatography using a polystyrene standard. Thiol-terminated polysulfide prepolymers can have a glass transition temperature $T_g$ less than −40° C., less than −55° C., or less than −60° C. The glass transition temperature $T_g$ is determined by Dynamic Mass Analysis (DMA) using a TA Instruments Q800 apparatus with a frequency of 1 Hz, an amplitude of 20 microns, and a temperature ramp of −80° C. to 25° C., with the $T_g$ identified as the peak of the tan δ curve.

A sulfur-containing prepolymer can comprise a sulfur-containing perfluoroether, a perfluorosilicone prepolymer, or a combination thereof.

Skydrol®- and fuel-resistant organic fillers can also be used with sealant compositions comprising perfluoroether prepolymers, perfluorosilicone prepolymers, and combinations thereof.

Compositions and sealants provided by the present disclosure can comprise an organic filler or a combination of organic fillers. Organic fillers can be selected to have a low specific gravity and to be resistant to aviation solvents and/or fluids such as JRF Type I and Skydrol®, such as Skydrol® LD-4.

An organic filler can be selected to be resistant to Skydrol®. For example, an organic filler that is resistant to Skydrol®, such as Skydrol® LD-4, will exhibit a swelling of less than 1 vol % following immersion in Skydrol® at a temperature of less than 50° C. for 1,000 hours, or less than 1.2 vol % following immersion in Skydrol® at a temperature of less than 70° C. for 1,000 hours, where the percent swelling is determined according to EN ISO 10563. Suitable organic fillers can also have acceptable adhesion to the sulfur-containing polymer matrix. An organic filler can include solid particles, hollow particles, or a combination thereof. The particles can be generally spherical (referred to as powders), generally non-spherical (referred to as particulates), or a combination thereof. The particles can have a mean particle diameter less than, for example, 100 μm, 50 μm, 40 μm, 30 μm, or less than 25 μm, as determined according to ASTM E-2651-13. A powder can comprise particles having a mean particle diameter with a range from 0.25 μm to 100 μm, 0.5 μm to 50 μm, from 0.5 μm to 40 μm, from 0.5 μm to 30 μm, from 0.5 μm to 20 μm, or from 0.1 μm to 10 μm. Filler particles can comprise nano-powders, comprising particles characterized by a mean particle size, for example, from 1 nm to 100 nm.

An organic filler can have a specific gravity, for example, less than 1.6, less than 1.4, less than 1.15, less than 1.1, less than 1.05, less than 1, less than 0.95, less than 0.9, less than 0.8, or less than 0.7, where specific gravity is determined according to ISO 787 (Part 10). Organic fillers can have a specific gravity, for example, within a range from 0.85 to 1.6, within a range from 0.85 to 1.4, within a range from 0.9 to 1.1, within a range from 0.9 to 1.05, or from 0.85 to 1.05, where specific gravity is determined according to ISO 787 (Part 10).

Organic fillers can comprise thermoplastics, thermosets, or a combination thereof. Examples of suitable organic fillers include epoxies, epoxy-amides, ETFE copolymers, polyethylenes, polypropylenes, polyvinylidene chlorides, polyvinylfluorides, TFE, polyamides, polyimides, ethylene propylenes, perfluorohydrocarbons, fluoroethylenes, polycarbonates, polyetheretherketones, polyetherketones, polyphenylene oxides, polyphenylene sulfides, polyether sulfones, thermoplastic copolyesters, polystyrenes, polyvinyl chlorides, melamines, polyesters, phenolics, epichlorohydrins, fluorinated hydrocarbons, polycyclics, polybutadienes, polychloroprenes, polyisoprenes, polysulfides, polyurethanes, isobutylene isoprenes, silicones, styrene butadienes, liquid crystal polymers, and combinations of any of the foregoing.

Examples of suitable organic fillers include polyamides such as polyamide 6 and polyamide 12, polyimides, polyethylene, polyphenylene sulfides, polyether sulfones, thermoplastic copolyesters, and combinations of any of the foregoing.

Examples of suitable polyamide 6 and polyamide 12 particles are available from Toray Plastics as grades SP-500, SP-10, TR-1, and TR-2. Suitable polyamides are also available from the Arkema Group under the tradename Orgasol®, and from Evonik Industries under the tradename Vestosin®. For example, Ganzpearl® polyamides such as Ganspearl® GPA-550 and GPA-700 are available from Persperse Sakai Trading, New York, N.Y.

Examples of suitable polyimides fillers are available from Evonik Industries under the tradename P84®NT.

An organic filler can include a polyethylene, such as an oxidized polyethylene powder. Suitable polyethylenes are available, for example, from Honeywell International, Inc. under the tradename ACumist®, from INEOS under the tradename Eltrex®, and Mitsui Chemicals America, Inc. under the tradename Mipelon™.

The use of organic fillers such as polyphenylene sulfide in aerospace sealants is disclosed in U.S. Pat. No. 9,422,451, which is incorporated by reference in its entirety. Polyphenylene sulfide is a thermoplastic engineering resin that exhibits dimensional stability, chemical resistance, and resistance to corrosive and high temperature environments. Polyphenylene sulfide engineering resins are commercially available, for example, under the tradenames Ryton® (Chevron), Techtron® (Quadrant), Fortron® (Celanese), and Torelina® (Toray). Polyphenylene sulfide resins are generally characterized by a specific gravity from about 1.3 to about 1.4, where specific gravity is determined according to ISO 787 (Part 10). Polyphenylene sulfide particles having a density of 1.34 g/cm$^3$ and a mean particle diameter of 0.2 μm to 0.25 μm (in water, or from 0.4 μm to 0.5 μm in isopropanol) are available from Toray Industries, Inc.

Polyether sulfone particles are available from Toray Industries, Inc., which have a density of 1.37 g/cm$^3$ and a mean particle diameter from 5 μm to 60 μm.

Thermoplastic copolyester particles can be obtained from Toray Industries, Inc.

An organic filler can have any suitable shape. For example, an organic filler can comprise fractions of crushed polymer that has been filtered to a desired size range. An organic filler can comprise substantially spherical particles. Particles can be solid or can be porous.

An organic filler can have a mean or median particle size, for example, within a range from 1 μm to 100 μm, 2 μm to 40 μm, from 2 μm to 30 μm, from 4 μm to 25 μm, from 4 μm to 20 μm, from 2 μm to 12 μm, or from 5 μm to 15 μm. An organic filler can have an average particle size, for example, less than 100 μm, less than 75 μm, less than 50 μm, less than 40 μm, or less than 20 μm. Particle size distribution can be determined using a Fischer Sub-Sieve Sizer or by optical inspection.

An organic filler can include a low density filler such as n expanded thermoplastic microcapsule and/or a modified expanded thermoplastic microcapsule. Suitable modified expanded thermoplastic microcapsules can include an exterior coating of a melamine or urea/formaldehyde resin.

A thermally expandable microcapsule refers to a hollow shell comprising a volatile material that expands at a predetermined temperature. Thermally expandable thermoplastic microcapsules can have an average initial particle size of 5 μm to 70 μm, in some cases 10 μm to 24 μm, or from 10 μm to 17 μm. The term "average initial particle size" refers to the average particle size (numerical weighted average of the particle size distribution) of the microcapsules prior to any expansion. The particle size distribution can be determined using a Fischer Sub-Sieve Sizer or by optical inspection.

A thermally expandable thermoplastic microcapsule can comprise a volatile hydrocarbon or volatile halogenated hydrocarbon within a wall of a thermoplastic resin. Examples of hydrocarbons suitable for use in such microcapsules are include methyl chloride, methyl bromide, trichloroethane, dichloroethane, n-butane, n-heptane, n-propane, n-hexane, n-pentane, isobutane, isopentane, iso-octane, neopentane, petroleum ether, and aliphatic hydrocarbons containing fluorine, such as Freon™, and combinations of any of the foregoing.

Examples of materials suitable for forming the wall of a thermally expandable microcapsule include polymers of vinylidene chloride, acrylonitrile, styrene, polycarbonate, methyl methacrylate, ethyl acrylate, and vinyl acetate, copolymers of these monomers, and combinations of the polymers and copolymers. A crosslinking agent may be included with the materials forming the wall of a thermally expandable microcapsule.

Examples of suitable thermoplastic microcapsules include Expancel™ microcapsules such as Expancel™ DE microspheres available from AkzoNobel. Examples of suitable Expancel™ DE microspheres include Expancel™ 920 DE 40 and Expancel™ 920 DE 80. Suitable low density microcapsules are also available from Kureha Corporation.

Low density microcapsules can be characterized by a specific gravity within a range from 0.01 to 0.09, from 0.04 to 0.09, within a range from 0.04 to 0.08, within a range from 0.01 to 0.07, within a range from 0.02 to 0.06, within a range from 0.03 to 0.05, within a range from 0.05 to 0.09, from 0.06 to 0.09, or within a range from 0.07 to 0.09, wherein the specific gravity is determined according to ISO 787 (Part 10). Low density microcapsules can be characterized by a specific gravity less than 0.1, less than 0.09, less than 0.08, less than 0.07, less than 0.06, less than 0.05, less than 0.04, less than 0.03, or less than 0.02, wherein the specific gravity is determined according to ISO 787 (Part 10).

Low density microcapsules can be characterized by a mean particle diameter from 1 µm to 100 µm and can have a substantially spherical shape. Low density microcapsules can be characterized, for example, by a mean particle diameter from 10 µm to 100 µm, from 10 µm to 60 µm, from 10 µm to 40 µm, or from 10 µm to 30 µm, as determined according to ASTM E-2651-13.

Low density filler can comprise uncoated microcapsules, coated microcapsules, or combinations thereof.

Low density filler such as low density microcapsules can comprise expanded microcapsules having a coating of an aminoplast resin such as a melamine resin. Aminoplast resin-coated particles are described, for example, in U.S. Pat. No. 8,993,691, which is incorporated by reference in its entirety. Such microcapsules can be formed by heating a microcapsule comprising a blowing agent surrounded by a thermoplastic shell. Uncoated low density microcapsules can be reacted with an aminoplast resin such as a urea/formaldehyde resin to provide a coating of a thermoset resin on the outer surface of the particle.

Low density filler such as low density microcapsules can comprise thermally expandable thermoplastic microcapsules having an exterior coating of an aminoplast resin, such as a melamine resin. The coated low density microcapsules can have an exterior coating of a melamine resin, where the coating can have a thickness, for example, less than 2 µm, less than 1 µm, or less than 0.5 µm. The melamine coating on the light weight microcapsules is believed to render the microcapsules reactive with the thiol-terminated polythioether prepolymer and/or the polyepoxide curing agent, which enhances the fuel resistance, and renders the microcapsules resistant to pressure.

The thin coating of an aminoplast resin can have a film thickness of less than 25 µm, less than 20 µm, less than 15 µm, or less than 5 µm. The thin coating of an aminoplast resin can have a film thickness of at least 0.1 nanometers, such as at least 10 nanometers, or at least 100 nanometers, or, in some cases, at least 500 nanometers.

Aminoplast resins can be based on the condensation products of formaldehyde, with an amino- or amido-group carrying substance. Condensation products can be obtained from the reaction of alcohols and formaldehyde with melamine, urea or benzoguanamine. Condensation products of other amines and amides can also be employed, for example, aldehyde condensates of triazines, diazines, triazoles, guanidines, guanamines and alkyl- and aryl-substituted derivatives of such compounds, including alkyl- and aryl-substituted ureas and alkyl- and aryl-substituted melamines. Examples of such compounds include N,N'-dimethyl urea, benzourea, dicyandiamide, formaguanamine, acetoguanamine, glycoluril, ammeline, 2-chloro-4,6-diamino-1,3,5-triazine, 6-methyl-2,4-diamino-1,3,5-triazine, 3,5-diaminotriazole, triaminopyrimidine, 2-mercapto-4,6-diaminopyrimidine and 3,4,6-tris(ethylamino)-1,3,5 triazine. Suitable aminoplast resins can also be based on the condensation products of other aldehydes such as acetaldehyde, crotonaldehyde, acrolein, benzaldehyde, furfural, and glyoxal.

An aminoplast resin can comprise a highly alkylated, low-imino aminoplast resin which has a degree of polymerization less than 3.75, such as less than 3.0, or less than 2.0. The number average degree of polymerization can be defined as the average number of structural units per polymer chain. For example, a degree of polymerization of 1.0 indicates a completely monomeric triazine structure, while a degree of polymerization of 2.0 indicates two triazine rings joined by a methylene or methylene-oxy bridge. Degree of polymerization represents an average degree of polymerization value as determined by gel permeation chromatography using polystyrene standards.

An aminoplast resin can contain methylol or other alkylol groups, and at least a portion of the alkylol groups can be etherified by reaction with an alcohol. Examples of suitable monohydric alcohols include alcohols such as methanol, ethanol, propanol, butanol, pentanol, hexanol, heptanol, benzyl alcohol, other aromatic alcohols, cyclic alcohols such as cyclohexanol, monoethers of glycols, and halogen-substituted or other substituted alcohols, such as 3-chloropropanol and butoxyethanol. Aminoplast resins can be substantially alkylated with methanol or butanol.

An aminoplast resin can comprise a melamine resin. Examples of suitable melamine resins include methylated melamine resins (hexamethoxymethylmelamine), mixed ether melamine resins, butylated melamine resins, urea resins, butylated urea resins, benzoguanamine and glycoluril resins, and formaldehyde free resins. Such resins are available, for example, from Allnex Group and Hexion. Examples of suitable melamine resins include methylated melamine resins such as Cymel™ 300, Cymel™ 301, Cymel™ 303LF, Cymel™ 303ULF, Cymel™ 304, Cymel™ 350, Cymel™ 3745, Cymel™ XW-3106, Cymel™ MM-100, Cymel™ 370, Cymel™ 373, Cymel™ 380, ASTRO MEL™601, ASTRO MEL™ 601ULF, ASTRO MEL™400, ASTRO MEL™ NVV-3A, Aricel PC-6A, ASTRO MEL™ CR-1, and ASTRO SET™ 90. A suitable aminoplast resin can comprise a urea-formaldehyde resin.

The low density microcapsules can be prepared by any suitable technique, including, for example, as described U.S. Pat. Nos. 8,816,023 and 8,993,691, each of which is incorporated by reference in its entirety. Coated low density microcapsules can be obtained, for example, by preparing an aqueous dispersion of microcapsules in water with a melamine resin, under stirring. A catalyst may then be added and the dispersion heated to, for example, a temperature from 50° C. to 80° C. Low density microcapsules such as thermally expanded microcapsules having a polyacrylonitrile shell, de-ionized water and an aminoplast resin such as a melamine resin can be combined and mixed. A 10% w/w solution of para-toluene sulfuric acid in distilled water can then be added and the mixture reacted at 60° C. for about 2 hours. Saturated sodium bicarbonate can then be added and the mixture stirred for 10 minutes. The solids can be filtered, rinsed with distilled water, and dried overnight at room temperature. The resulting powder of aminoplast resin-coated microcapsules can then be sifted through a 250 μm sieve to remove and separate agglomerates.

Prior to application of an aminoplast resin coating, a thermally-expanded thermoplastic microcapsule can be characterized by a specific gravity, for example, within a range from 0.01 to 0.05, within a range from 0.015 to 0.045, within a range from 0.02 to 0.04, or within a range from 0.025 to 0.035, wherein the specific gravity is determined according to ISO 787 (Part 10). For example, Expancel™ 920 DE 40 and Expancel™ 920 DE 80 can be characterized by a specific gravity of about 0.03, wherein the specific gravity is determined according to ISO 787 (Part 10).

Following coating with an aminoplast resin, an aminoplast-coated microcapsule can be characterized by a specific gravity, for example, within a range from 0.02 to 0.08, within a range from 0.02 to 0.07, within a range from 0.02 to 0.06, within a range from 0.03 to 0.07, within a range from 0.03 to 0.065, within a range from 0.04 to 0.065, within a range from 0.045 to 0.06, or within a range from 0.05 to 0.06, wherein the specific gravity is determined according to ISO 787 (Part 10).

Aminoplast-coated microcapsules and method of making aminoplast-coated microcapsules are disclosed, for example in U.S. Application Publication No. 2016/0083619, which is incorporated by reference in its entirety.

Compositions and sealants provided by the present disclosure can comprise, for example, from 10 wt % to 35 wt % of an organic filler, from 15 wt % to 35 wt %, from 10 wt % to 35 wt %, from 15 wt % to 30 wt %, from 18 wt % to 32 wt %, from 15 wt % to 25 wt %, from 17 wt % to 23 wt %, from 20 wt % to 30 wt %, or from 22 wt % to 28 wt % of an organic filler, where wt % is based on the total weight of the composition. Compositions and sealants can comprise an organic filler comprising a polyamide, an oxidized polyethylene, and aminoplast-coated microcapsules. Compositions and sealants can comprise an organic filler comprising a polyamide and aminoplast-coated microcapsules.

Compositions and sealants provided by the present disclosure can comprise an inorganic filler or combination of inorganic fillers. An inorganic filler can be included to provide mechanical reinforcement and to control the rheological properties of the composition. Inorganic fillers may be added to compositions to impart desirable physical properties such as, for example, to increase the impact strength, to control the viscosity, or to modify the electrical properties of a cured composition. Inorganic fillers useful in compositions provided by the present disclosure and useful for aviation and aerospace applications include carbon black, calcium carbonate, precipitated calcium carbonate, calcium hydroxide, hydrated alumina (aluminum hydroxide), fumed silica, silica, precipitated silica, silica gel, and combinations of any of the foregoing. For example, an inorganic filler can include a combination calcium carbonate and fumed silica, and the calcium carbonate and fumed silica can be treated and/or untreated. An inorganic filler can comprise calcium carbonate and fumed silica.

An inorganic filler can be coated or uncoated. For example, an inorganic filler can be coated with a hydrophobic coating, such as a coating of polydimethylsiloxane.

Suitable calcium carbonate filler include products such as Socal® 31, Socal® 312, Socal® U1S1, Socal® UaS2, Socal® N2R, Winnofil® SPM, and Winnofil® SPT available from Solvay Special Chemicals. A calcium carbonate filler can include a combination of precipitated calcium carbonates.

Compositions provided by the present disclosure can comprise, for example, from 10 wt % to 30 wt % of an inorganic filler or combination of inorganic fillers, from 5 wt % to 25 wt %, from 10 wt % to 25 wt %, from 15 wt % to 25 wt %, or from 17 wt % to 23 wt %, where wt % is based on the total weight of the composition.

Compositions provided by the present disclosure can comprise a suitable curing agent. A curing agent can be selected to react with the terminal thiol group of a thiol-terminated sulfur-containing prepolymer provided by the present disclosure.

Compositions provided by the present disclosure can comprise a polyepoxide curing agent. A polyepoxide refers to a compound having two or more reactive epoxy groups. A polyepoxide may include a combination of polyepoxides. A polyepoxide can be liquid at room temperature (23° C.).

Examples of suitable polyepoxides include polyepoxides such as hydantoin diepoxide, diglycidyl ethers of bisphenol-A, diglycidyl ether of bisphenol-F, novolac type epoxides such as DEN™ 438 (phenol novolac polyepoxide comprising the reaction product of epichlorohydrin and phenol-formaldehyde novolac) and DEN™ 431 (phenol novolac polyepoxide comprising the reaction product of epichlorohydrin and phenol-formaldehyde novolac), available from Dow Chemical Co., certain epoxidized unsaturated, and combinations of any of the foregoing.

A polyepoxide curing agent can comprise a phenol novolac polyepoxide such as DEN® 431, a bisphenol A/epichlorohydrin derived polyepoxide such as EPON® 828, or a combination thereof. A polyepoxide curing agent can comprise a combination of a phenol novolac polyepoxide and a bisphenol A/epichlorohydrin derived polyepoxide (a bisphenol A type polyepoxide).

Other examples of suitable polyepoxide curing agents include bisphenol A type polyepoxides, brominated bisphenol A type polyepoxides, bisphenol F type polyepoxides, biphenyl type polyepoxides, novolac type polyepoxides, an alicyclic polyepoxides, naphthalene type polyepoxides, ether series or polyether series polyepoxides, oxirane ring-containing polybutadienes, silicone polyepoxide copolymers, and a combination of any of the foregoing.

Additional examples of suitable bisphenol A/epichlorohydrin derived polyepoxide include a bisphenol A type polyepoxide having a weight average molecular weight of 400 or less; a branched polyfunctional bisphenol A type polyepoxide such as p-glycidyloxyphenyl dimethyltolyl bisphenol A diglycidyl ether, a bisphenol F type polyepoxide; a phenol novolac type polyepoxide having a weight average molecular weight of 570 or less, an alicyclic polyepoxide such as vinyl(3,4-cyclohexene)dioxide, methyl 3,4-epoxycyclohexylcarboxylate (3,4-epoxycyclohexyl), bis(3,4-epoxy-6-rnethylcyclohexylrnethyl) adipate and 2-(3,4-epoxycyclohexyl)-5,1-spiro(3,4-epoxycyclohexyl)-m-dioxane, a biphenyl type epoxy such as 3,3',5,5'-tetramethyl-4,4'-diglycidyloxybiphenyl; a glycidyl ester type epoxy such as diglycidyl hexahydrophthalate, diglycidyl 3-methylhexahydrophthalate and diglycidyl hexahydroterephthalate; a glycidylamine type polyepoxide such as diglycidylaniline, diglycidyltoluidine, triglycidyl-p-aminophenol, tetraglycidyl-m-xylene diamine, tetraglycidylbis(aminomethyl)cyclohexane; a hydantoin type polyepoxide such as 1,3-diglycidyl-5-methyl-5-ethylhydantoin; and a naphthalene ring-containing polyepoxide. Also, a polyepoxide having silicone such as 1,3-bis(3-glycidoxy-propyl)-1,1,3,3-tetramethyldisiloxane may be used. Other examples of suitable polyepoxides include (poly)ethylene glycol diglycidyl ether, (poly)

propylene glycol diglycidyl ether, butanediol diglycidyl ether and neopentyl glycol diglycidyl ether; and tri-epoxides such as trimethylolpropane triglycidyl ether and glycerin triglycidyl ether.

Examples of commercially available polyepoxides suitable for use in compositions provided by the present disclosure include polyglycidyl derivatives of phenolic compounds, such as those available under the trade names Epon® 828, Epon® 1001, Epon® 1009, and Epon® 1031, from Resolution Performance Products LLC; and DER® 331, DER 332, DER® 334, and DER® 542 from Dow Chemical Co. Other suitable polyepoxides include polyepoxides prepared from polyols and the like and polyglycidyl derivatives of phenol-formaldehyde novolacs, the latter of which are commercially available under the trade names DEN® 431, DEN® 438, and DEN® 439 from Dow Chemical Company. Cresol analogs are also available commercially ECN® 1235, ECN® 1273, and ECN® 1299 from Ciba Specialty Chemicals, Inc. SU-8 is a bisphenol A-type polyepoxide novolac available from Resolution Performance Products LLC. Polyglycidyl adducts of amines, aminoalcohols and polycarboxylic acids are also useful polyepoxides, including Glyamine® 135, Glyamnine® 125, and Clyamrine® 115 from F.L.C. Corporation; Araldite MY-720, Araldite® MY-721, Araldite® 0500, and Araldite® 0510 from Ciba Specialty Chemicals.

A polyepoxide can comprise a urethane-modified diepoxide. A urethane diepoxide can be derived from the reaction of an aromatic diisocyanate and a diepoxide. A urethane-modified diepoxide can comprise a diepoxide having the structure of Formula (15):

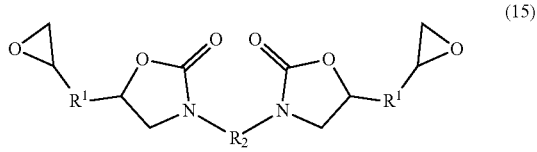

(15)

where each $R^1$ is derived from a diglycidyl ether and $R^2$ is derived from an aromatic diisocyanate.

Examples of suitable aromatic diisocyanates in which the isocyanate groups are not bonded directly to the aromatic ring include, but are not limited to, bis(isocyanatoethyl) benzene, $\alpha,\alpha,\alpha',\alpha'$-tetramethylxylene diisocyanate, 1,3-bis (1-isocyanato-1-methylethyl)benzene, bis(isocyanatobutyl) benzene, bis(isocyanatomethyl)naphthalene, bis (isocyanatomethyl)diphenyl ether, bis(isocyanatoethyl) phthalate, and 2,5-di(isocyanatomethyl)furan. Aromatic diisocyanates having isocyanate groups bonded directly to the aromatic ring include phenylene diisocyanate, ethylphenylene diisocyanate, isopropylphenylene diisocyanate, dimethylphenylene diisocyanate, diethylphenylene diisocyanate, diisopropylphenylene diisocyanate, naphthalene diisocyanate, methylnaphthalene diisocyanate, biphenyl diisocyanate, 4,4'-diphenylmethane diisocyanate, bis(3-methyl-4-isocyanatophenyl)methane, bis(isocyanatophenyl) ethylene, 3,3'-dimethoxy-biphenyl-4,4'-diisocyanate, diphenylether diisocyanate, bis(isocyanatophenylether)ethyleneglycol, bis(isocyanatophenylether)-1,3-propyleneglycol, benzophenone diisocyanate, carbazole diisocyanate, ethylcarbazole diisocyanate, dichlorocarbazole diisocyanate, 4,4'-diphenylmethane diisocyanate, p-phenylene diisocyanate, 2,4-toluene diisocyanate, and 2,6-toluene diisocyanate.

Examples of suitable diepoxides include diglycidyl ether, 1,4-butanediol diglycidyl ether, neopentyl glycol diglycidyl ether, 1,3-butanediol diglycidyl ether, Neopentyl glycol diglycidyl ether, dipropylene glycol diglycidyl ether, 1,6-hexanediol diglycidyl ether, ethylene glycol diglycidyl ether, diethylene glycol diglycidyl ether, glycerol 1,3-diglycidyl ether, etoglucid, 1,5-hexadiene diepoxide, diepoxy propyl ether, 1,5-hexadiene diepoxide, 1,2:9,10-diepoxydecane, 1,2:8,9-diepoxynonanne, and 1,2:6,7-diepoxyheptane; aromatic diepoxides such as resorcinol diglycidyl ether, bisphenol A diglycidyl ether, bisphenol F diglycidyl ether, bis[4-(glycidyloxy)phenyl]methane, 1,4-bis(glycidyloxy) benzene, tetramethylbiphenyl diglycidyl ether, and 4,4-diglyciyloxybiphenyl; and cyclic diepoxides such as 1,4-cyclohexanedimethanol diglycidyl ether, hydrogenated bisphenol A diglycidyl ether, and 1,4-bis(glycidyloxy)cyclohexane.

Diepoxides of Formula (15) are available, for example, from Kukdo Chemical Co., Ltd. (Korea).

A composition can comprise a phenol novolac polyepoxide and a bisphenol A/epichlorohydrin derived polyepoxide. A composition can comprise an equal wt % of a novolac polyepoxide and a bisphenol A/epichlorohydrin derived polyepoxide. A composition can comprise a wt % ratio of a phenol novolac polyepoxide and a bisphenol A/epichlorohydrin derived polyepoxide with a range, for example, from 0.8:1 to 1:0.8, or from 0.9:1 to 1:0.9.

A polyepoxide can comprise, for example, from 40 wt % to 60 wt % of a bisphenol A/epichlorohydrin derived polyepoxide and from 40 wt % to 60 wt % of a phenol novolac polyepoxide; from 45 wt % to 55 wt % of a bisphenol A/epichlorohydrin derived polyepoxide and from 45 wt % to 55 wt % of a phenol novolac polyepoxide; or from 42 wt % to 53 wt % of a bisphenol A/epichlorohydrin derived polyepoxide and from 42 wt % to 53 wt % of a phenol novolac polyepoxide; wherein wt % is based on the total weight of the polyepoxide in a composition.

A polyepoxide can comprise, for example: from 30 wt % to 80 wt % of a hydroxyl-functional polyepoxide, from 35 wt % to 75 wt %, or from 40 wt % to 70 wt % of a hydroxyl-functional polyepoxide, where wt % is based on the total weight of the polyepoxide in the composition.

A polyepoxide can comprise a hydroxyl-functional polyepoxide or combination of hydroxyl-functional polyepoxides. For example, a polyepoxide can comprise a hydroxyl-functional bisphenol A/epichlorohydrin derived polyepoxide.

A bisphenol A/epichlorohydrin derived polyepoxide can comprise pendent hydroxyl groups such as, for example, from 1 to 10 pendent hydroxyl groups, from 1 to 8 hydroxyl groups, from 1 to 6 hydroxyl groups, from 1 to 4 pendent hydroxyl groups, or from 1 to 2 pendent hydroxyl groups, such as 1, 2, 3, 4 5, or 6 pendent hydroxyl groups. A bisphenol A/epichlorohydrin derived polyepoxide having pendent hydroxyl groups can be referred to as hydroxyl-functional bisphenol A/epichlorohydrin derived polyepoxide.

Hydroxyl-functional bisphenol A/epichlorohydrin derived polyepoxide can have an epoxy equivalent weight from 400 Daltons to 1,500 Daltons, from 400 Daltons to 1,000 Daltons or from 400 Daltons to 600 Daltons.

A bisphenol A/epichlorohydrin derived polyepoxide can comprise a bisphenol A/epichlorohydrin derived polyepoxide without a hydroxyl-functional component, a bisphenol A/epichlorohydrin derived polyepoxide which is partly hydroxyl-functional, or all of the bisphenol A/epichlorohydrin derived polyepoxide can be hydroxyl-functional.

A bisphenol A/epichlorohydrin derived polyepoxide having hydroxyl pendent groups can have the structure of Formula (16):

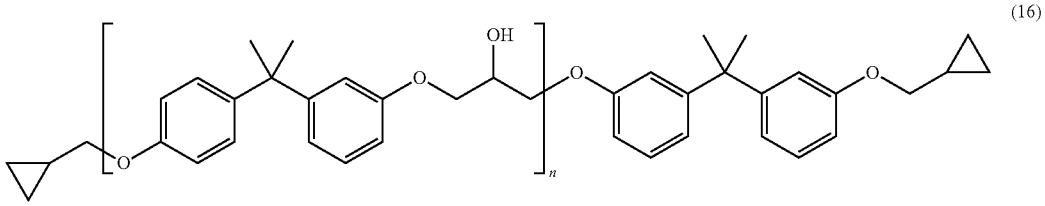

where n is an integer from 1 to 6, or n is within a range from 1 to 6. In a polyepoxide of Formula (16), n can be 2.

Examples of suitable bisphenol A/epichlorohydrin derived polyepoxide include bisphenol A/epichlorohydrin derived polyepoxide in which n is an integer from 1 to 6, or a combination of bisphenol A/epichlorohydrin derived polyepoxide in which n can be a non-integer value, for example, from 0.1 to 2.9, from 0.1 to 2.5, from 0.1 to 2.1, from 0.1 to 1.7, from 0.1 to 1.5, from 0.1 to 1.3, from 0.1 to 1.1, from 0.1 to 0.9, from 0.3 to 0.8, or from 0.5 to 0.8.

A bisphenol A/epichlorohydrin derived polyepoxide comprising hydroxyl pendent groups can comprise, for example, a 2,2-bis(p-glycidyloxyphenyl)propane condensation product with 2,2-bis(p-hydroxyphenyl)propane and similar isomers. Suitable bisphenol A/epichlorohydrin derived polyepoxide comprising hydroxyl pendent groups are available, for example, from Momentive and Hexion and include Epon™ solid epoxy such as Epon™ 1001F, Epon™ 1002F, Epon™ 1004F, Epon™ 1007F, Epon™ 1009F, and combinations of any of the foregoing. Such bisphenol A/epichlorohydrin derived polyepoxide may be provided, for example, as a 70 wt % to 95 wt % solids solution in a suitable solvent such as methyl ethyl ketone. Such high solids content include, for example, Epon™ 1001-A-80, Epon™ 1001-B-80, Epon™ 1001-CX-75, Epon™ 1001-DNT-75, Epon™ 1001-FT-75, Epon™ 1001-G-70, Epon™ 1001-H-75, Epon™ 1001-K-65, Epon™ 1001-O-75, Epon™ 1001-T-75, Epon™ 1001-UY-70, Epon™ 1001-X-75, Epon™ 1004-O-65, Epon™ 1007-CT-55, Epon™ 1007-FMU-50, Epon™ 1007-HT-55, Epon™ 1001-DU-40, Epon™ 1009-MX-840, or a combination of any of the foregoing. Further examples of suitable bisphenol A-derived polyepoxide resins include Epon™ 824, Epon™ 825, Epon™ 826, and Epon™ 828.

A bisphenol A/epichlorohydrin derived polyepoxide can have an epoxy equivalent weight (EEW, gm/eq), for example, from 150 to 450.

Phenol novolac polyepoxides are multifunctional polyepoxides obtained by reacting a phenolic novolac with epichlorohydrin and contain more than two epoxy groups per molecule Phenol novolac polyepoxides can have a EEW, for example, from 150 to 200. Phenol novolac polyepoxides can have the structure of Formula (17):

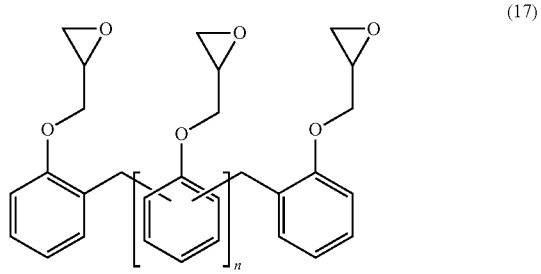

where n can have an average value, for example, from 0.2 to 1.8 (DER™ 354, DEN™ 431, DEN™ 438, and DEN™ 439, available from Dow Chemical Company).

Examples of suitable epoxy novolacs include novolac polyepoxides in which n is an integer from 1 to 6, from 1 to 4, or from 1 to 2; or in which n can be a non-integer value, for example, from 0.1 to 2.9, from 0.1 to 2.5, from 0.1 to 2.1, from 0.1 to 1.7, from 0.1 to 1.5, from 0.1 to 1.3, from 0.1 to 1.1, from 0.1 to 0.9, from 0.3 to 0.8, or from 0.5 to 0.8.

A polyepoxide can comprise, for example, a difunctional polyepoxide, a polyepoxide having an epoxy functionality greater than 2 such as from 3 to 6, or a combination thereof. A multifunctional polyepoxide can have an average epoxy functionality, for example, from 2.1 to 3.5, from 2.2 to 3.4, from 2.6 to 3.2, or from 2.7 to 3.1.

A polyepoxide can comprise, for example, a combination of a difunctional polyepoxide or combination of difunctional polyepoxides, a multifunctional polyepoxide or combination of multifunctional polyepoxides, or a combination of any of the foregoing.

Compositions provided by the present disclosure can comprise, for example, from 40 wt % to 70 wt % of a difunctional polyepoxide and from 30 wt % to 60 wt % of a multifunctional polyepoxide; from 45 wt % to 65 wt % of a difunctional polyepoxide and from 35 wt % to 55 wt % of a multifunctional polyepoxide; or from 40 wt % to 60 wt % of a difunctional polyepoxide and from 40 wt % to 60 wt % of a multifunctional polyepoxide; wherein wt % is based on the total weight of the polyepoxide in a composition, and a multifunctional polyepoxide has an average epoxy functionality of greater than two (2).

A difunctional polyepoxide can have an epoxy equivalent weight, for example, from 400 Daltons to 1,500 Daltons, from 400 Daltons to 1,000 Daltons, or from 400 Daltons to 600 Daltons.

A multifunctional polyepoxide can have an epoxy equivalent weight, for example, from 140 Daltons to 500 Daltons, from 150 Daltons to 300 Daltons, or from 160 Daltons to 200 Daltons.

Compositions provided by the present disclosure can comprise, for example, from 40 wt % to 70 wt % of a hydroxyl-functional difunctional polyepoxide and from 30 wt % to 60 wt % of a multifunctional polyepoxide; from 45 wt % to 65 wt % of a hydroxyl-functional difunctional polyepoxide and from 35 wt % to 55 wt % of a multifunctional polyepoxide; or from 40 wt % to 60 wt % of a hydroxyl-functional difunctional polyepoxide and from 40 wt % to 50 wt % of a multifunctional polyepoxide; where wt % is based on the total weight of the polyepoxide in a composition.

A polyepoxide suitable for use in compositions provided by the present disclosure can comprise, for example, from 30 wt % to 60 wt % of a polyepoxide having an average epoxy functionality from 2.6 to 3.2, from 35 wt % to 58 wt %, from 44 wt % to 56 wt %, from 46 wt % to 54 wt %, or from 48 wt % to 52 wt % of a polyepoxide having an average epoxy functionality from 2.6 to 3.2; and from 30 wt % to 60 wt % of a difunctional polyepoxide, from 42 wt % to 58 wt %, from 44 wt % to 56 wt %, from 46 wt % to 54 wt %, or from 44 wt % to 52 wt % of a difunctional polyepoxide, where wt % is based on the total weight of the polyepoxide in a composition.

A difunctional polyepoxide can comprise a hydroxyl-functional polyepoxide.

Suitable polyepoxides for use in compositions provided by the present disclosure can comprise, for example, from 30 wt % to 80 wt % of a hydroxyl-functional polyepoxide, from 35 wt % to 75 wt % of a hydroxyl-functional polyepoxide, or from 40 wt % to 70 wt % of a hydroxyl-functional polyepoxide, where wt % is based on the total weight of a polyepoxide.

Compositions provided by the present disclosure can comprise a combination of polyepoxides. A combination of polyepoxides can comprise polyepoxides having different polyepoxides having different functionalities or different average functionalities. For example, a combination of polyepoxides can comprise a polyepoxide having an average epoxy functionality from 2.7 to 2.9 and a polyepoxide having an epoxy functionality of 2. Polyepoxides having a higher average functionality can increase the cross-linking density of a cured polymer network, which can lead to increased tensile strength, but also can reduce the % elongation of a cured sealant. Polyepoxides having a low epoxy functionality such as around 2 can result in a cured composition that is more flexible. Because low density compositions have a high content of filler, which tends to increase the tensile strength of a cured sealant, it can be desirable to use polyepoxides or combinations of polyepoxides having an average epoxy functionality from 2.1 to 3, such as from 2.1 to 2.5, or from 2.1 to 2.3.

Compositions and sealants provided by the present disclosure can comprise, for example, from 4 wt % to 20 wt %, from 4 wt % to 20 wt %, from 4 wt % to 18 wt %, from 6 wt % to 16 wt %, from 6 wt % to 14 wt % of a polyepoxide or combination of polyepoxides, where wt % is based on the total weight of the composition.

Compositions provided by the present disclosure can comprise, for example, from 35 wt % to 80 wt % of a difunctional hydroxyl-containing polyepoxide, from 20 wt % to 60 wt % of a multifunctional polyepoxide, and from 1 wt % to 7 wt % of a urethane-modified polyepoxide. Compositions provided by the present disclosure can comprise, for example, from 40 wt % to 75 wt % of a difunctional hydroxyl-containing polyepoxide, from 20 wt % to 60 wt % of a multifunctional polyepoxide, and from 2 wt % to 6 wt % of a urethane-modified polyepoxide.

Compositions and sealants provided by the present disclosure can comprise an adhesion promoter or combination of adhesion promoters. Adhesion promoters can be included in a composition to increase the adhesion of the polymeric matrix to organic filler, inorganic filler, and to surfaces such as titanium composite surfaces, stainless steel surfaces, compositions, aluminum, and other coated and uncoated aerospace surfaces.

An adhesion promoter can include a phenolic adhesion promoter, a combination of phenolic adhesion promoters, an organo-functional silane, a combination of organo-functional silanes, hydrolyzed silanes, a combination of hydrolyzed silanes, or a combination of any of the foregoing. An organo-functional silane can be an amine-functional silane.

Compositions provided by the present disclosure can comprise an organo-functional silane, a phenolic adhesion promoter, and a hydrolyzed organo-functional silane. Examples of suitable adhesion promoters include phenolic resins such as Methylon® phenolic resin, organo-functional silanes, such as epoxy-, mercapto- or amine-functional silanes, such as Silquest® organo-functional silanes, and hydrolyzed silanes.

Compositions and sealants provided by the present disclosure can comprise a phenolic adhesion promoter, an organo-functional silane, or a combination thereof. A phenolic adhesion promoter can comprise a cooked phenolic resin, an un-cooked phenolic resin, or a combination thereof. Phenolic adhesion promoters can comprise the reaction product of a condensation reaction of a phenolic resin with one or more thiol-terminated polysulfides. Phenolic adhesion promoters can be thiol-terminated.

Examples of suitable cooked phenolic resins include T-3920 and T-3921, available for PPG Aerospace.

Examples of suitable phenolics that can be used to provide phenolic resins include 2-(hydroxymethyl)phenol, (4-hydroxy-1,3-phenylene)dimethanol, (2-hydroxybenzene-1,3,4-triyl) trimethanol, 2-benzyl-6-(hydroxymethyl)phenol, (4-hydroxy-5-((2-hydroxy-5-(hydroxymethyl)cyclohexa-2,4-dien-1-yl)methyl)-1,3-phenylene)dimethanol, (4-hydroxy-5-((2-hydroxy-3,5-bis(hydroxymethyl)cyclohexa-2,4-dien-1-yl)methyl)-1,3-phenylene)dimethanol, and a combination of any of the foregoing.

Suitable phenolic resins can be synthesized by the base-catalyzed reaction of phenol with formaldehyde.

Phenolic adhesion promoters can comprise the reaction product of a condensation reaction of a Methylon® resin, a Varcum® resin, or a Durez® resin available from Durez Corporation with a thiol-terminated polysulfide such as a Thioplast® resin or a Thiokol® resin.

Examples of Methylon® resins include Methylon® 75108 (allyl ether of methylol phenol, see U.S. Pat. No. 3,517,082) and Methylon® 75202.

Examples of Varcum® resins include Varcum® 29101, Varcum® 29108, Varcum® 29112, Varcum® 29116, Varcum® 29008, Varcum® 29202, Varcum® 29401, Varcum® 29159, Varcum® 29181, Varcum® 92600, Varcum® 94635, Varcum® 94879, and Varcum® 94917.

An example of a Durez® resin is Durez® 34071. Bakelite phenolic resins are available from Hexion.

Compositions provided by the present disclosure can comprise an organo-functional adhesion promoter such as an organo-functional silane. An organo-functional silane can comprise hydrolysable groups bonded to a silicon atom and at least one organo-functional group. An organo-functional silane can have the structure $R^a$—$(CH_2)_n$—$Si(-OR)_{3-n}R_n$, where $R^a$ comprises an organo-functional group, n is 0, 1, or 2, and R is alkyl such as methyl or ethyl. Examples of suitable organo-functional groups include epoxy, amino, methacryloxy, or sulfide groups. An organo-functional silane can be a dipodal organo-functional silane having two or more silane groups. An organo-functional silane can be a combination of a monosilane and a dipodal silane.

An amine-functional silane can comprise a primary amine-functional silane, a secondary amine-functional silane, or a combination thereof. A primary amine-functional silane refers to a silane having primary amino group. A secondary amine-functional silane refers to a silane having a secondary amine group.

A secondary amine-functional silane can be a sterically hindered amine-functional silane. In a sterically hindered amine-functional silane the secondary amine can be proximate a large group or moiety that limits or restricts the degrees of freedom of the secondary amine compared to the degrees of freedom for a non-sterically hindered secondary amine. For example, in a sterically hindered secondary amine, the secondary amine can be proximate a phenyl group, a cyclohexyl group, or a branched alkyl group.

Amine-functional silanes can be monomeric amine-functional silanes having a molecular weight, for example, from 100 Daltons to 1000 Daltons, from 100 Daltons to 800 Daltons, from 100 Daltons to 600 Daltons, or from 200 Daltons to 500 Daltons.

Examples of suitable primary amine-functional silanes include 4-aminobutyltriethoxysilane, 4-amino-3,3-dimethylbutyltrimethoxysilane, N-(2-aminoethyl)-3-aminopropyltriethoxysilane, 3(m-aminophenoxy)propyltrimethoxysilane, m-aminophenyltrimethoxysilane, p-aminophenyltrimethoxysilane, 3-aminopropyltriethoxysilane, 3-aminopropyltrimethoxysilane, 3-aminopropyltris(methoxyethoxyethoxy)silane, 11-aminoundecyltriethoxysilane, 2-(4-pyridylethyl)triethoxysilane, 2-(2-pyridylethyltrimethoxysilane, N-(3-trimethoxysilylpropyl)pyrrole, 3-aminopropylsilanetriol, 4-amino-3,3-dimethylbutylmethyldimethoxysilane, 3-aminopropylmethyldiethoxysilane, 1-amino-2-(dimethylethoxysilyl)propane, 3-aminopropyldiisopropylene ethoxysilane, and 3-aminopropyldimethylethoxysilane.

Examples of suitable diamine-functional silanes include aminoethylaminomethyl)phenethyltrimethoxysilane and N-(2-aminoethyl)-3-aminopropyltrimethoxysilane.

Examples of suitable secondary amine-functional silanes include 3-(N-allylamino)propyltrimethoxysilane, n-butylaminopropyltrimethoxysilane, tert-butylaminopropyltrimethoxysilane, (N,N-cylohexylaminomethyl)methyldiethoxysilane, (N-cyclohexylaminomethyl)triethoxysilane, (N-cyclohexylaminopropyl)trimethoxysilane, (3-(n-ethylamino)isobutyl)methyldiethoxysilane, (3-(N-ethylamino)isobutyl)trimethoxysilane, N-methylaminopropylmethyldimethoxysilane, N-methylaminopropyltrimethoxysilane, (phenylaminomethyl)methyldimethoxysilane, N-phenylaminomethyltriethoxysilane, and N-phenylaminopropyltrimethoxysilane.

Suitable amine-functional silanes are commercially available, for example, from Gelest Inc. and from Dow Corning Corporation.

Examples of suitable amino-functional silanes include Silquest® A-187, Silquest® A-1100, and Silquest® A-1110, available from Momentive Performance Materials.

Suitable adhesion promoters also include sulfur-containing adhesion promoters such as those disclosed in U.S. Pat. Nos. 8,513,339; 8,952,124; and 9,056,949; and U.S. Application Publication No. 2014/0051789, each of which is incorporated by reference in its entirety.

Examples of suitable phenolic adhesion promoters include T-3920 and T-3921, available from PPG Aerospace.

An example of a suitable hydrolyzed silanes include T-1601 available from PPG Aerospace.

Compositions and sealants provided by the present disclosure can comprise from 0.5 wt % to 4 wt %, from 0.5 wt % to 3.5 wt %, from 0.8 wt % to 3.2 wt %, from 1.0 wt % to 4.0 wt %, from 1.0 wt % to 3.0 wt %, from 1.5 wt % to 3.0 wt %, or from 1.7 wt % to 2.8 wt %, of an adhesion promoter or combination of adhesion promoters, where wt % is based on the total weight of the composition. For example, an adhesion promoter can comprise a combination of cooked phenolics, amino-functional silanes, and hydrolyzed silanes.

Compositions provided by the present disclosure can comprise an adhesion promoter comprising a phenolic adhesion promoter or combination of phenolic adhesion promoters, and an amine-functional silane or combination of amine-functional silanes.

An adhesion promoter can comprise, for example, from 70 wt % to 95 wt % of a phenolic adhesion promoter; and from 5 wt % to 25 wt % of an amine-functional silane, where wt % is based on the total weight of the adhesion promoter in a composition.

An adhesion promoter can comprise, for example, from 75 wt % to 92 wt % of a phenolic adhesion promoter, and from 8 wt % to 20 wt % of an organo-functional silane, where wt % is based on the total weight of the adhesion promoter in a composition.

Compositions and sealants provided by the present disclosure can comprise one or more catalysts for the thiol-epoxy reaction. The one or more additional catalysts can include an amine catalyst or combination of amine catalysts.

A suitable amine catalyst for use in compositions of the present disclosure is capable of catalyzing the reaction between thiol groups and epoxy groups. An amine catalyst can comprise an amine catalyst such as, for example, N,N-dimethylethanolamine, triethylene diamine (TEDA), bis(2-dimethylaminoethyl)ether (BDMAE), N-ethylmorpholine, N',N'-dimethylpiperazine, N,N,N',N',N'-pentamethyl-diethylene-triamine (PMDETA), N,N-dimethylcyclohexylamine (DMCHA), N,N-dimethylbenzylamine (DMBA), N,N-dimethylcethylamine, N,N,N'N",N"-pentamethyl-dipropylene-triamine (PMDPTA), triethylamine, 1-(2-hydroxypropyl)imidazole, 1,4-diazabicyclo[2.2.2]octane (DABCO) and 2,4,6-tris(dimethylaminomethyl)phenol, as contained in the accelerant composition DMP-30®, available from Sigma-Aldrich, dimethylethanolamine (DMEA), bis-(2-dimethylaminoethyl)ether, N-ethylmorpholine, triethylamine, 1,8-diazabicyclo[5.4.0]undecene-7 (DBU), benzyldimethylamine (BDMA), N,N,N'-trimethyl-N'-hydroxyethyl-bis(aminoethyl)ether, N'-(3-(dimethylamino)propyl)-N,N-dimethyl-1,3-propanediamine, or a combination of any of the foregoing.

Compositions and sealants provided by the present disclosure can comprise from 0.1 wt % to 1 wt %, from 0.2 wt % to 0.9 wt %, from 0.3 wt % to 0.7 wt %, or from 0.4 wt % to 0.6 wt % of an amine catalyst or combination of amine catalysts, where wt % is based on the total weight of the composition.

Compositions provided by the present disclosure can comprise a plasticizer or combination of plasticizers.

Examples of suitable plasticizers include Jayflex™ DINP, Jayflex™ DIDP, Jayflex™ DIUP, and Jayflex™ DTDP available from Exxon Mobil. Fairad® plasticizer is available from PPG Aerospace. A plasticizer can be an α-methyl styrene homopolymer having a room temperature (23° C.) viscosity from 120 poise to 250 poise. α-Methyl styrene plasticizers are available from PPG Aerospace. Other examples of suitable plasticizers include combinations of hydrogenated terphenyls, terphenyls, and partially hydrogenated quarterphenyls and higher polyphenyls such as HB-40 available from Eastman Chemical Co.

Compositions provided by the present disclosure can comprise from 0 wt % to 4 wt %, 0.01 wt % to 3.5 wt % of a plasticizer, from 0.05 wt % to 3 wt %, from 0.1 wt % to 2.5 wt % or from 1 wt % to 3 wt % of a plasticizer, where wt % is based on the total weight of the composition. Certain compositions do not contain any plasticizer. Such composition may contain a low viscosity hydroxyl-functional poly-epoxide such as, for example, Epon® 1001-B-80.

Certain compositions provided by the present disclosure do not include a plasticizer.

Compositions provided by the present disclosure may comprise one or more additional components suitable for use in aerospace sealants and the selection can depend at least in part on the desired performance characteristics of the cured sealant under conditions of use. Compositions such as sealants provided by the present disclosure may further comprise one or more additives such as a plasticizer, a reactive diluent, a pigment, a solvent, or a combination of any of the foregoing.

Other than a thiol-terminated polythioether, organic filler, inorganic filler, polyepoxide adhesion promoters, plasticizer, and catalyst, compositions and sealants provided by the present disclosure may not include any additional materials, or any additional materials are present in an amount, for example, less than 5 wt %, less than 4 wt %, less than 3 wt %, less than 2 wt %, or less than 1 wt %, where wt % is based on the total weight of the composition or sealant.

Compositions provided by the present disclosure may be formulated as sealants. By formulated is meant that in addition to the reactive species forming the cured polymer network, additional material can be added to a composition to impart desired properties to the uncured sealant and/or to the cured sealant. For the uncured sealant these properties can include viscosity, pH, and/or rheology. For cured sealants, these properties can include weight, adhesion, corrosion resistance, color, glass transition temperature, electrical conductivity, cohesion, and/or physical properties such as tensile strength, elongation, and hardness. Compositions provided by the present disclosure may comprise one or more additional components suitable for use in aerospace sealants and depend at least in part on the desired performance characteristics of the cured sealant under conditions of use.

Compositions provided by the present disclosure can comprise, for example, from 35 wt % to 65 wt % of a thiol-terminated sulfur-containing prepolymer; from 10 wt % to 35 wt % of an organic filler; from 5 wt % to 25 wt % of an inorganic filler; and from 3 wt % to 20 wt % of a polyepoxide, where wt % is based on the total weight of the composition. Compositions can also comprise a from 0.5 wt % to 4 wt % of an adhesion promoter, where wt % is based on the total weight of the composition.

Compositions provided by the present disclosure can comprise, for example, from 35 wt % to 65 wt % of a thiol-terminated sulfur-containing prepolymer; from 15 wt % to 35 wt % of an organic filler; from 10 wt % to 30 wt % of an inorganic filler; and from 3 wt % to 16 wt % of a polyepoxide, where wt % is based on the total weight of the composition. Compositions can also comprise a from 0.5 wt % to 4 wt % of an adhesion promoter, where wt % is based on the total weight of the composition.

Compositions provided by the present disclosure can comprise, for example, from 45 wt % to 55 wt % of a thiol-terminated sulfur-containing prepolymer; from 15 wt % to 30 wt % of an organic filler; from 10 wt % to 25 wt % of an inorganic filler; and from 5 wt % to 14 wt % of a polyepoxide, where wt % is based on the total weight of the composition. Compositions can also comprise from 1.0 wt % to 3.0 wt % of an adhesion promoter, where wt % is based on the total weight of the composition.

Compositions provided by the present disclosure can comprise, for example, from 40 wt % to 60 wt % of a thiol-terminated sulfur-containing prepolymer; from 10 wt % to 30 wt % of an organic filler; from 5 wt % to 25 wt % of an inorganic filler; and from 5 wt % to 20 wt % of a polyepoxide, where wt % is based on the total weight of the composition. Compositions can also comprise from 1 wt % to 4 wt % of an adhesion promoter, where wt % is based on the total weight of the composition.

Compositions provided by the present disclosure can comprise, for example, from 45 wt % to 60 wt % of a thiol-terminated sulfur-containing prepolymer, from 10 wt % to 30 wt % of an organic filler, from 5 wt % to 25 wt % of an inorganic filler, from 1 wt % to 4 wt % of an adhesion promoter, from 4 wt % to 15 wt % of a polyepoxide, and from 0 wt % to 4 wt % of a plasticizer, where wt % is based on the total weight of the composition.

Compositions and curable sealants provided by the present disclosure can have a density equal to or less than 1.0 $g/cm^3$, equal to or less than 1.2 $g/cm^3$, equal to or less than 1.4 $g/cm^3$, or equal to or less than 1.65 $g/cm^3$, where density is determined according to ISO 2781.

Uncured sealants provided by the present disclosure can be provided as a two-part system comprising a first part and a second part which can be prepared and stored separately, combined, and mixed at the time of use.

Curable sealant systems of the present disclosure can be provided as two-part sealant compositions. The two-parts can be maintained separately and can be combined prior to use. A first part can comprise, for example, thiol-terminated polythioether prepolymers, organic filler, inorganic filler, adhesion promoter, catalyst, and other optional additives. A second part can comprise, for example, a polyepoxide curing agent, inorganic filler, adhesion promoter, plasticizer, and other optional additives. The optional additives can include plasticizers, pigments, solvents, reactive diluents, surfactants, thixotropic agents, fire retardants, and a combination of any of the foregoing.

Compositions, such as sealants, may be provided as multi-part compositions, such as two-part compositions, wherein one part comprises one or more thiol-terminated polythioether prepolymers and a second part comprises one or more polyepoxide curing agents. Additives and/or other materials may be added to either part as desired or necessary. The two parts may be combined and mixed prior to use.

The first part and the second part can be formulated to be rendered compatible when combined such that the constituents of the base and accelerator components can intermix and be homogeneously dispersed to provide a sealant or coating composition for application to a substrate. Factors affecting the compatibility of the first and second parts include, for example, viscosity, pH, density, and temperature.

A first part can comprise, for example, from 40 wt % to 80 wt % of a thiol-terminated sulfur-containing prepolymer, from 50 wt % to 70 wt %, or from 55 wt % to 65 wt %, of a thiol-terminated sulfur-containing prepolymer, where wt % is based on the total weight of the first part.

A first part can comprise from 10 wt % to 40 wt % of an organic filler, from 15 wt % to 35 wt %, from 20 wt % to 30 wt %, or from 22 wt % to 28 wt %, of an organic filler, where wt % is based on the total weight of the first part.

A first part can comprise from 5 wt % to 20 wt % of an inorganic filler, from 7 wt % to 18 wt %, or from 9 wt % to 16 wt % of an inorganic filler, where wt % is based on the total weight of the first part.

A first part can comprise, for example, from 40 wt % to 80 wt % of a thiol-terminated sulfur-containing prepolymer, from 10 wt % to 40 wt % of an organic filler, and from 5 wt % to 20 wt % of an inorganic filler, where wt % is based on the total weight of the first part.

A first part can comprise, for example, from 50 wt % to 70 wt % of a thiol-terminated sulfur-containing prepolymer, from 15 wt % to 35 wt % of an organic filler, and from 7 wt % to 18 wt % of an inorganic filler, where wt % is based on the total weight of the first part.

A first part can comprise, for example, from 55 wt % to 65 wt %, of a thiol-terminated sulfur-containing prepolymer, from 20 wt % to 30 wt % of an organic filler, and from 9 wt % to 16 wt % of an inorganic filler, where wt % is based on the total weight of the first part.

A second part can comprise, for example, from 30 wt % to 80 wt % of a polyepoxide, from 35 wt % to 80 wt %, or from 40 wt % to 80 wt %, where wt % is based on the total weight of the second part.

A second part can comprise, for example, from 5 wt % to 50 wt % of an inorganic filler, from 10 wt % to 50 wt %, or from 10 wt % to 45 wt % of an inorganic filler, where wt % is based on the total weight of the second part.

A second part can comprise, for example, from 1 wt % to 20 wt % of a plasticizer, from 5 wt % to 15 wt %, or from 7 wt % to 13 wt % of a plasticizer, where wt % is based on the total weight of the second part A second part can comprise, for example, from 30 wt % to 80 wt % of a polyepoxide, and from 5 wt % to 50 wt % of an inorganic filler, where wt % is based on the total weight of the second part.

A second part can comprise, for example, from 35 wt % to 80 wt % of a polyepoxide, and from 10 wt % to 50 wt % of an inorganic filler, where wt % is based on the total weight of the second part.

A second part can comprise, for example, from 40 wt % to 80 wt % of a polyepoxide, and from 15 wt % to 45 wt % of an inorganic filler, where wt % is based on the total weight of the second part.

The first part and second part can be combined a wt % ratio within a range, for example, from 100:10 to 100:25, within a range from 100:12 to 100:23, or within a range from 100:14 to 100:21.

Compositions provided by the present disclosure may be used, for example, in sealants, coatings, encapsulants, and potting compositions. A sealant includes a composition capable of producing a film that has the ability to resist operational conditions, such as moisture and temperature, and at least partially block the transmission of materials, such as water, fuel, and other liquids and gases. A coating can comprise a covering that is applied to the surface of a substrate to, for example, improve the properties of the substrate such as the appearance, adhesion, wettability, corrosion resistance, wear resistance, fuel resistance, and/or abrasion resistance. A sealant can be used to seal surfaces, smooth surfaces, fill gaps, seal joints, seal apertures, and other features. A potting composition can comprise a material useful in an electronic assembly to provide resistance to shock and vibration and to exclude moisture and corrosive agents. Sealant compositions provided by the present disclosure are useful, e.g., to seal parts on aerospace vehicles that can come into contact with phosphate ester hydraulic fluids such as Skydrol®.

Compositions and sealants provided by the present disclosure can be used with any suitable curing chemistry useful in aerospace coating and sealants. Compositions provided by the present disclosure include thiol-terminated sulfur-containing prepolymers cured with polyepoxides. These compositions comprise a high content of Skydrol®- and fuel-resistant organic filler in combination with inorganic filler. The incorporation of Skydrol®- and fuel-resistant organic filler into an aerospace coating or sealant is expected to impart improved Skydrol®- and fuel-resistance to the cured coating or sealant, regardless of the curing chemistry. For example, Skydrol®- and fuel-resistant organic filler can be used with Mn-cured polysulfides, and Michael acceptor cured thiol-terminated sulfur-containing prepolymers, and moisture-curable sulfur-containing prepolymers. Sulfur-containing prepolymers can be terminal-modified to include other reactive groups such as, for example, amine groups, hydroxyl groups, isocyanate groups, or polyalkoxysilyl groups. These terminal-modified sulfur-containing prepolymers can be used with polyurea, polyurethane, or moisture-curable chemistries in combination with Skydrol®- and fuel-resistant organic fillers to provide Skydrol®- and fuel-resistant coatings and sealants.

Curable compositions provided by the present disclosure can be used as aerospace sealants or coatings, and in particular, as sealants or coatings where resistance to hydraulic fluid is desired. A sealant refers to a curable composition that has the ability when cured to resist atmospheric conditions such as moisture and temperature and at least partially block the transmission of materials such as water, water vapor, fuel, solvents, and/or liquids and gases.

Compositions provided by the present disclosure may be applied directly onto the surface of a substrate or over an underlayer such as a primer by any suitable coating process. Compositions, including sealants, provided by the present disclosure may be applied to any of a variety of substrates. Examples of substrates to which a composition may be applied include metals such as titanium, stainless steel, steel alloy, aluminum, and aluminum alloy, any of which may be anodized, primed, organic-coated or chromate-coated; epoxy; urethane; graphite; fiberglass composite; Kevlar®; acrylics; and polycarbonates. Compositions provided by the present disclosure may be applied to a substrate such as aluminum and aluminum alloy.

Furthermore, methods are provided for sealing an aperture utilizing a composition provided by the present disclosure. These methods comprise, for example, applying the curable composition to at least one surface of a part; and curing the applied composition to provide a sealed part.

Sealant compositions provided by the present disclosure may be formulated as Class A, Class B, or Class C sealants. A Class A sealant refers to a brushable sealant having a viscosity of 1 poise to 500 poise and is designed for brush application. A Class B sealant refers to an extrudable sealant having a viscosity from 4,500 poise to 20,000 poise and is designed for application by extrusion via a pneumatic gun. A Class B sealant can be sued to form fillets and sealing on vertical surfaces or edges where low slump/slag is required. A Class C sealant has a viscosity from 500 poise to 4,500 poise and is designed for application by a roller or combed tooth spreader. A Class C sealant can be used for fay surface sealing. Viscosity can be measured according to Section 5.3 of SAE Aerospace Standard AS5127/1C published by SAE International Group.

Furthermore, methods are provided for sealing an aperture utilizing a composition provided by the present disclosure. These methods comprise, for example, providing the curable composition of the present disclosure; applying the curable composition to at least one surface of a part; and curing the applied composition to provide a sealed part.

A composition provided by the present disclosure may be cured under ambient conditions, where ambient conditions refers to a temperature from 20° C. to 25° C., and atmospheric humidity. A composition may be cured under conditions encompassing a temperature from a 0° C. to 100° C. and humidity from 0% relative humidity to 100% relative humidity. A composition may be cured at a higher temperature such as at least 30° C., at least 40° C., or at least 50° C. A composition may be cured at room temperature, e.g., 25°

C. The methods may be used to seal apertures on aerospace vehicles including aircraft and aerospace vehicles.

Apertures, surfaces, joints, fillets, fay surfaces including apertures, surfaces, fillets, joints, and fay surfaces of aerospace vehicles, sealed with compositions provided by the present disclosure are also disclosed. The compositions and sealants can also be used to seat fasteners.

The time to form a viable seal using curable compositions of the present disclosure can depend on several factors as can be appreciated by those skilled in the art, and as defined by the requirements of applicable standards and specifications. In general, curable compositions of the present disclosure develop adhesion strength within about 3 days to about 7 days following mixing and application to a surface. In general, full adhesion strength as well as other properties of cured compositions of the present disclosure becomes fully developed within 7 days following mixing and application of a curable composition to a surface.

A cured composition can have a thickness, for example, from 5 mils to 25 mils (127 μm to 635 μm) such as from 10 mils to 20 mils (254 μm to 508 μm).

Prior to environmental exposure a cured sealant provided by the present disclosure exhibits a density less than 1.2 g/cm$^3$ (specific gravity less than 1.2) as determined according to ISO 2781, a tensile strength greater than 1 MPa determined according to ISO 37, a tensile elongation greater than 150% determined according to ISO 37, and a hardness greater than 40 Shore A determined according to ISO 868, where the tests are performed at a temperature within a range of 21° C. to 25° C., and a humidity from 45% RH to 55% RH.

Following exposure to aviation fuel (JRF Type 1) according to ISO 1817 for 168 hours at 60° C., a cured sealant provided by the present disclosure exhibits a tensile strength greater than 1.4 MPa determined according to ISO 37, a tensile elongation greater than 150% determined according to ISO 37, and a hardness greater than 30 Shore A determined according to ISO 868, where the tests are performed at a temperature within a range of 21° C. to 25° C., and a humidity from 45% RH to 55% RH.

Following exposure to 3% aqueous NaCl for 168 hours at 60° C., a cured sealant provided by the present disclosure exhibits a tensile strength greater than 1.4 MPa determined according to ISO 37, a tensile elongation greater than 150% determined according to ISO 37, and a hardness greater than 30 Shore A determined according to ISO 868, where the tests are performed at a temperature within a range of 21° C. to 25° C., and a humidity from 45% RH to 55% RH.

Following exposure to de-icing fluid according to ISO 11075 Type 1 for 168 hours at 60° C., a cured sealant provided by the present disclosure exhibits a tensile strength greater than 1 MPa determined according to ISO 37, and a tensile elongation greater than 150% determined according to ISO 37, where the tests are performed at a temperature within a range of 21° C. to 25° C., and a humidity from 45% RH to 55% RH.

Following exposure to phosphate ester hydraulic fluid (Skydrol® LD-4) for 1,000 hours at 70° C., a cured sealant provided by the present disclosure exhibits a tensile strength greater than 1 MPa determined according to ISO 37, a tensile elongation greater than 150% determined according to ISO 37, and a hardness greater than Shore 30A determined according to ISO 868, where the tests are performed at a temperature within a range of 21° C. to 25° C., and a humidity from 45% RH to 55% RH.

ASPECTS OF THE INVENTION

Aspect 1. A composition comprising: (a) from 35 wt % to 65 wt % of a thiol-terminated sulfur-containing prepolymer; (b) from 10 wt % to 35 wt % of an organic filler; (c) from 5 wt % to 30 wt % of an inorganic filler; and (d) from 5 wt % to 20 wt % of a polyepoxide, wherein wt % is based on the total weight of the composition.

Aspect 2. The composition of aspect 1, wherein the thiol-terminated sulfur-containing prepolymer comprises a thiol-terminated polythioether prepolymer, a thiol-terminated polysulfide prepolymer, a thiol-terminated sulfur-containing polyformal prepolymer, a thiol-terminated monosulfide prepolymer, or a combination of any of the foregoing.

Aspect 3. The composition of any one of aspects 1 to 2, wherein the thiol-terminated sulfur-containing prepolymer comprises a thiol-terminated polythioether prepolymer comprising at least one moiety having the structure of Formula (1):

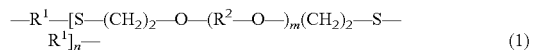

$$—R^1—[S—(CH_2)_2—O—(R^2—O—)_m(CH_2)_2—S—R^1]_n— \qquad (1)$$

wherein,
each $R^1$ is independently selected from a $C_{2-10}$ n-alkanediyl group, a $C_{3-6}$ branched alkanediyl group, a $C_{6-8}$ cycloalkanediyl group, a $C_{6-10}$ alkanecycloalkanediyl group, a divalent heterocyclic group, and a —[(CHR$^3$)$_p$—X—]$_q$(CHR$^3$)$_r$— group, wherein each $R^3$ is selected from hydrogen and methyl;
each $R^2$ is independently selected from a $C_{2-10}$ n-alkanediyl group, a $C_{3-6}$ branched alkanediyl group, a $C_{6-8}$ cycloalkanediyl group, a $C_{6-14}$ alkanecycloalkanediyl group, a divalent heterocyclic group, and a —[(CH$_2$)$_p$—X—]$_q$(CH$_2$)$_r$— group;
each X is independently selected from O, S, or NR, wherein R is selected from hydrogen and methyl;
m ranges from 0 to 50;
n is an integer ranging from 1 to 60;
p is an integer ranging from 2 to 6;
q is an integer ranging from 1 to 5; and
r is an integer ranging from 2 to 10.

Aspect 4. The composition of any one of aspects 1 to 3, wherein the thiol-terminated sulfur-containing prepolymer comprises a thiol-terminated polythioether prepolymer of Formula (1a), a thiol-terminated polythioether prepolymer of Formula (1b), a thiol-terminated polythioether prepolymer of Formula (1c), or a combination of any of the foregoing:

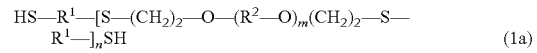

$$HS—R^1—[S—(CH_2)_2—O—(R^2—O)_m(CH_2)_2—S—R^1—]_nSH \qquad (1a)$$

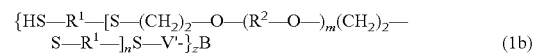

$$\{HS—R^1—[S—(CH_2)_2—O—(R^2—O—)_m(CH_2)_2—S—R^1—]_nS—V'-\}_zB \qquad (1b)$$

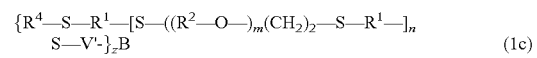

$$\{R^4—S—R^1—[S—((R^2—O—)_m(CH_2)_2—S—R^1—]_nS—V'-\}_zB \qquad (1c)$$

wherein,
each $R^1$ is independently selected from $C_{2-10}$ alkanediyl, $C_{6-8}$ cycloalkanediyl, $C_{6-14}$ alkanecycloalkanediyl, $C_{5-8}$ heterocycloalkanediyl, and —[(CHR$^3$)$_p$—X—]$_q$(CHR$^3$)$_r$-, wherein,
p is an integer from 2 to 6;
q is an integer from 1 to 5;
r is an integer from 2 to 10;
each $R^3$ is independently selected from hydrogen and methyl; and
each X is independently selected from —O—, —S—, and —NR—, wherein R is selected from hydrogen and methyl;
each $R^2$ is independently selected from $C_{1-10}$ alkanediyl, $C_{6-8}$ cycloalkanediyl, $C_{6-14}$ alkanecycloalkanediyl, and —[(CHR$^3$)$_p$—X—]$_q$(CHR$^3$)$_r$—, wherein p, q, r, $R^3$, and X are as defined as for $R^1$;

m is an integer from 0 to 50;
n is an integer from 1 to 60;
B represents a core derived from a z-valent, polyfunctionalizing agent B(—V)$_z$ wherein,
z is an integer from 3 to 6; and
each V is a moiety comprising a terminal group reactive with a thiol;
each —V'— is derived from the reaction of —V with a thiol;
each R$^4$ is independently selected from hydrogen and a bond to the polyfunctionalizing agent B(—V)$_z$. through a moiety of Formula (1).

Aspect 5. The composition of any one of aspects 3 to 4, wherein,
each R$^1$ is —[(CH$_2$)$_p$—O-]$_q$(CH$_2$)$_r$—;
each R$^2$ is C$_{1-6}$ alkanediyl;
m is an integer from 0 to 3;
each p is 2;
q is 1 or 2; and
r is 2; and z is 3.

Aspect 6. The composition of any one of aspects 3 to 4, wherein
each R$^1$ is —[(CH$_2$)$_p$—O-]$_q$(CH$_2$)$_r$—;
each R$^2$ is C$_{1-6}$ alkanediyl;
m is an integer from 1 to 3;
each p is 2;
q is 1 or 2;
r is 2; and
z is 3.

Aspect 7. The composition of any one of aspects 1 to 6, wherein the thiol-terminated sulfur-containing prepolymer comprises a thiol-terminated sulfur-containing polyformal comprising a moiety of Formula (4):

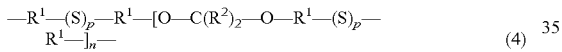

(4)

wherein,
n is an integer from 1 to 50;
each p is independently selected from 1 and 2;
each R$^1$ can be C$_{2-6}$ alkanediyl; and
each R$^2$ can independently be selected from hydrogen, C$_{1-6}$ alkyl, C$_{7-12}$ phenylalkyl, substituted C$_{7-12}$ phenylalkyl, C$_{6-12}$ cycloalkylalkyl, substituted C$_{6-12}$ cycloalkylalkyl, C$_{3-12}$ cycloalkyl, substituted C$_{3-12}$ cycloalkyl, C$_{6-12}$ aryl, and substituted C$_{6-12}$ aryl.

Aspect 8. The composition of any one of aspects 1 to 7, wherein the thiol-terminated sulfur-containing prepolymer comprises a thiol-terminated sulfur-containing polyformal prepolymer of Formula (4b), a thiol-terminated sulfur-containing polyformal prepolymer of Formula (4a), or a combination thereof:

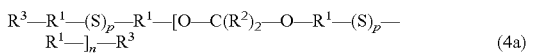

(4a)

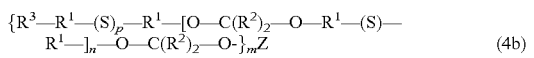

(4b)

wherein,
n is an integer selected from 1 to 50;
each p is independently selected from 1 and 2;
each R$^1$ is selected from C$_{2-6}$ alkanediyl;
each R$^2$ independently is selected from hydrogen, C$_{1-6}$ alkyl, C$_{7-12}$ phenylalkyl, substituted C$_{7-12}$ phenylalkyl, C$_{6-12}$ cycloalkylalkyl, substituted C$_{6-12}$ cycloalkylalkyl, C$_{3-12}$ cycloalkyl, substituted C$_{3-12}$ cycloalkyl, C$_{6-12}$ aryl, and substituted C$_{6-12}$ aryl; and
each R$^3$ comprises a thiol-terminated group; and
Z is derived from the core of an m-valent parent polyol Z(OH)$_m$.

Aspect 9. The composition of aspect 8, wherein each R$^3$ is selected from a group of Formula (a), Formula (b), Formula (c), Formula (d), Formula (e), and Formula (f):

 (a)

 (b)

 (c)

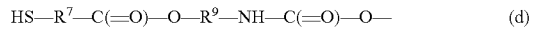 (d)

 (e)

 (f)

wherein,
each R$^6$ comprises a moiety derived from a diisocyanate or a moiety derived from an ethylenically unsaturated monoisocyanate;
each R$^7$ is selected from C$_{2-14}$ alkanediyl and C$_{2-14}$ heteroalkanediyl; and
each R$^9$ is selected from C$_{2-6}$ alkanediyl, C$_{2-6}$ heteroalkanediyl, C$_{6-12}$ arenediyl, substituted C$_{6-12}$ arenediyl, C$_{6-12}$ heteroarenediyl, substituted C$_{6-12}$ heteroarenediyl, C$_{3-12}$ cycloalkanediyl, substituted C$_{3-12}$ cycloalkanediyl, C$_{3-12}$ heterocycloalkanediyl, substituted C$_{3-12}$ heterocycloalkanediyl, C$_{7-18}$ alkanearenediyl, substituted C$_{7-18}$ heteroalkanearenediyl, C$_{4-18}$ alkanecycloalkanediyl, and substituted C$_{4-18}$ alkanecycloalkanediyl.

Aspect 10. The composition of any one of aspects 1 to 9, wherein the sulfur-containing prepolymer comprises a thiol-terminated monosulfide prepolymer comprising a moiety of Formula (8):

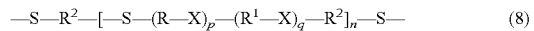 (8)

wherein,
each R is independently selected from C$_{2-10}$ alkanediyl, C$_{2-10}$ branched alkanediyl, C$_{6-8}$ cycloalkanediyl, C$_{6-14}$ alkylcycloalkyanediyl, and C$_{8-10}$ alkylarenediyl;
each R$^1$ is independently selected from hydrogen, C$_{1-10}$ n-alkanediyl, C$_{2-10}$ branched alkanediyl, C$_{6-8}$ cycloalkanediyl, C$_{6-14}$ alkylcycloalkanediyl, and C$_{8-10}$ alkylarenediyl;
each R$^2$ is independently selected from hydrogen, C$_{1-10}$ n-alkanediyl, C$_{2-10}$ branched alkanediyl, C$_{6-8}$ cycloalkanediyl; C$_{6-14}$ alkylcycloalkanediyl, and C$_{8-10}$ alkylarenediyl;
each X is independently selected from O and S;
p is an integer from 1 to 5;
q is an integer from 0 to 5; and
n is an integer from 1 to 60.

Aspect 11. The composition of any one of aspects 1 to 10, wherein the thiol-terminated sulfur-containing prepolymer comprises a thiol-terminated monosulfide prepolymer of Formula (8a), a thiol-terminated monosulfide prepolymer of Formula (8b), a thiol-terminated monosulfide prepolymer of Formula (8c), or a combination of any of the foregoing:

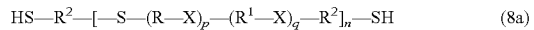 (8a)

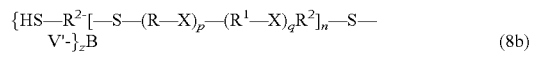 (8b)

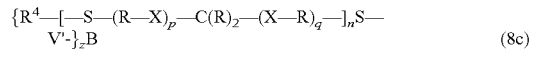 (8c)

wherein,
each X is independently selected from S, O, and $NR^3$, where $R^3$ is selected from $C_{1-4}$ alkyl;
p is an integer from 1 to 5;
q is an integer from 0 to 5;
n is an integer from 1 to 60;
each R is independently selected from $C_{2-10}$ alkanediyl, $C_{6-8}$ cycloalkanediyl, $C_{1-4}$ alkylcycloalkanediyl, and $C_{8-10}$ alkylarenediyl;
each $R^1$ is independently selected from $C_{1-10}$ alkanediyl, $C_{6-8}$ cycloalkanediyl, $C_{1-4}$ alkylcycloalkanediyl, and $C_{8-10}$ alkylarenediyl;
each $R^2$ is independently selected from $C_{2-10}$ alkanediyl, $C_{6-8}$ cycloalkanediyl, $C_{1-4}$ alkylcycloalkanediyl, and $C_{8-10}$ alkylarenediyl;
B represents a core of a z-valent polyfunctionalizing agent $B(-V)_z$ wherein:
z is an integer from 3 to 6; and
each V is a moiety comprising a terminal group reactive with a thiol group;
each —V'— is derived from the reaction of —V with a thiol; and
each $R^4$ is independently selected from hydrogen and a bond to a polyfunctionalizing agent $B(-V)_z$ through a moiety of Formula (8).

Aspect 12. The composition of any one of aspects 1 to 11, wherein the sulfur-containing prepolymer comprises a thiol-terminated monosulfide prepolymer comprising a moiety of Formula (9):

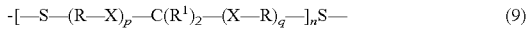

-[—S—(R—X)$_p$—C(R$^1$)$_2$—(X—R)$_q$—]$_n$S—  (9)

wherein,
each R is independently selected from $C_{2-10}$ alkanediyl, a $C_{3-10}$ branched alkanediyl, $C_{6-8}$ cycloalkanediyl, $C_{6-14}$ alkylcycloalkyanediyl, and $C_{8-10}$ alkylarenediyl;
each $R^1$ is independently selected from hydrogen, $C_{1-10}$ n-alkanediyl, $C_{3-10}$ branched alkanediyl, $C_{6-8}$ cycloalkanediyl group; $C_{6-14}$ alkylcycloalkanediyl, and $C_{8-10}$ alkylarenediyl;
each X is independently selected from O and S;
p is an integer from 1 to 5;
q is an integer from 1 to 5; and
n is an integer from 1 to 60.

Aspect 13. The composition of any one of aspects 1 to 12, wherein the thiol-terminated sulfur-containing prepolymer comprises a thiol-terminated monosulfide prepolymer of Formula (9a), a thiol-terminated monosulfide prepolymer of Formula (9b), a thiol-terminated monosulfide prepolymer of Formula (9c), or a combination of any of the foregoing:

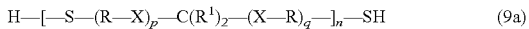

H—[—S—(R—X)$_p$—C(R$^1$)$_2$—(X—R)$_q$—]$_n$—SH  (9a)

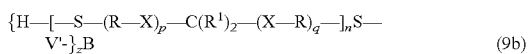

{H—[—S—(R—X)$_p$—C(R$^1$)$_2$—(X—R)$_q$—]$_n$S—V'-}$_z$B  (9b)

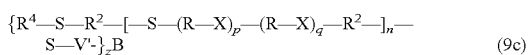

{R$^4$—S—R$^2$—[—S—(R—X)$_p$—(R—X)$_q$—R$^2$—]$_n$—S—V'-}$_z$B  (9c)

wherein,
each X is independently selected from S and O;
p is an integer from 1 to 5;
q is an integer from 1 to 5;
n is an integer from 1 to 60;
each R is independently selected from $C_{2-10}$ alkanediyl;
each $R^1$ is independently selected from hydrogen and $C_{1-10}$ alkanediyl;

B represents a core of a z-valent polyfunctionalizing agent $B(-V)_z$ wherein:
z is an integer from 3 to 6; and
each V is a moiety comprising a terminal group reactive with a thiol group;
each —V'— is derived from the reaction of —V with a thiol; and
each $R^4$ is independently selected from hydrogen and a bond to a polyfunctionalizing agent $B(-V)_z$ through a moiety of Formula (9).

Aspect 14. The composition of any one of aspects 1 to 13, wherein the thiol-terminated sulfur-containing prepolymer comprises a thiol-terminated polysulfide prepolymer of Formula (10), thiol-terminated polysulfide prepolymer of Formula (11), or a combination thereof:

SH—(R—S—S)$_n$—R—SH  (10)

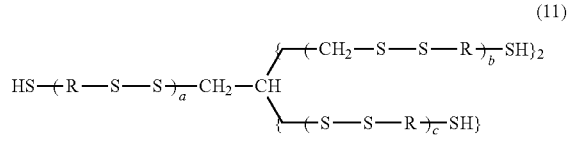

(11)

wherein each R is —(CH$_2$)$_2$—O—CH$_2$—O—(CH$_2$)$_2$—, and n=a+b+c, and n is from 7 to 38.

Aspect 15. The composition of any one of aspects 1 to 14, wherein the thiol-terminated sulfur-containing prepolymer comprises a thiol-terminated polysulfide of Formula (12):

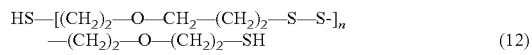

HS—[(CH$_2$)$_2$—O—CH$_2$—(CH$_2$)$_2$—S—S-]$_n$
—(CH$_2$)$_2$—O—(CH$_2$)$_2$—SH  (12)

wherein n is selected such that the number average molecular weight of the thiol-terminated polysulfide is within a range from 1,000 Daltons to 7,500 Daltons.

Aspect 16. The composition of any one of aspects 1 to 15, wherein the thiol-terminated sulfur-containing prepolymer comprises a thiol-terminated polysulfide prepolymer of Formula (13):

HS—R—(S$_y$—R)$_t$—SH  (13)

wherein,
t is an integer from 1 to 60;
q is an integer from 1 to 8;
p is an integer from 1 to 10;
r is an integer from 1 to 10;
y has an average value within a range from 1.0 to 1.5;
each R is independently selected from branched alkanediyl, branched arenediyl, and a moiety having the structure —(CH$_2$)$_p$—O—(CH$_2$)$_q$—O—(CH$_2$)$_r$—;
B represents a core of a z-valent polyfunctionalizing agent $B(-V)_z$ wherein:
z is an integer from 3 to 6; and
each V is a moiety comprising a terminal group reactive with a thiol group; and
each —V'— is derived from the reaction of —V with a thiol.

Aspect 17. The composition of any one of aspects 1 to 15, wherein the thiol-terminated sulfur-containing prepolymer comprises a thiol-terminated polysulfide prepolymer of Formula (14):

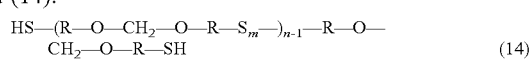

HS—(R—O—CH$_2$—O—R—S$_m$—)$_{n-1}$—R—O—CH$_2$—O—R—SH  (14)

wherein R is $C_{2-4}$ alkanediyl, m is 1 an integer from 8, and n is an integer from 2 to 370.

Aspect 18. The composition of any one of aspects 1 to 17, wherein the organic filler comprises an organic filler that exhibits a swelling of less than 1 vol % following immersion in Skydrol® LD-4 at a temperature of less than 50° C. for 1,000 hours, or less than 1.2 vol % following immersion in Skydrol® LD-4 at a temperature of less than 70° C. for 1,000 hours, where the percent swelling is determined according to EN ISO 10563.

Aspect 19. The composition of any one of aspects 1 to 20, wherein the organic filler comprises a polyamide, a polyimide, a polyimide, a polyphenylene sulfide, a polyether sulfone, a thermoplastic copolyester, coated microcapsules, or a combination of any of the foregoing.

Aspect 20. The composition of aspect 19, wherein the polyamide comprises a polyamide 6, a polyamide 12, or a combination thereof.

Aspect 21. The composition of any one of aspects 19 to 20, wherein the coated microcapsules comprise coated expanded thermoplastic microcapsules.

Aspect 22. The composition of any one of aspects 19 to 21, wherein the coated microcapsules comprise a coating of an aminoplast resin.

Aspect 23. The composition of any one of aspects 19 to 22, wherein the aminoplast resin comprises a melamine resin, a urea-formaldehyde resin, a melamine-formaldehyde, or a combination of any of the foregoing.

Aspect 24. The composition of any one of aspects 1 to 23, wherein the organic filler comprises expanded thermoplastic microcapsules coated with a melamine resin.

Aspect 25. The composition of any one of aspects 1 to 23, wherein the organic filler comprises polyamide, a polyimide, a polyphenylene sulfide, a polyether sulfone, a thermoplastic copolyester, or a combination of any of the foregoing; and expanded thermoplastic microcapsules coated with a melamine resin.

Aspect 26. The composition of any one of aspects 1 to 23, wherein the organic filler comprises a polyamide, a polyimide, a polyphenylene sulfide, a polyether sulfone, or a combination of any of the foregoing.

Aspect 27. The composition of any one of aspects 1 to 26, wherein the organic filler comprises a polyamide, a polyimide, a polyphenylene sulfide, a polyether sulfone, a thermoplastic copolyester, or a combination of any of the foregoing Aspect 28. The composition of any one of aspects 1 to 27, wherein the inorganic filler comprises precipitated calcium carbonate, fumed silica, or a combination thereof.

Aspect 29. The composition of any one of aspects 1 to 28, wherein the polyepoxide comprises a hydroxyl-functional bisphenol A/epichlorohydrin derived polyepoxide, a phenol novolac polyepoxide, or a combination thereof.

Aspect 30. The composition of any one of aspects 1 to 29, wherein the polyepoxide comprises: from 40 wt % to 60 wt % of a hydroxyl-functional bisphenol A/epichlorohydrin derived polyepoxide; and from 40 wt % to 60 wt % of a phenol novolac polyepoxide; wherein wt % is based on the total weight of the polyepoxide in the composition.

Aspect 31. The composition of any one of aspects 1 to 30, wherein the polyepoxide comprises: from 30 wt % to 80 wt % of a hydroxyl-functional polyepoxide; wherein wt % is based on the total weight of the polyepoxide in the composition.

Aspect 32. The composition of any one of aspects 1 to 31, comprising an adhesion promoter, wherein the composition comprises from 0.5 wt % to 4 wt % of the adhesion promoter; and wt % is based on the total weight of the composition.

Aspect 33. The composition of any one of aspects 1 to 32, comprising an adhesion promoter, wherein the adhesion promoter comprises an organo-functional silane, a phenolic resin, or a combination thereof.

Aspect 34. The composition of any one of aspects 1 to 33, comprising an adhesion promoter, wherein the adhesion promoter comprises an amino-functional silane.

Aspect 35. The composition of any one of aspects 1 to 34, wherein the composition comprises a specific gravity within a range from 0.9 to 1.15, wherein the specific gravity is determined according to ISO 2781.

Aspect 36. The composition of any one of aspects 1 to 35, wherein the thiol-terminated sulfur-containing prepolymer comprises a thiol-terminated polythioether prepolymer; the organic filler comprises a polyamide. a polyimide, a polyphenylene sulfide, a polyether sulfone, a thermoplastic copolyester, or a combination of any of the foregoing; the inorganic filler comprises precipitated calcium carbonate and fumed silica; and the polyepoxide comprises a hydroxyl-functional bisphenol A/epichlorohydrin derived polyepoxide and a phenol novolac polyepoxide.

Aspect 37. The composition of any one of aspects 1 to 36, comprising an adhesion promoter, wherein the adhesion promoter comprises an organo-functional silane, such as an amino-functional silane, and a phenolic resin.

Aspect 38. The composition of any one of aspects 1 to 37, wherein the composition comprises from 40 wt % to 60 wt % of the thiol-terminated sulfur-containing prepolymer, wherein wt % is based on the total weight of the composition.

Aspect 39. The composition of any one of aspects 1 to 38, wherein the composition comprises from 10 wt % to 30 wt % of the organic filler, wherein wt % is based on the total weight of the composition.

Aspect 40. The composition of any one of aspects 1 to 39, wherein the composition comprises from 5 wt % to 25 wt % of the inorganic filler, wherein wt % is based on the total weight of the composition.

Aspect 41. The composition of any one of aspects 1 to 40, wherein the composition comprises from 5 wt % to 20 wt % of the polyepoxide, wherein wt % is based on the total weight of the composition.

Aspect 42. The composition of any one of aspects 1 to 41, wherein the polyepoxide comprises a urethane-modified diepoxide.

Aspect 43. The composition of any one of aspects 1 to 42, wherein the composition from 1.0 wt % to 4.0 wt % of an adhesion promoter.

Aspect 44. The composition of any one of aspects 1 to 43, wherein the composition comprises from 0.5 wt % to 3.5 wt % of a plasticizer, wherein wt % is based on the total weight of the composition.

Aspect 45. The composition of any one of aspects 1 to 44, wherein the composition comprises: (a) from 40 wt % to 60 wt % of the thiol-terminated sulfur-containing prepolymer; (b) from 10 wt % to 30 wt % of the organic filler; (c) from 5 wt % to 25 wt % of the inorganic filler; and (d) from 5 wt % to 20 wt % of the polyepoxide, wherein wt % is based on the total weight of the composition.

Aspect 46. A cured composition obtained from the composition of any one of aspects 1 to 45.

Aspect 47. The cured composition of aspect 46, wherein the cured composition comprises a tensile strength greater than 1 MPa, an elongation greater than 150%, and a hardness greater than Shore 30A, following immersion in Skydrol® LD-4 at 70° C. for 1,000 hours, wherein, tensile strength is determined according to ISO 37, elongation is determined according to ISO 37, and hardness is determined according to ISO 868.

Aspect 48. A part sealed with the cured composition of any one of aspects 46 to 47.

Aspect 49. A sealant system comprising a first part and a second part, wherein, the first part comprises: from 50 wt % to 70 wt % of a thiol-terminated sulfur-containing prepolymer; from 15 wt % to 40 wt % of an organic filler; from 2 wt % to 16 wt % of an inorganic filler, and from 0.5 wt % to 3 wt % of an adhesion promoter, wherein wt % is based on the total weight of the first part; and the second part comprises: from 35 wt % to 80 wt % of a polyepoxide; from 10 wt % to 50 wt % of an inorganic filler, and from 0.5 wt % to 10 wt % of an adhesion promoter, wherein wt % is based on the total weight of the second part.

Aspect 50. The sealant system of aspect 49, wherein the thiol-terminated sulfur-containing prepolymer, the organic filler, the inorganic filler, and the adhesion promoter are defined as in any one of aspects 2 to 37.

Aspect 51. The sealant system of any one of aspects 49 to 50, comprising a combination of the first part and the second part, wherein the wt % ratio of the first part to the second part is within a range from 100:10 to 100:25.

Aspect 52. A cured composition prepared from the sealant system of any one of aspects 49 to 51.

Aspect 53. A part sealed with the cured composition of aspect 52.

Aspect 54. A method of sealing a part, comprising applying the composition of any one of aspects 1 to 45 to a part; and curing the applied composition to provide a sealed part.

Aspect 55. A method of sealing a part, comprising combining the first part of the sealant system of any one of aspects 49 to 51 with the second part of the sealant system of any one of aspects 49 to 51 to provide a sealant composition; applying the sealant composition to a part; and curing the applied composition to provide a sealed part.

EXAMPLES

Embodiments provided by the present disclosure are further illustrated by reference to the following examples, which describe the compositions provided by the present disclosure and uses of such compositions. It will be apparent to those skilled in the art that many modifications, both to materials, and methods, may be practiced without departing from the scope of the disclosure.

Comparative Example 1

Manganese-Cured Polysulfide Sealant

PR-1782 B-2 is a two-part, manganese dioxide-cured polysulfide sealant with a 2-hour application time, commercially available from PPG Aerospace, Sylmar, Calif. PR-1782 Part B was mixed with PR-1782 Part A according to the manufacturer instructions. The mixture was allowed to cure at room temperature for 2 days, followed by 60° C. for one day. After this, a portion of the cured sample was immersed in Skydrol® LD-4 (a hydraulic fluid, commercially available from Eastman Chemicals) at 70° C. for 96 hours or for 500 hours. At the end of immersion, the sample was allowed to cool down for 60 min, after which time the hardness was measured according to ISO 868. The results are provided in Table 1.

A second portion of the cured sample was immersed in Skydrol® LD-4 at 70° C. for 96 hours. The percent swell was measured according to EN ISO 10563 and the results are provided Table 2.

TABLE 1

Hardness (Shore A) after Skydrol ® LD-4 immersion.

| Exposure conditions | PR-1782 B-2 | PR-2001 B-2 |
|---|---|---|
| None | 47 | 58 |
| 70° C./96 hours | 5 | 31 |
| 70° C./500 hours | 0 | 18 |

TABLE 2

Volume Swell (%) after Skydrol ® LD-4 immersion.

| Exposure conditions | PR-1782 B-2 | PR-2001 B-2 |
|---|---|---|
| 70° C./96 hours | 90 | 117 |

Comparative Example 2

Polyepoxy-Cured Polythioether Sealant

PR-2001 B-2 is a two-part, thiol-terminated polythioether cured with polyepoxides, with a 2 hour application time and is commercially available from PPG Aerospace, Sylmar, Calif. PR-2001 Part B was mixed with PR-2001 Part A according to the manufacturer instructions. The mixture was allowed to cure at room temperature for 2 days, followed by 60° C. for one day. After this, a portion of the cured sample was immersed in Skydrol® LD-4 (a hydraulic fluid, commercially available from Eastman Chemical) at 70° C. for 96 hours or 500 hours. At the end of immersion, the sample was allowed to cool down for 60 minutes and the hardness measured according to ISO 868. The results are provided in Table 1.

A second portion of the cured sample was immersed in Skydrol® LD-4 at 70° C. for 96 hours. After immersion, the percent swell was measured according to EN ISO 10563 and the results are provided in Table 2.

Example 1

Hydraulic Fluid-Resistant and Fuel-Resistant Polyamide-Containing Sealant Composition To prepare a Skydrol®- and fuel-resistant sealant containing a polyamide filler, a composition comprising a thiol-terminated polythioether prepolymer (Part B) and a composition comprising a polyepoxide (Part A) was prepared. The components of the Part B and Part A compositions are shown in Table 3 and Table 4, respectively.

TABLE 3

Part B composition.

| Component | Material | Amount (wt %) |
|---|---|---|
| Sulfur-containing prepolymer | Permapol ® P3.1E* thiol-terminated polythioether | 61.26 |
| Organic filler | Coated microspheres** | 0.25 |

TABLE 3-continued

Part B composition.

| Component | Material | Amount (wt %) |
|---|---|---|
| Organic filler | Ganzpearl ® polyamide particles | 24.5 |
| Inorganic filler | Socal ® 31 calcium carbonate | 8.28 |
| Inorganic filler | Aerosil ® R201 fumed silica | 3.06 |
| Adhesion promoter | T-3920* cooked phenolic resin | 0.41 |
| Adhesion promoter | T-3921* cooked phenolic resin | 0.33 |
| Adhesion promoter | Silquest ® A-1100 amino-functional silane | 0.5 |
| Adhesion promoter | Methylon ® 75108 phenolic resin | 0.83 |
| Catalyst | DABCO 33-LV triethylenediamine | 0.58 |

*Commercially available from PPG Aerospace, Sylmar, CA.
**Prepared according to U.S. Application Publication No. 2016/0083619, Example 1, paragraph [0085].
***Commercially available from Sakai Trading, New York, NY.

TABLE 4

Part A composition.

| Component | Material | Amount (wt %) |
|---|---|---|
| Polyepoxide | Epon ® 828 bisphenol A/epichlorohydrin derived epoxy resin | 20.33 |
| Polyepoxide | KD-9011* urethane-modified diepoxide | 2.26 |
| Polyepoxide | DEN ® 431 epoxy novolac resin | 22.59 |
| Adhesion promoter | T-1601** hydrolyzed silane | 2.39 |
| Inorganic filler | Winnofil ® SPM precipitated calcium carbonate | 22.59 |
| Inorganic filler | Socal ® N2R precipitated calcium carbonate | 18.08 |
| Pigment | Phthalocyanine pigment§ | 0.90 |
| Plasticizer | FAIRAD ® Plasticizer** α-methyl styrene homopolymer | 10.85 |

*Commercially available from Kukdo Chemical Co. Ltd, Seoul, Korea.
**Commercially available from PPG Aerospace, Sylmar, CA.
§Commercially available from PPG Aerospace.

A sealant composition was prepared by mixing 100 parts of the Part B composition with 18.64 parts of the Part A composition. The sealant composition was spread out as a ¼-inch thick sheet and allowed to cure at room temperature for 2 days at room temperature (23° C.), followed by 60° C. for one day.

Figure 2:
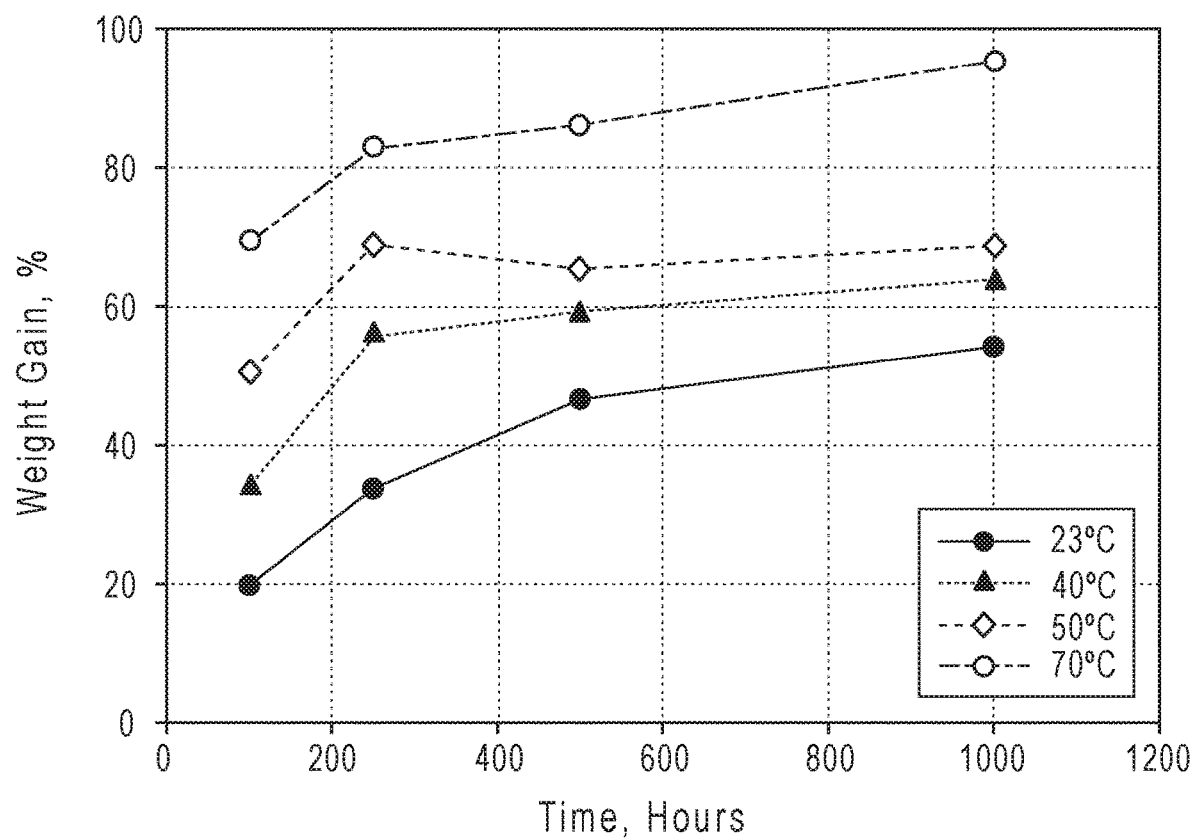
FIG. 2 is a graph showing the weight gain of a sealant following immersion in Skydrol® LD-4 at various temperatures.
Figure 3:
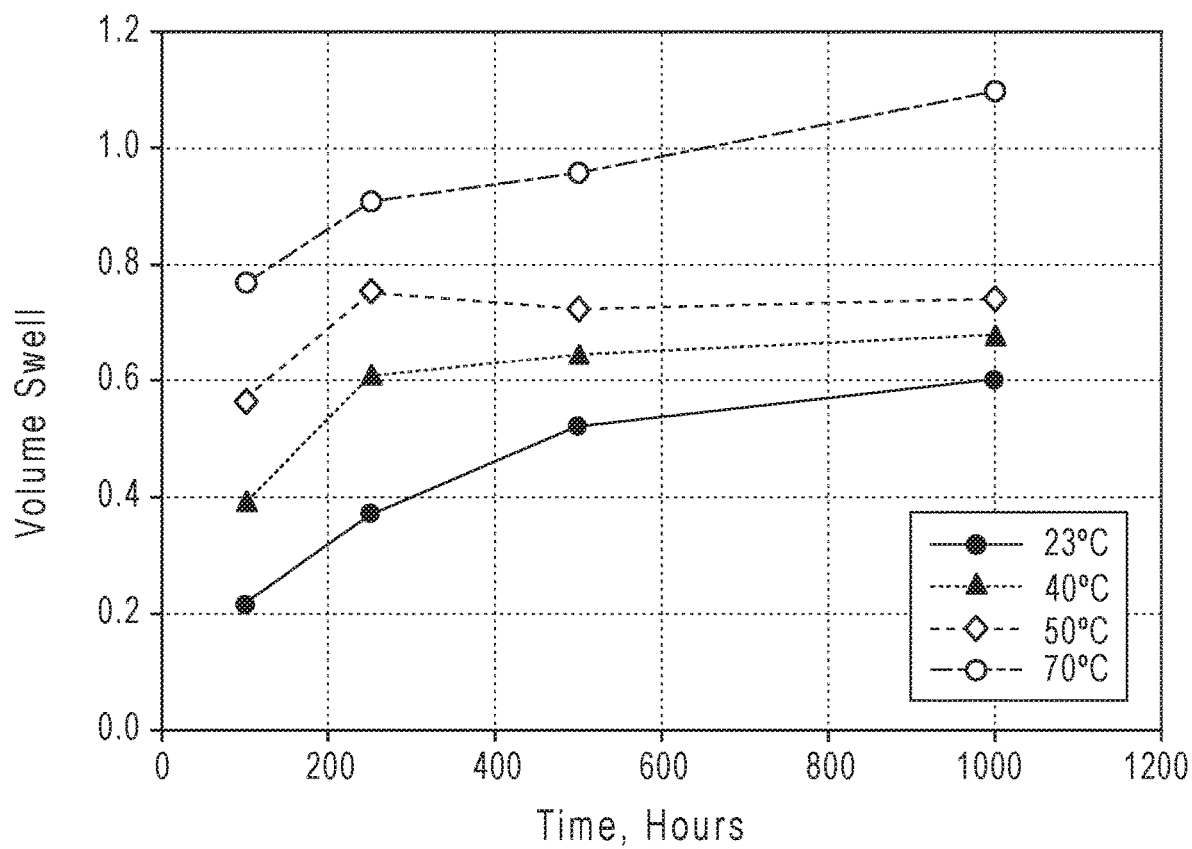
FIG. 3 is a graph showing the volume swell of a sealant following immersion in Skydrol® LD-4 at various temperatures.

The cured samples were immersed in Skydrol® LD-4 at temperatures from 23° C. to 70° C. for up to 1,000 hours. After the samples were cured, hardness was determined according to ISO 868. Volume swell was determined according to EN ISO 10563. Tensile strength and elongation were determined according to ISO 37. The results are presented in FIGS. 1-3. Additional cured samples were immersed in other fluids as indicated in Table 5.

TABLE 5

Physical properties of hydraulic fluid and fuel resistant sealant.

| | Initial | JRF Type I 60° C./ 168 h | 3% Salt Water 60° C./ 168 h | De-icing Fluid 23° C./ 168 h | Water 40° C./ 1,000 h |
|---|---|---|---|---|---|
| Tensile, psi (MPa) | 510 (3.51) | 469 (3.23) | 449 (3.09) | 390 (2.69) | 433 (2.98) |
| Elongation, % | 210 | 190 | 193 | 200 | 210 |
| Hardness, Shore A | 64 | 58 | 57 | 62 | 60 |

Example 2

Hydraulic Fluid-Resistant and Fuel-Resistant Polyimide-Containing Sealant Composition To prepare a Skydrol® resistant sealant containing a polyimide filler, a composition comprising a thiol-terminated polythioether prepolymer (Part B) and a composition comprising a polyepoxide (Part A) was prepared. The components of the Part B and Part A compositions are shown in Table 6 and Table 7, respectively.

TABLE 6

Part B composition.

| Component | Material | Amount (wt %) |
|---|---|---|
| Sulfur-containing prepolymer | Permapol ® P3.1E* thiol-terminated polythioether | 65.66 |
| Organic filler | coated microspheres** | 0.45 |
| Organic filler | P84NT2*** polyimide particles | 19.52 |
| Inorganic filler | Socal ® 31 precipitated calcium carbonate | 8.87 |
| Inorganic filler | Cab-o-sil ® TS-720 Hydrophobic fumed silica | 2.66 |
| Adhesion promoter | T-3920* cooked phenolic resin | 0.44 |
| Adhesion promoter | T-3921* cooked phenolic resin | 0.36 |
| Adhesion promoter | Silquest ® A-1110 amino-functional silane | 0.53 |
| Adhesion promoter | Methylon ® 75108 phenolic resin | 0.89 |
| Catalyst | DABCO 33-LV triethylenediamine, | 0.62 |

*Commercially available from PPG Aerospace, Sylmar, CA.
**Prepared according to U.S. Application Publication No. 2016/0083619, Example 1, paragraph [0085].
***Commercially available from EVONIK Industries, Austria.

TABLE 7

Part A composition.

| Component | Material | Amount (wt %) |
|---|---|---|
| Polyepoxide | Epon ® 828 bisphenol A/epichlorohydrin derived epoxy resin | 23.23 |
| Polyepoxide | KD-9011* urethane-modified diepoxide | 2.58 |
| Polyepoxide | DEN ® 431 epoxy novolac resin | 21.51 |
| Polyepoxide | Epon ® Resin 1001-B-80# bisphenol A derived epoxy resin | 32.26 |

TABLE 7-continued

Part A composition.

| Component | Material | Amount (wt %) |
|---|---|---|
| Adhesion promoter | T-1601** hydrolyzed silane | 5.38 |
| Adhesion promoter | Methylon ® 75108 phenolic resin | 2.15 |
| Inorganic filler | Aerosil ® R201 fumed silica | 2.15 |
| Inorganic filler | Winnofil ® SPM precipitated calcium carbonate | 10.75 |

*Commercially available from Kukdo Chemical Co. Ltd, Seoul, Korea.
**Commercially available from PPG Aerospace, Sylmar, CA.

A sealant composition was prepared by combining Part A with Part B in a wt % ratio of 14.36 to 100.

Cured samples prepared according to Example 1 were immersed in Skydrol® LD-4 at temperatures from 23° C., 60° C., or 70° C. for 1,000 hours. Hardness was determined according to ISO 868. Volume swell was determined according to EN ISO 10563. The results are presented in Table 8.

TABLE 8

Hardness after Skydrol ® LD-4 Immersion.

| Immersion Conditions | Hardness, Shore A |
|---|---|
| Initial | 69 |
| 23° C., 1,000 hours | 54 |
| 60° C., 1,000 hours | 43 |
| 70° C., 1,000 hours | 43 |

Example 3

Hydraulic Fluid-Resistant and Fuel-Resistant Polyimide-Containing Sealant Composition To prepare a Skydrol® resistant sealant containing a polyimide filler, a composition comprising a thiol-terminated polythioether prepolymer (Part B) and a composition comprising a polyepoxide (Part A) was prepared. The components of the Part B and Part A compositions are shown in Table 9 and Table 10, respectively.

TABLE 9

Part B composition.

| Component | Material | Amount (wt %) |
|---|---|---|
| Sulfur-containing prepolymer | Thiol-terminated polythioether, Permapol ® P3.1E* | 70.92 |
| Organic filler | P84NT2** polyimide particles | 28.37 |
| Catalyst | DABCO 33-LV triethylenediamine, | 0.71 |

*Commercially available from PPG Aerospace, Sylmar, CA.
**Commercially available from EVONIK Industries.

TABLE 10

Part A composition.

| Component | Material | Amount (wt %) |
|---|---|---|
| Polyepoxide | Epon ® 828 bisphenol A/epichlorohydrin derived epoxy resin | 22.83 |
| Polyepoxide | DEN ® 431 epoxy novolac resin | 22.83 |
| Adhesion promoter | T-1601* hydrolyzed silane | 2.30 |
| Inorganic filler | WInnofil ® SPM precipitated calcium carbonate | 18.26 |
| Inorganic filler | Socal ® N2R precipitated calcium carbonate | 22.83 |
| Plasticizer | HB-40** | 10.96 |

*Commercially available from PPG Aerospace, Sylmar, CA.
**Commercially available from Eastman Chemical Co.

A sealant composition was prepared by combining Part A with Part B in a wt % ratio of 18.47 to 100.

Cured samples prepared according to Example 1 were immersed in Skydrol® LD-4 at temperatures from 23° C., 60° C., or 70° C. for 1,000 hours. Hardness was determined according to ISO 868. The results are presented in Table 11.

TABLE 11

Hardness after Skydrol ® LD-4 Immersion.

| Immersion Conditions | Hardness, Shore A |
|---|---|
| Initial | 72 |
| 23° C., 1,000 hours | 52 |
| 60° C., 1,000 hours | 46 |
| 70° C., 1,000 hours | 35 |

Example 4

Hydraulic Fluid Resistant and Fuel Resistant Polyphenylene Sulfide-Containing Sealant Composition To prepare a Skydrol® resistant sealant containing a polyphenylene sulfide filler, a composition comprising a thiol-terminated polythioether prepolymer (Part B) and a composition comprising a polyepoxide (Part A) was prepared. The components of the Part B and Part A compositions are shown in Table 12 and Table 13, respectively.

TABLE 12

Part B composition.

| Component | Material | Amount (wt %) |
|---|---|---|
| Sulfur-containing prepolymer | Permapol ® P3.1E* Thiol-terminated polythioether, | 63.58 |
| Organic filler | Coated microspheres** | 0.26 |
| Organic filler | Polyphenylene sulfide*** | 22.25 |
| Inorganic filler | Socal ® 31 precipitated calcium carbonate | 8.59 |
| Inorganic filler | Cab-o-sil ® TS-720 hydrophobic fumed silica, | 2.57 |
| Adhesion promoter | T-3920* cooked phenolic resin | 0.43 |
| Adhesion promoter | T-3921* cooked phenolic resin | 0.34 |
| Adhesion promoter | Silquest ® A-1110 S amino-functional silane | 0.52 |

TABLE 12-continued

Part B composition.

| Component | Material | Amount (wt %) |
|---|---|---|
| Adhesion promoter | Methylon ® 75108 phenolic resin | 0.86 |
| Catalyst | DABCO 33-LV triethylenediamine, | 0.60 |

*Commercially available from PPG Aerospace, Sylmar, CA.
**Prepared according to U.S. Application Publication No. 2016/0083619, Example 1, paragraph [0085].
***Commercially available from Solvay Specialty Polymers, Alpharetta, GA.

TABLE 13

Part A composition.

| Component | Material | Amount (wt %) |
|---|---|---|
| Polyepoxide | Epon ® 828 bisphenol A/epichlorohydrin derived epoxy resin | 22.98 |
| Polyepoxide | KD-9011* urethane-modified diepoxide | 2.55 |
| Polyepoxide | DEN ® 431 epoxy novolac resin | 21.28 |
| Polyepoxide | Epon ® Resin 1001-B-80# bisphenol A derived epoxy resin | 31.91 |
| Adhesion promoter | T-1601** hydrolyzed silane | 5.32 |
| Adhesion promoter | Methylon ® 75108 phenolic resin | 2.13 |
| Inorganic filler | Aerosil ® R201 fumed silica | 2.13 |
| Inorganic filler | Winnofil ® SPM precipitated calcium carbonate | 10.64 |
| Pigment | phthalocyanine pigment§ | 1.06 |

*Commercially available from Kukdo Chemical Co. Ltd, Seoul, Korea.
**Commercially available from PPG Aerospace, Sylmar, CA.
§Commercially available from Sun Chemical Co.

A sealant composition was prepared by combining Part A and Part be in a wt % ratio of 14.36 to 100.

Cured samples prepared according to Example 1 were immersed in Skydrol® LD-4 at temperatures from 23° C., 60° C., or 70° C. for 1,000 hours. Hardness was determined according to ISO 868 and was greater than Shore 25A.

Example 5

Hydraulic Fluid Resistant and Fuel Resistant Polyphenylene Sulfide-Containing Sealant Composition To prepare a Skydrol® resistant sealant, a composition comprising a thiol-terminated polythioether prepolymer (Part B) and a composition comprising a polyepoxide (Part A) was prepared. The components of the Part B and Part A compositions are shown in Table 14 and Table 15, respectively.

TABLE 14

Part B composition

| Component | Material | Amount (wt %) |
|---|---|---|
| Sulfur-containing prepolymer | Thiol-terminated polythioether, Permapol ® P3.1E* | 73.53 |

TABLE 14-continued

Part B composition

| Component | Material | Amount (wt %) |
|---|---|---|
| Organic filler | PPS** | 25.74 |
| Catalyst | DABCO 33-LV triethylenediamine, | 0.74 |

*Commercially available from PPG Aerospace, Sylmar, CA.
**Commercially available from Solvay Specialty Polymers, GA.

TABLE 15

Part A composition

| Component | Material | Amount (wt %) |
|---|---|---|
| Polyepoxide | Epon ® 828 bisphenol A/epichlorohydrin derived epoxy resin | 22.83 |
| Polyepoxide | DEN ® 431 epoxy novolac resin | 22.83 |
| Adhesion promoter | T-1601* hydrolyzed silane | 2.30 |
| Inorganic filler | WInnofil ® SPM precipitated calcium carbonate | 18.26 |
| Inorganic filler | Socal ® N2R precipitated calcium carbonate | 22.83 |
| Plasticizer | HB-40** | 10.96 |

*Commercially available from PPG Aerospace, Sylmar, CA.
**Commercially available from Eastman Chemical Co.

A sealant composition was prepared by combining Part A with Part B in a wt % ratio of 20 to 100.

Cured samples prepared according to Example 1 were immersed in Skydrol® LD-4 at 60° C. for 144 hours. Hardness was determined according to ISO 868. The results are shown in Table 16.

TABLE 16

Hardness after Skydrol ® LD-4 Immersion

| Immersion Conditions | Hardness, Shore A |
|---|---|
| Initial | 61 |
| 60° C., 144 hours | 52 |

Example 6

Hydraulic Fluid Resistant and Fuel Resistant Polyethersulfone-Containing Sealant Composition To prepare a Skydrol® resistant sealant containing polyethersulfone filler, a composition comprising a thiol-terminated polythioether prepolymer (Part B) and a composition comprising a polyepoxide (Part A) was prepared. The components of the Part B and Part A compositions are shown in Table 17 and Table 18, respectively.

TABLE 17

Part B composition.

| Component | Material | Amount (wt %) |
|---|---|---|
| Sulfur-containing prepolymer | Permapol ® P3.1E* thiol-terminated polythioether, | 61.62 |

TABLE 17-continued

Part B composition.

| Component | Material | Amount (wt %) |
|---|---|---|
| Organic filler | Coated microspheres** | 0.25 |
| Organic filler | Toraypearl ®*** Polyethersulfone particles | 24.65 |
| Inorganic filler | Socal ® 31 precipitated calcium carbonate, | 8.33 |
| Inorganic filler | Cab-o-sil ® TS-720 hydrophobic fumed silica, | 2.50 |
| Adhesion promoter | T-3920* cooked phenolic resin | 0.42 |
| Adhesion promoter | T-3921* cooked phenolic resin | 0.33 |
| Adhesion promoter | Silquest ® A-1110 amino-functional silane | 0.5 |
| Adhesion promoter | Methylon ® 75108 phenolic resin | 0.83 |
| Catalyst | DABCO 33-LV Triethylenediamine | 0.58 |

*Commercially available from PPG Aerospace, Sylmar, CA.
**Prepared according to U.S. Application Publication No. 2016/0083619, Example 1, paragraph [0085].
***Commercially available from Toray Industries, Inc., Tokyo, Japan.

TABLE 18

Part A composition.

| Component | Material | Amount (wt %) |
|---|---|---|
| Polyepoxide | Epon ® 828 bisphenol A/epichlorohydrin derived epoxy resin | 22.98 |
| Polyepoxide | KD-9011* urethane-modified diepoxide | 2.55 |
| Polyepoxide | DEN ® 431 epoxy novolac resin | 21.28 |
| Polyepoxide | Epon ® Resin 1001-B-80# bisphenol A derived epoxy resin | 31.91 |
| Adhesion promoter | T-1601** hydrolyzed silane | 5.32 |
| Adhesion promoter | Methylon ® 75108 phenolic resin | 2.13 |
| Inorganic filler | Aerosil ® R201 fumed silica | 2.13 |
| Inorganic filler | Winnofil ® SPM precipitated calcium carbonate | 10.64 |
| Pigment | phthalocyanine pigment§ | 1.06 |

*Commercially available from Kukdo Chemical Co. Ltd, Seoul, Korea.
**Commercially available from PPG Aerospace, Sylmar, CA.
§Commercially available from Sun Chemical Co.

A sealant composition was prepared by combining Part A with Part B in a wt % ratio of 15.87 to 100.

Cured samples prepared according to Example 1 were immersed in Skydrol® LD-4 at temperatures from 23° C., 60° C., or 70° C. for 1,000 hours. The samples remained as solid sealants at the end of the testing.

Example 7

Hydraulic Fluid Resistant and Fuel Resistant Thermoplastic Copolyester-Containing Sealant Composition To prepare a Skydrol® resistant sealant containing thermoplastic copolyester particles, a composition comprising a thiol-terminated polythioether prepolymer (Part B) and a composition comprising a polyepoxide (Part A) was prepared. The components of the Part B and Part A compositions are shown in Table 19 and Table 20, respectively.

TABLE 19

Part B composition.

| Component | Material | Amount (wt %) |
|---|---|---|
| Sulfur-containing prepolymer | Permapol ® P3.1E* thiol-terminated polythioether | 61.62 |
| Organic filler | Coated microspheres** | 0.25 |
| Organic filler | Toraypearl ®*** thermoplastic copolyester particles | 24.65 |
| Inorganic filler | Socal ® 31 precipitated calcium carbonate | 8.33 |
| Inorganic filler | Cab-o-sil ® TS-720 hydrophobic fumed silica | 2.50 |
| Adhesion promoter | T-3920* cooked phenolic resin | 0.42 |
| Adhesion promoter | T-3921* cooked phenolic resin | 0.33 |
| Adhesion promoter | Silquest ® A-1110 amino-functional silane | 0.5 |
| Adhesion promoter | Methylon ® 75108 phenolic resin | 0.83 |
| Catalyst | DABCO 33-LV triethylenediamine | 0.58 |

*Commercially available from PPG Aerospace, Sylmar, CA.
**Prepared according to U.S. Application Publication No. 2016/0083619, Example 1, paragraph [0085].
***Commercially available from Toray Industries, Inc., Tokyo, Japan.

TABLE 20

Part A composition.

| Component | Material | Amount (wt %) |
|---|---|---|
| Polyepoxide | Epon ® 828 bisphenol A/epichlorohydrin derived epoxy resin | 22.98 |
| Polyepoxide | KD-9011* urethane-modified diepoxide | 2.55 |
| Polyepoxide | DEN ® 431 epoxy-novolac resin | 21.28 |
| Polyepoxide | Epon ® Resin 1001-B-80# bisphenol A derived epoxy resin | 31.91 |
| Adhesion promoter | T-1601** hydrolyzed silane | 5.32 |
| Adhesion promoter | Methylon ® 75108 phenolic resin | 2.13 |
| Inorganic filler | Aerosil ® R201 fumed silica | 2.13 |
| Inorganic filler | WIinnofil ® SPM precipitated calcium carbonate | 10.64 |
| Pigment | phthalocyanine pigment§ | 1.06 |

*Commercially available from Kukdo Chemical Co. Ltd, Seoul, Korea.
**Commercially available from PPG Aerospace, Sylmar, CA.
§Commercially available from Sun Chemical Co. epoxy
EPON ® Resin 1001F in methylethyl ketone, EPON ® Resin 100F is a low molecular weight resin derived from a liquid epoxy resin and bisphenol A.

A sealant composition was prepared by combining Part A with Part B in a wt % ratio of 15.87 to 100.

Cured samples prepared according to Example 1 were immersed in Skydrol® LD-4 at temperatures from 23° C., 60° C., or 70° C. for 1,000 hours. The samples remained as solid sealants at the end of the testing.

Finally, it should be noted that there are alternative ways of implementing the embodiments disclosed herein. Accordingly, the present embodiments are to be considered as illustrative and not restrictive. Furthermore, the claims are not to be limited to the details given herein, and are entitled to their full scope and equivalents thereof.

What is claimed is:

1. A composition comprising:
   (a) from 35 wt % to 65 wt % of a thiol-terminated sulfur-containing prepolymer;
   (b) from 10 wt % to 35 wt % of an organic filler;
   (c) from 5 wt % to 30 wt % of an inorganic filler; and
   (d) from 5 wt % to 20 wt % of a polyepoxide,
   wherein the composition has a specific gravity less than 1.2, wherein specific gravity is determined according to ISO 2781; and
   wherein wt % is based on the total weight of the composition.

2. The composition of claim 1, wherein the organic filler has a specific gravity less than 1.6 as determined according to ISO787 (Part 10).

3. The composition of claim 1, wherein the organic filler exhibits less than 1 vol % swelling following immersion in aviation hydraulic fluid at a temperature of less than 50° C. for 1,000 hours, wherein percent swelling is determined according to EN ISO 10563.

4. The composition of claim 1, wherein the organic filler has a specific gravity from 0.85 to 1.4, wherein specific gravity is determined according to ISO 787 (Part 10).

5. The composition of claim 1, wherein the organic filler comprises solid particles.

6. The composition of claim 1, wherein the organic filler comprises a polyamide, a polyimide, a polyphenylene sulfide, a polyether sulfone, a thermoplastic copolyester, or a combination of any of the foregoing.

7. The composition of claim 1, wherein the organic filler further comprises expanded thermoplastic microcapsules coated with a melamine resin.

8. The composition of claim 1, wherein the thiol-terminated sulfur-containing prepolymer comprises a thiol-terminated polythioether prepolymer, a thiol-terminated polysulfide prepolymer, a thiol-terminated sulfur-containing polyformal prepolymer, a thiol-terminated monosulfide prepolymer, or a combination of any of the foregoing.

9. The composition of claim 1, wherein the thiol-terminated sulfur-containing prepolymer comprises a thiol-terminated polythioether prepolymer comprising at least one moiety having the structure of Formula (1):

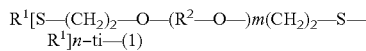

wherein,
each $R^1$ is independently selected from a $C_{2-10}$ n-alkanediyl group, a $C_{3-6}$ branched alkanediyl group, a $C_{6-8}$ cycloalkanediyl group, a $C_{6-10}$ alkanecycloalkanediyl group, a divalent heterocyclic group, and a $-[(CHR^3)_p-X-]_q(CHR^3)_r-$ group, wherein each $R^3$ is selected from hydrogen and methyl;
each $R^2$ is independently selected from a $C_{2-10}$ n-alkanediyl group, a $C_{3-6}$ branched alkanediyl group, a $C_{6-8}$ cycloalkanediyl group, a $C_{6-14}$ alkanecycloalkanediyl group, a divalent heterocyclic group, and a $-[(CH_2)_p-X-]_q(CH_2)_r-$ group;
each X is independently selected from O, S, and NR, wherein R is selected from hydrogen and methyl;
m ranges from 0 to 50;
n is an integer ranging from 1 to 60;
p is an integer ranging from 2 to 6;
q is an integer ranging from 1 to 5; and
r is an integer ranging from 2 to 10.

10. The composition of claim 1, wherein the thiol-terminated sulfur-containing prepolymer comprises a thiol-terminated polythioether prepolymer of Formula (1a), a thiol-terminated polythioether prepolymer of Formula (1b), a thiol-terminated polythioether prepolymer of Formula (1c), or a combination of any of the foregoing:

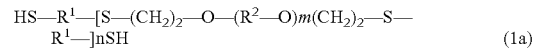

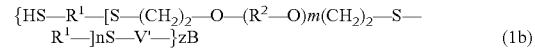

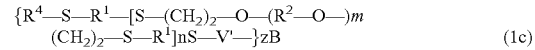

wherein,
each $R^1$ is independently selected from $C_{2-10}$ alkanediyl, $C_{6-8}$ cycloalkanediyl, $C_{6-14}$ alkanecycloalkanediyl, $C_{5-8}$ heterocycloalkanediyl, and $-[(CHR^3)_p-X-]_q(CHR^3)_r$, 13,
wherein,
p is an integer from 2 to 6;
q is an integer from 1 to 5;
r is an integer from 2 to 10;
each $R^3$ is independently selected from hydrogen and methyl; and
each X is independently selected from $-O-$, $-S-$, and $-NR-$, wherein R is selected from hydrogen and methyl;
each $R^2$ is independently selected from $C_{1-10}$ alkanediyl, $C_{6-8}$ cycloalkanediyl, $C_{6-14}$ alkanecycloalkanediyl, and $-[(CHR^3)_p-X-]_q(CHR^3)_r-$, wherein p, q, r, $R^3$, and X are as defined as for $R^1$;
m is an integer from 0 to 50;
n is an integer from 1 to 60;
B represents a core derived from a z-valent, polyfunctionalizing agent B(—V)z wherein,
z is an integer from 3 to 6; and
each V is a moiety comprising a terminal group reactive with a thiol;
each —V'— is derived from the reaction of —V with a thiol;
each $R^4$ is independently selected from hydrogen and a bond to the polyfunctionalizing agent B(—V)z, through a moiety of Formula (1).

11. The composition of claim 1, wherein the inorganic filler comprises precipitated calcium carbonate, fumed silica, or a combination thereof.

12. The composition of claim 1, wherein the polyepoxide comprises a hydroxyl-functional bisphenol A/epichlorohydrin derived polyepoxide, a phenol novolac polyepoxide, or a combination thereof.

13. The composition of claim 1, wherein the polyepoxide comprises from 30 wt % to 80 wt % of a hydroxyl-functional polyepoxide; wherein wt % is based on the total weight of the polyepoxide in the composition.

14. The composition of claim 1, comprising an adhesion promoter, wherein the composition comprises from 0.5 wt % to 4 wt % of the adhesion promoter; and wt % is based on the total weight of the composition.

15. The composition of claim 1, comprising an adhesion promoter, wherein the adhesion promoter comprises an organo-functional silane, a phenolic resin, or a combination thereof.

16. The composition of claim 1, wherein the composition comprises a specific gravity within a range from 0.9 to 1.15, wherein the specific gravity is determined according to ISO 2781.

17. The composition of claim 1, wherein,
the thiol-terminated sulfur-containing prepolymer comprises a thiol-terminated polythioether prepolymer;

the organic filler further comprises expanded thermoplastic microcapsules coated with a melamine resin;
the inorganic filler comprises precipitated calcium carbonate and fumed silica; and
the polyepoxide comprises a hydroxyl-functional bisphenol A/epichlorohydrin derived polyepoxide and a phenol novolac polyepoxide.

18. A cured composition obtained from the composition of claim 1.

19. The cured composition of claim 18, wherein the cured composition comprises a tensile strength greater than 1 MPa, an elongation greater than 150%, and a hardness greater than Shore 30A, following immersion in hydraulic fluid at 70° C. for 1,000 hours, wherein, tensile strength is determined according to ISO 37, elongation is determined according to ISO 37, and hardness is determined according to ISO 868.

20. A part comprising the cured composition of claim 18.

21. A vehicle comprising the cured composition of claim 18.

22. The vehicle of claim 21, wherein the vehicle comprises an aerospace vehicle.

23. A sealant system comprising a first part and a second part, wherein,
the first part comprises:
from 50 wt % to 70 wt % of a thiol-terminated sulfur-containing prepolymer;
from 15 wt % to 40 wt % of an organic filler;
from 2 wt % to 16 wt % of an inorganic filler, and
from 0.5 wt % to 3 wt % of an adhesion promoter, wherein wt % is based on the total weight of the first part; and
the second part comprises:
from 35 wt % to 80 wt % of a polyepoxide;
from 10 wt % to 50 wt % of an inorganic filler, and
from 0.5 wt % to 10 wt % of an adhesion promoter, wherein wt % is based on the total weight of the second part,
wherein the combined first part and the second part has a specific gravity less than 1.2, wherein specific gravity is determined according to ISO 2781.

24. A cured composition prepared from the sealant system of claim 23.

25. A part sealed with the cured composition of claim 24.

26. A vehicle comprising the cured composition of claim 24.

27. The vehicle of claim 26, wherein the vehicle comprises an aerospace vehicle.

28. A method of sealing a part, comprising:
applying the composition of claim 1 to a part; and
curing the applied composition to provide a sealed part.

29. A method of sealing a part, comprising:
combining the first part of the sealant system of claim 23 with the second part of the sealant system of claim 23 to provide a sealant composition;
applying the sealant composition to a part; and
curing the applied sealant composition to provide a sealed part.

30. The composition of claim 1, wherein the organic filler further comprises expanded thermoplastic microcapsules coated with a urea/formaldehyde resin.

31. The composition of claim 1, wherein,
the thiol-terminated sulfur-containing prepolymer comprises a thiol-terminated polythioether prepolymer;
the organic filler further comprises expanded thermoplastic microcapsules coated with a urea/formaldehyde resin;
the inorganic filler comprises precipitated calcium carbonate and fumed silica; and
the polyepoxide comprises a hydroxyl-functional bisphenol A/epichlorohydrin derived polyepoxide and a phenol novolac polyepoxide.

32. The composition of claim 23, wherein the organic filler further comprises expanded thermoplastic microcapsules coated with a urea/formaldehyde resin.

33. The composition of claim 23, wherein,
the thiol-terminated sulfur-containing prepolymer comprises a thiol-terminated polythioether prepolymer;
the organic filler further comprises expanded thermoplastic microcapsules coated with a urea/formaldehyde resin;
the inorganic filler comprises precipitated calcium carbonate and fumed silica; and
the polyepoxide comprises a hydroxyl-functional bisphenol A/epichlorohydrin derived polyepoxide and a phenol novolac polyepoxide.

* * * * *